United States Patent
Oishi et al.

(10) Patent No.: US 11,814,712 B2
(45) Date of Patent: *Nov. 14, 2023

(54) FREE-CUTTING COPPER ALLOY AND METHOD FOR PRODUCING FREE-CUTTING COPPER ALLOY

(71) Applicant: MITSUBISHI MATERIALS CORPORATION, Tokyo (JP)

(72) Inventors: Keiichiro Oishi, Sakai (JP); Kouichi Suzaki, Sakai (JP); Hiroki Goto, Sakai (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/611,195

(22) PCT Filed: Mar. 16, 2020

(86) PCT No.: PCT/JP2020/011343
§ 371 (c)(1),
(2) Date: Nov. 15, 2021

(87) PCT Pub. No.: WO2020/261666
PCT Pub. Date: Dec. 30, 2020

(65) Prior Publication Data
US 2022/0259711 A1   Aug. 18, 2022

(30) Foreign Application Priority Data

Jun. 25, 2019 (JP) .................. 2019-116914
Jul. 12, 2019 (JP) .................. 2019-130143
(Continued)

(51) Int. Cl.
*C22C 9/04* (2006.01)
*C21D 9/00* (2006.01)
*C22F 1/08* (2006.01)

(52) U.S. Cl.
CPC .............. *C22C 9/04* (2013.01); *C21D 9/00* (2013.01); *C22F 1/08* (2013.01)

(58) Field of Classification Search
CPC .......... C22C 9/04; C21D 9/00; C21D 8/0226; C21D 8/0236; C21D 8/0273; C22F 1/08
See application file for complete search history.

(56) References Cited

U.S. PATENT DOCUMENTS 4,055,445 A    10/1977 Pops
4,259,124 A    3/1981 Smith et al.
(Continued)

FOREIGN PATENT DOCUMENTS

CN    1969052 A    5/2007
CN    101298643 A   11/2008
(Continued)

OTHER PUBLICATIONS

Suksongkarm, et al., "Bismuth Formation in Lead-Free Cu—Zn—Si Yellow Brass with Various Bismuth-Tin Alloy Additions," Materials Transactions, vol. 59, No. 11, 2018, pp. 1747-1752. (Year: 2018).*

(Continued)

*Primary Examiner* — John A Hevey
(74) *Attorney, Agent, or Firm* — Locke Lord LLP; James E. Armstrong, IV; Nicholas J. DiCeglie, Jr.

(57) ABSTRACT

This free-cutting copper alloy contains Cu: more than 57.5% but less than 64.5%, Si: more than 0.20% but less than 1.20%, Pb: more than 0.001% but less than 0.20%, Bi: more than 0.10% but less than 1.00%, and P: more than 0.001% but less than 0.20%, with the balance being Zn and unavoidable impurities, wherein the total amount of Fe, Mn, Co and Cr is less than 0.45%, the total amount of Sn and Al is less (Continued)

than 0.45%, relationships of $56.3 \leq f1=[Cu]-4.8\times[Si]+0.5\times[Pb]+0.5\times[Bi]-0.5\times[P] \leq 59.5$ and $0.12 \leq f2=[Pb]+[Bi]<1.0$ are satisfied.

21 Claims, 2 Drawing Sheets

(30) Foreign Application Priority Data

| | | |
|---|---|---|
| Jul. 31, 2019 | (JP) | 2019-141096 |
| Sep. 9, 2019 | (JP) | 2019-163773 |
| Dec. 11, 2019 | (WO) | PCT/JP2019/048438 |
| Dec. 11, 2019 | (WO) | PCT/JP2019/048455 |

(56) References Cited

U.S. PATENT DOCUMENTS

| | | | |
|---|---|---|---|
| 6,165,246 | A | 12/2000 | Kira et al. |
| 11,479,834 | B2 * | 10/2022 | Oishi ............ C22F 1/08 |
| 2004/0159375 | A1 | 8/2004 | Yamagishi |
| 2004/0241038 | A1 | 12/2004 | Hofmann et al. |
| 2005/0039827 | A1 | 2/2005 | Yamagishi et al. |
| 2007/0158002 | A1 * | 7/2007 | Oishi ............ B22D 27/00 420/472 |
| 2007/0169854 | A1 | 7/2007 | Oishi |
| 2009/0263272 | A1 | 10/2009 | Uchida |
| 2009/0297390 | A1 | 12/2009 | Hidenobu et al. |
| 2010/0135848 | A1 | 6/2010 | Xu et al. |
| 2014/0248175 | A1 | 9/2014 | Lee et al. |
| 2014/0251488 | A1 * | 9/2014 | Oishi ............ F16L 9/02 420/478 |
| 2015/0132179 | A1 | 5/2015 | Oishi |
| 2016/0068931 | A1 | 3/2016 | Xu et al. |
| 2016/0215366 | A1 | 7/2016 | Uchida |
| 2019/0256960 | A1 | 8/2019 | Oishi et al. |
| 2020/0157658 | A1 | 5/2020 | Oishi et al. |
| 2020/0181739 | A1 | 6/2020 | Oishi et al. |
| 2022/0042141 | A1 * | 2/2022 | Oishi ............ C22F 1/08 |
| 2022/0186352 | A1 * | 6/2022 | Oishi ............ C21D 9/00 |
| 2022/0259711 | A1 | 8/2022 | Oishi et al. |
| 2022/0275479 | A1 * | 9/2022 | Oishi ............ C22C 9/04 |

FOREIGN PATENT DOCUMENTS

| | | |
|---|---|---|
| CN | 101476056 A | 7/2009 |
| CN | 104004940 A | 8/2014 |
| CN | 104480344 A | 4/2015 |
| CN | 105624463 A | 6/2016 |
| CN | 103282524 B | 8/2016 |
| CN | 106893883 A | 6/2017 |
| CN | 107937752 A | 4/2018 |
| CN | 107974573 A | 5/2018 |
| CN | 109563567 A | 4/2019 |
| CN | 109563568 A | 4/2019 |
| CN | 109563569 A | 4/2019 |
| CN | 109642272 A | 4/2019 |
| EP | 0947592 A1 | 10/1999 |
| EP | 1790742 A1 | 5/2007 |
| EP | 2634275 A1 | 9/2013 |
| EP | 3050982 A1 | 8/2016 |
| EP | 3498870 A1 | 6/2019 |
| IN | 201917005548 | 4/2019 |
| JP | 2000-119774 A | 4/2000 |
| JP | 2000-119775 A | 4/2000 |
| JP | 2000-355746 A | 12/2000 |
| JP | 2004-244672 A | 9/2004 |
| JP | 2004-263301 A | 9/2004 |
| JP | 3999676 B2 | 10/2007 |
| JP | 2010-242184 A | 10/2010 |
| JP | 2011-219857 A | 11/2011 |
| JP | 2013-104071 A | 5/2013 |
| JP | 5865548 B2 | 2/2016 |
| JP | 2016-511792 A | 4/2016 |
| JP | 2016-145411 A | 8/2016 |
| JP | 2016-194123 A | 11/2016 |
| JP | 2018-048397 A | 3/2018 |
| JP | 2018-172725 A | 11/2018 |
| JP | 2019-508584 A | 3/2019 |
| TW | 200722536 A | 6/2007 |
| TW | 200930822 A | 7/2009 |
| TW | 201107501 A1 | 3/2011 |
| TW | 201335391 A1 | 9/2013 |
| TW | I467036 B | 1/2015 |
| TW | 201527559 A | 7/2015 |
| TW | 201910525 A | 3/2019 |
| TW | 201910526 A | 3/2019 |
| TW | 201910527 A | 3/2019 |
| WO | 2005/093108 A1 | 10/2005 |
| WO | 2006/016442 A1 | 2/2006 |
| WO | 2006/016624 A1 | 2/2006 |
| WO | 2006/016630 A1 | 2/2006 |
| WO | 2007/034571 A1 | 3/2007 |
| WO | 2008/081947 A1 | 7/2008 |
| WO | 2009/048008 A1 | 4/2009 |
| WO | 2012/057055 A1 | 5/2012 |
| WO | 2013/065830 A1 | 5/2013 |
| WO | 2015/046421 A1 | 4/2015 |
| WO | 2017/127284 A1 | 7/2017 |
| WO | 2017/204252 A1 | 11/2017 |
| WO | 2019/035225 A1 | 2/2019 |

OTHER PUBLICATIONS

Office Action dated Feb. 1, 2023, issued for Chinese Patent Application No. 202080084404.7 and English translation of the Search Report.
Office Action dated Feb. 28, 2022, issued for Indian Patent Application No. 202117033588.
Office Action dated Mar. 2, 2022 issued for U.S. Appl. No. 17/426,164.
Office Action dated Mar. 14, 2022, issued for Chinese Patent Application No. 201980096002.6 and English translation of the Search Report.
Genjiro Mima and Seiji Hasegawa, Journal of the Japan Copper and Brass Research Association, vol. 2, No. 1, 1963, pp. 62-77. (partial translation; discussed in the spec).
International Search Report dated Mar. 3, 2020, issued for PCT/JP2019/048438 and English translation thereof.
International Search Report dated Mar. 3, 2020, issued for PCT/JP2019/048455 and English translation thereof.
International Search Report dated May 12, 2020, issued for PCT/JP2020/006037 and English translation thereof.
International Search Report dated Jun. 16, 2020, issued for PCT/JP2020/011343 and English translation thereof.
International Search Report dated Mar. 3, 2020, issued for PCT/JP2019/050255 and English translation thereof.
International Search Report dated Feb. 9, 2021, issued for PCT/JP2020/044418 and English translation thereof.
Office Action dated Sep. 15, 2020, issued for the Taiwan Patent Application No. 108145211 and English translation of the Search Report.
Office Action dated Jan. 8, 2021, issued for the Taiwan Patent Application No. 108145219 and English translation of the Search Report.
Office Action dated Nov. 30, 2020, issued for the Taiwan Patent Application No. 109105097 and English translation of the Search Report.
Office Action dated Jul. 14, 2020, issued for the Taiwan Patent Application No. 108147337 and English translation of the Search Report.
Office Action dated Jul. 13, 2021, issued for the Taiwan Patent Application No. 109143360 and English translation of the Search Report.
Office Action issued in Indian Patent Application No. 202217022390, dated Aug. 12, 2022.
Office Action dated Apr. 1, 2022, issued in Chinese Patent Application No. CN 202080038596.8 and English translation of the Search Report.

(56) References Cited

OTHER PUBLICATIONS

Office Action dated Feb. 1, 2023, issued for U.S. Appl. No. 17/436,667.
Supplementary European Search Report dated Dec. 21, 2021, issued for European Patent Application No. 19935321.0.
Requirement for Restriction/Election dated Dec. 27, 2021, issued for U.S. Appl. No. 17/426,140.
Office Action dated Dec. 28, 2021, issued for Chinese Patent Application No. 201980090321.6 and English partial Translation (Search Report only).
Office Action dated Dec. 28, 2021, issued for Chinese Patent Application No. 201980090313.1 and English partial Translation (Search Report only).
Requirement for Restriction/Election dated Jan. 26, 2022, issued for U.S. Appl. No. 17/426,164.

\* cited by examiner

FREE-CUTTING COPPER ALLOY AND METHOD FOR PRODUCING FREE-CUTTING COPPER ALLOY

CROSS REFERENCE TO RELATED APPLICATIONS

This application is related to co-pending application: "FREE-CUTTING COPPER ALLOY CASTING, AND METHOD FOR PRODUCING FREE-CUTTING COPPER ALLOY CASTING" filed even date herewith in the names of Keiichiro OISHI, Kouichi SUZAKI and Hiroki GOTO as a national phase entry of PCT/JP2020/006037, which application is assigned to the assignee of the present application and is incorporated by reference herein.

TECHNICAL FIELD

The present invention relates to a free-cutting copper alloy having a high strength and a significantly reduced Pb content and a method for producing a free-cutting copper alloy. The present invention relates to a free-cutting copper alloy used for automobile components, electrical or electronic apparatus components, mechanical components, stationaries, toys, sliding components, measuring instrument components, precision mechanical components, medical components, drink-related devices and components, devices and components for water drainage, industrial plumbing components, or components relating to liquid or gas such as drinking water, industrial water, drainage water, or hydrogen, and a method for producing the free-cutting copper alloy. Examples of specific component names include valves, joints, cocks, faucets, faucet fittings, gears, axles, bearings, shafts, sleeves, spindles, sensors, bolts, nuts, flare nuts, pen points, insert nuts, cap nuts, nipples, spacers, and screws. The present invention relates to a free-cutting copper alloy used for the components that are made by machining, and a method for producing the free-cutting copper alloy.

The present application claims priority on Japanese Patent Application No. 2019-116914 filed on Jun. 25, 2019, Japanese Patent Application No. 2019-130143 filed on Jul. 12, 2019, Japanese Patent Application No. 2019-141096 filed on Jul. 31, 2019, Japanese Patent Application No. 2019-163773 filed on Sep. 9, 2019, International Patent Application No. PCT/JP2019/048438 filed on Dec. 11, 2019, and International Patent Application No. PCT/JP2019/048455 filed on Dec. 11, 2019, the contents of which are incorporated herein by reference.

BACKGROUND ART

Conventionally, a Cu—Zn—Pb alloy (so-called a free-cutting brass bar, brass for forging, or brass for casting) or a Cu—Sn—Zn—Pb alloy (so-called bronze casting: gunmetal) having excellent machinability was generally used for automobile components, electrical, home appliance, and electronic apparatus components, mechanical components, stationaries, precision mechanical components, medical components, and devices and components relating to liquid or gas such as drinking water, industrial water, drainage water, or hydrogen, specific component names of which include valve, joint, gear, sensor, nut, and screw.

A Cu—Zn—Pb alloy includes 56% to 65 mass % Cu, 1% to 4 mass % Pb, and the balance is Zn. A Cu—Sn—Zn—Pb alloy includes 80% to 88 mass % Cu, 2% to 8 mass % Sn, 1% to 8 mass % Pb, and the balance is Zn.

Pb added to copper alloy has a tremendous effect particularly in a hole-making process particularly using a drill. Recently, the dimensions of various devices and components have decreased, and the necessity of drilling tiny holes on such components has increased. It is expected that a reduction in the size of various industrial components such as home information appliances, medical devices, or automobile components will be accelerated.

However, recently, Pb's influence on human body and the environment is becoming a concern, and momentum to regulate Pb is increasing in various countries. For example, a regulation for reducing the Pb content in drinking water supply devices to 0.25 mass % or lower came into force in January 2010 in California, the United States. In countries other than the United States also, such regulation is rapidly being established, and development of a copper alloy material that meets the requirements of the regulation on Pb content is in demand.

In addition, in other industrial fields such as those of automobiles, electrical and electronic apparatus, and machines, free-cutting copper alloys are exceptionally allowed to include up to 4 mass % Pb by, for example, in ELV regulations and RoHS regulations of the Europe. However, like in the field of drinking water, strengthening of regulations on Pb content including elimination of exemptions has been actively discussed.

While there is a trend to strengthen Pb regulations for free-cutting copper alloys, alloys like (1) a Cu—Zn—Bi alloy or Cu—Zn—Bi—Se alloy including Bi having machinability (machining performance, machinability-improvement function) or, in some cases, including not only Bi but also Se instead of Pb, (2) a Cu—Zn alloy including a high concentration of Zn in which the amount of $\beta$ phase is increased to improve machinability, (3) a Cu—Zn—Si alloy or Cu—Zn—Sn alloy including large amounts of $\gamma$ phase and $\kappa$ phase having machinability instead of Pb, and (4) a Cu—Zn—Sn—Bi alloy including a large amount of $\gamma$ phase and Bi, etc., are proposed.

Patent Document 1 discloses a method of improving machinability and corrosion resistance by adding 0.7% to 2.5 mass % Sn to a Cu—Zn—Bi alloy such that $\gamma$ phase precipitates.

However, alloys including Bi instead of Pb have many problems. For example, Bi has lower machinability than Pb. Bi may be harmful to human body like Pb. Bi has a resourcing problem because it is a rare metal. Further, Bi embrittles a copper alloy material.

In addition, as disclosed in Patent Document 1, even when $\gamma$ phase of a Cu—Zn—Sn alloy is precipitated, $\gamma$ phase including Sn has poor machinability, thus requiring co-addition of Bi having machinability.

Further, it is absolutely impossible to replace a free-cutting copper alloy containing lead with a Cu—Zn binary alloy including a large amount of $\beta$ phase since even though $\beta$ phase contributes to improvement of machinability, it has lower machinability than Pb.

For this reason, Cu—Zn—Si alloys including Si instead of Pb are proposed as free-cutting copper alloys in, for example, Patent Documents 2 to 11.

In Patent Documents 2 and 3, excellent machinability is realized without including Pb or with a small amount of Pb by the excellent machinability of $\gamma$ phase, or, in some cases, $\kappa$ phase formed in an alloy mainly comprising a high Cu concentration of 69% to 79 mass % and a high Si concentration of 2 to 4 mass %. By including greater than or equal to 0.3 mass % Sn and greater than or equal to 0.1 mass % Al, formation of $\gamma$ phase having machinability is further increased and accelerated such that machinability can be improved. Corrosion resistance is improved by forming a large amount of γ phase.

In Patent Document 4, excellent machinability is obtained by adding an extremely small amount (0.02 mass % or lower) of Pb and simply defining the total area of γ phase and κ phase mainly in consideration of the Pb content.

Patent Document 5 proposes a copper alloy in which Fe is included in a Cu—Zn—Si alloy.

Patent Document 6 proposes a copper alloy in which Sn, Fe, Co, Ni, and Mn are included in a Cu—Zn—Si alloy.

Patent Document 7 proposes a Cu—Zn—Si alloy having an α phase matrix including κ phase in which area ratios of β phase, γ phase, and β phase are limited.

Patent Document 8 proposes a Cu—Zn—Si alloy having an α phase matrix including κ phase in which area ratios of β phase and γ phase are limited.

Patent Document 9 proposes a Cu—Zn—Si alloy in which the length of the longer sides of γ phase and the length of the longer sides of μ phase are defined.

Patent Document 10 proposes a Cu—Zn—Si alloy to which Sn and Al are added.

Patent Document 11 proposes a Cu—Zn—Si alloy in which γ phase is distributed in the form of particles at α phase boundary between α phase and β phase to improve machinability.

Patent Document 13 proposes to improve cold workability by dispersing β phase by having Si contained in a Cu—Zn alloy.

Patent Document 14 proposes a Cu—Zn alloy to which Sn, Pb, and Si are added.

Now, as described in Patent Document 13 and Non-Patent Document 1, in Cu—Zn—Si alloys, it is known that, even when looking at only those having Cu concentration of 60 mass % or higher, a Zn concentration of 40 mass % or lower, and Si concentration of 10 mass % or lower, 10 kinds of metallic phases including α phase matrix, β phase, γ phase, δ phase, ε phase, ζ phase, η phase, κ phase, μ phase, and χ phase, in some cases, 13 kinds of metallic phases including additional phases of α', β', and γ' are present. Further, it is empirically known that, as the number of additive elements increases, the metallographic structure becomes complicated, and a new phase or an intermetallic compound may appear. In addition, it is also empirically well known that there is a large difference in the constitution of metallic phases between what an equilibrium phase diagram shows and that of an alloy actually manufactured. Further, it is well known that the compositions of these phases change depending on the concentrations of Cu, Zn, Si, and the like in a copper alloy and processing heat history.

Incidentally, in Cu—Zn—Pb alloys including Pb, the Cu concentration is about 60 mass % whereas in all the Cu—Zn—Si alloys described in Patent Documents 2 to 9, the Cu concentrations are 65 mass % or higher, and a reduction in the concentration of expensive Cu is desired from a viewpoint of economic efficiency.

In Patent Document 10, Sn and Al are indispensably contained in a Cu—Zn—Si alloy in order to obtain excellent corrosion resistance, and a large amount Pb, or Bi is also required in order to realize excellent machinability.

Patent Document 11 discloses copper alloy castings free of Pb having a Cu concentration of about 65 mass % or higher and good castability and mechanical strength in which machinability is improved by γ phase, and describes examples containing large amounts of Sn, Mn, Ni Sb, and B.

In addition, for conventional leaded free-cutting copper alloys, it is expected that high-speed machining such as turning or drilling can be performed without troubles for at least 24 hours, and without replacement of cutting tool or adjustment such as polishing of cutting edge for 24 hours. Although depending on the degree of difficulty of machining, the same level of machinability is expected for alloys containing a significantly reduced amount of Pb.

Now, in Patent Document 5, the Cu—Zn—Si alloy includes Fe, and Fe and Si form an intermetallic compound of Fe—Si which is harder and more brittle than γ phase. This intermetallic compound has problems like reducing tool life of a cutting tool during machining and generation of hard spots during polishing impairing the external appearance. In addition, since Fe combines with Si which is an additive element and Si is thus consumed as an intermetallic compound, the performance of the alloy deteriorates.

In addition, in Patent Document 6, Sn, Fe, Co, and Mn are added to a Cu—Zn—Si alloy. However, Fe, Co, and Mn all combine with Si to form a hard and brittle intermetallic compound. Therefore, such addition causes problems during machining or polishing as disclosed by Patent Document 5.

PRIOR ART DOCUMENTS

Patent Document

Patent Document 1: PCT International Publication No. WO2008/081947
Patent Document 2: Japanese Unexamined Patent Application, First Publication No. 2000-119775
Patent Document 3: Japanese Unexamined Patent Application, First Publication No. 2000-119774
Patent Document 4: PCT International Publication No. WO2007/034571
Patent Document 5: Published Japanese Translation No. 2016-511792 of the PCT International Publication
Patent Document 6: Japanese Unexamined Patent Application, First Publication No. 2004-263301
Patent Document 7: PCT International Publication No. WO2012/057055
Patent Document 8: Japanese Unexamined Patent Application, First Publication No. 2013-104071
Patent Document 9: PCT International Publication No. WO2019/035225
Patent Document 10: Japanese Unexamined Patent Application, First Publication No. 2018-048397
Patent Document 11: Published Japanese Translation No. 2019-508584 of the PCT International Publication
Patent Document 12: PCT International Publication No. WO2005/093108
Patent Document 13: U.S. Pat. No. 4,055,445
Patent Document 14: Japanese Unexamined Patent Application, First Publication No. 2016-194123

Non-Patent Document

Non-Patent Document 1: Genjiro MIMA, Masaharu HASEGAWA, Journal of the Japan Copper and Brass Research Association, 2 (1963), p. 62 to 77

DISCLOSURE OF INVENTION

Problems to be Solved by the Invention

The present invention has been made in order to solve the above-described problems in the conventional art, and an object thereof is to provide a free-cutting copper alloy having excellent hot workability, a high strength, and a good balance between strength and ductility, whose Pb content has been significantly reduced, and a method for producing the free-cutting copper alloy.

In this specification, unless otherwise specified, a hot worked material includes a hot extruded material, a hot forged material, and a hot rolled material. Cold workability refers to performance of cold working such as drawing, wire drawing, rolling, crimping, or bending. Drilling refers to making holes with a drill. Unless otherwise specified, excellent machinability refers to low cutting resistance and good or excellent chip breakability during turning with a lathe or drilling. Conductivity refers to electric conductivity and thermal conductivity.

In addition, β phase includes β' phase, γ phase includes γ' phase, and α phase includes α' phase. Cooling rate refers to the average cooling rate in a given temperature range. "Particles mainly composed of Bi" refers to particles that contain both Bi and Pb (particles of an alloy comprising Bi and Pb) where concentration of Bi exceeds 30 mass %, which is sometimes denominated as Bi particles. 24 hours refer to one day. P-containing compound is a compound including P and at least either Si or Zn or both Si and Zn, in some cases, further including Cu and/or inevitable impurities such as Fe, Mn, Cr, or Co. A P-containing compound can be a compound such as P—Si, P—Si—Zn, P—Zn, or P—Zn—Cu. P-containing compound also refers to a compound including P, Si, and Zn.

Solutions for Solving the Problems

As a result of diligent study conducted to solve the above-described problems and to achieve the above-described object, the present inventors obtained the following findings.

Patent Document 4 discloses that in Cu—Zn—Si alloys, β phase contributes little to machinability. In fact, it rather inhibits machinability. Patent Documents 2 and 3 recite that when β phase is present, β phase is changed into γ phase by heat treatment. In Patent Documents 7, 8, and 9, also, the amount of β phase is significantly limited. In Patent Documents 1 and 12, in order to give excellent dezincification corrosion resistance to a Cu—Zn—Sn—Bi alloy, β phase, which has poor corrosion resistance, is limited. Patent Document 14 discloses that in order to improve dezincification corrosion resistance of β phase, it is necessary that Sn and Si are contained, that hot extrusion is performed at a temperature of 700° C. or higher, and that heat treatment is performed at a holding temperature of 400° C. to 600° C. and with an average cooling rate of 0.2° C./sec to 10° C./sec for the temperature range from 400° C. to 200° C.

First, the present inventors diligently studied β phase that had been known to have no effect on machinability of a Cu—Zn—Si alloy in the conventional art and ascertained a composition of β phase that has a large effect on machinability. That is, β phase of a Cu—Zn—Si alloy made by adding an appropriate amount of Si to appropriate amounts of Cu and Zn, exhibited remarkably improved machinability compared with Si-free β phase.

However, there still was a significant difference in machinability between Si-containing β phase and a free-cutting brass including 3 mass % Pb in terms of chip breakability and cutting resistance.

Then it was found that there were some ways to make a further improvement in the metallographic structure for the solution of the problem.

One way was to further add P and have it solid solubilize in β phase and have a compound including P and Si and/or Zn having a size of about 0.5 to 3 μm (for example, P—Si, P—Si—Zn, P—Zn, or P—Zn—Cu) precipitate in β phase of a Cu—Zn—Si alloy including an appropriate amount of Si in order to improve the machinability (machining performance, machinability-improvement function) of β phase itself. As a result, the machinability of β phase improved more. However, p phase with improved machinability has poor ductility and toughness. In order to improve ductility without impairing the machinability of β phase, the amounts of β phase and α phase were controlled to appropriate levels, and distributions of α phase and β phase, and shapes of crystal grains of α phase were controlled.

A more important improvement point is improvement of machinability of α phase having poor machinability. When a Cu—Zn—Si alloy includes Bi, Bi particles having a dimension of about 0.2 to 3 μm can be caused to be preferentially present in α phase. As a result, it was found that the machinability of α phase improves and the machinability of the alloy significantly improves.

As described above, it was found that, by including β phase whose machinability is improved by including Si, a phase whose machinability is improved by the presence of Bi, and a very small amount of Pb, the machinability of the alloy can be improved. Of course, by solid-solubilizing in β phase such that P-containing compound is present, the machinability of the alloy further improves. Thus, the free-cutting copper alloy according to the present invention having free-cutting characteristics that are comparable to those of a conventional copper alloy including a large amount of Pb, was invented by having the alloy include a small amount of γ phase in some cases.

A free-cutting copper alloy according to the first aspect of the present invention includes: higher than 57.5 mass % and lower than 64.5 mass % of Cu; higher than 0.20 mass % and lower than 1.20 mass % of Si; higher than 0.001 mass % and lower than 0.20 mass % of Pb; higher than 0.10 mass % and lower than 1.00 mass % of Bi; and higher than 0.001 mass % and lower than 0.20 mass % of P, with the balance being Zn and inevitable impurities, wherein among the inevitable impurities, the total content of Fe, Mn, Co, and Cr is lower than 0.45 mass % and the total content of Sn and Al is lower than 0.45 mass %, when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $$56.3 \leq f1 = [Cu] - 4.8 \times [Si] + 0.5 \times [Pb] + 0.5 \times [Bi] - 0.5 \times [P] \leq 59.5 \text{ and}$$

$$0.12 \leq f2 = [Pb] + [Bi] < 1.0$$

are satisfied, in constituent phases of a metallographic structure excluding non-metallic inclusions, when an area ratio of α phase is represented by (α) %, an area ratio of γ phase is represented by (γ) %, and an area ratio of β phase is represented by (β) %, relationships of $$20 \leq f3 = (\alpha) \leq 85,$$

$$15 \leq f4 = (\beta) \leq 80,$$

$$0 \leq f5 = (\gamma) < 4,$$

$$8.5 \leq f6 = ([Bi]+[Pb])^{1/2} \times 10 + [P]^{1/2} \times 6 + (\beta)^{1/2} \times [Si]^{1/2} \times 0.8 + (\gamma)^{1/2} \times 0.5 \leq 18.0, \text{ and}$$

$$0.45 \leq f7 = (([Bi]+[Pb])^{1/2} - 0.05) \times ((\beta)^{1/2} - 3) \times ([Si]^{1/2} - 0.2)) \leq 3.6$$

are satisfied, and particles mainly composed of Bi are present in α phase.

A free-cutting copper alloy according to the second aspect of the present invention includes: higher than or equal to 58.5 mass % and lower than or equal to 64.0 mass % of Cu; higher than 0.35 mass % and lower than 1.15 mass % of Si; higher than or equal to 0.003 mass % and lower than or equal to 0.095 mass % of Pb; higher than or equal to 0.12 mass % and lower than or equal to 0.49 mass % of Bi; and higher than or equal to 0.010 mass % and lower than or equal to 0.15 mass % of P, with the balance being Zn and inevitable impurities, wherein among the inevitable impurities, the total content of Fe, Mn, Co, and Cr is 0.35 mass % or lower and the total content of Sn and Al is 0.35 mass % or lower, when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $$56.8 \leq f1 = [Cu] - 4.8 \times [Si] + 0.5 \times [Pb] + 0.5 \times [Bi] - 0.5 \times [P] \leq 59.0 \text{ and}$$

$$0.15 \leq f2 = [Pb] + [Bi] < 0.50$$

are satisfied, in constituent phases of a metallographic structure excluding non-metallic inclusions, when an area ratio of α phase is represented by (α) %, an area ratio of γ phase is represented by (γ) %, and an area ratio of β phase is represented by (β) %, relationships of $$28 \leq f3 = (\alpha) \leq 75,$$

$$25 \leq f4 = (\beta) \leq 72,$$

$$0 \leq f5 = (\gamma) < 2,$$

$$10.0 \leq f6 = ([Bi] + [Pb])^{1/2} \times 10 + [P]^{1/2} \times 6 + (\beta)^{1/2} \times [Si]^{1/2} \times 0.8 + (\gamma)^{1/2} \times 0.5 \leq 16.0, \text{ and}$$

$$0.6 \leq f7 = (([Bi] + [Pb])^{1/2} - 0.05) \times ((\beta)^{1/2} - 3) \times ([Si]^{1/2} - 0.2)) \leq 2.4$$

are satisfied, particles mainly composed of Bi are present in α phase, and P-containing compounds are present in β phase.

A free-cutting copper alloy according to the third aspect of the present invention is the free-cutting copper alloy according to the first or second aspect of the present invention in which electrical conductivity is 15% IACS or higher and at least tensile strength S (N/mm²) is 430 N/mm² or higher, and f8=S×(100+E)/100 representing the balance between the tensile strength S and elongation E (%) is 580 or higher.

The free-cutting copper alloy according to the third aspect of the present invention may be a hot worked material, a material obtained by performing cold working on a hot worked material, or a material on which hot working, annealing, and cold working are performed.

A free-cutting copper alloy according to the fourth aspect of the present invention is the free-cutting copper alloy according to any one of the first to third aspects of the present invention, which is used for an automobile component, an electrical or electronic apparatus component, a mechanical component, a stationery, a toy, a sliding component, a measuring component, a precision mechanical component, a medical component, a drink-related device or component, a device or component for water drainage, or an industrial plumbing component.

A method for producing a free-cutting copper alloy according to the fifth aspect of the present invention is a method for producing the free-cutting copper alloy according to any one of the first to fourth aspects of the present invention, including one or more hot working steps, wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

A method for producing a free-cutting copper alloy according to the sixth aspect of the present invention is the method for producing a free-cutting copper alloy according to the fifth aspect of the present invention, further including one or more steps selected from a cold working step, a straightness correction step, and an annealing step.

A method for producing a free-cutting copper alloy according to the seventh aspect of the present invention is the method for producing a free-cutting copper alloy according to either the fifth or sixth aspect of the present invention, further including a low-temperature annealing step that is performed after the final step among the hot working step, the cold working step, the straightness correction step, and the annealing step, wherein in the low-temperature annealing step, holding temperature is 250° C. or higher and 430° C. or lower, and holding time is 10 minutes or longer and 200 minutes or shorter.

Effects of Invention

According to one aspect of the present invention, a free-cutting copper alloy having excellent hot workability, a high strength, and a good balance between strength and ductility, and containing a significantly reduced amount of lead, and a method for producing the free-cutting copper alloy can be provided.

EMBODIMENTS FOR CARRYING OUT THE INVENTION

Figure 1:
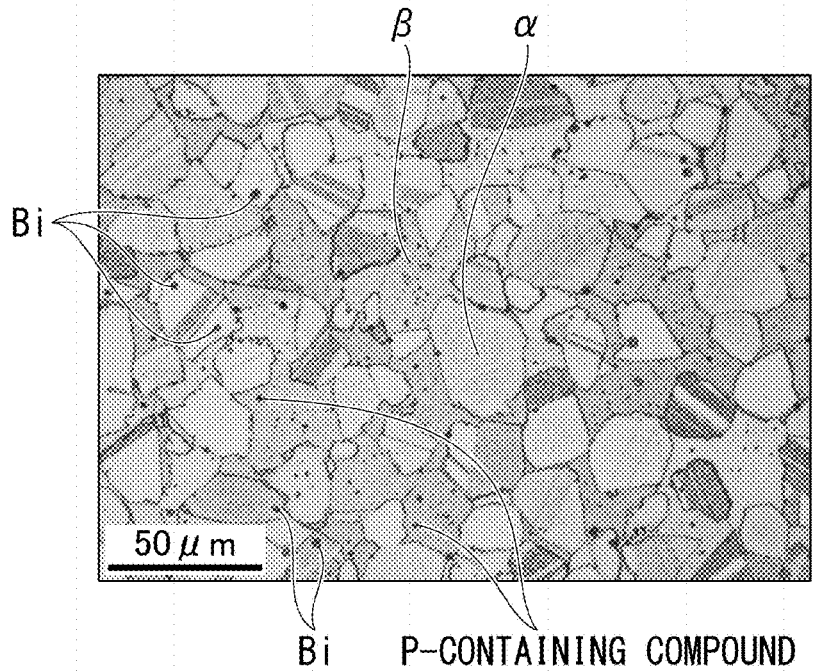
FIG. 1 is a picture showing a structure of a free-cutting copper alloy according to an embodiment of the present invention.

Below is a description of free-cutting copper alloys according to embodiments of the present invention and methods for producing the free-cutting copper alloys.

Free-cutting copper alloys according to embodiments of the present invention are used for automobile components, electrical or electronic apparatus components, mechanical components, stationeries, toys, sliding components, measuring instrument components, precision mechanical components, medical components, drink-related devices and components, devices and components for water drainage, and industrial plumbing components. Specifically, the alloys are used for valves, faucet fittings, faucets, joints, gears, screws, nuts, sensors, pressure vessels and the like that are used as automobile component, electrical or electronic component, home appliance component, mechanical component, or device or component that comes in contact with liquid or gas such as drinking water, industrial water, and hydrogen.

Here, in this specification, an element symbol in parentheses such as [Zn] represents the content (mass %) of the element.

In embodiments of the present invention, using this content expressing method, composition relational expressions f1 and f2 are defined as follows.

Composition relational expression f1=[Cu]−4.8×[Si]+0.5×[Pb]+0.5×[Bi]−0.5×[P]

Composition relational expression f2=[Pb]+[Bi]

Further, in the embodiments, in constituent phases of the metallographic structure excluding non-metallic inclusions, area ratio of α phase is represented by (α) %, area ratio of β phase is represented by (13) %, and area ratio of γ phase is represented by (γ) %. Area ratio of each of the phases will also be referred to as "amount of each of the phases", "proportion of each of the phases", or "proportion that each of the phases occupies". In the embodiments, a plurality of metallographic structure relational expressions and composition and metallographic structure relational expressions are defined as follows.

Metallographic Structure Relational Expression
f3=(α)

Metallographic Structure Relational Expression
f4=(β)

Metallographic Structure Relational Expression
f5=(γ)

Composition and Metallographic Structure Relational Expression f6=([Bi]+[Pb])$^{1/2}$×10+[P]$^{1/2}$×6+(β)$^{1/2}$×[Si]$^{1/2}$×0.8+(γ)$^{1/2}$×0.5, Composition and Metallographic Structure Relational Expression f7=(([Bi]+[Pb])$^{1/2}$−0.05×(β)$^{1/2}$−3)×([Si])$^{1/2}$−0.2))

A free-cutting copper alloy according to the first embodiment of the present invention includes: higher than 57.5 mass % and lower than 64.5 mass % Cu; higher than 0.20 mass % and lower than 1.20 mass % Si; higher than 0.001 mass % and lower than 0.20 mass % Pb; higher than 0.10 mass % and lower than 1.00 mass % Bi; higher than 0.001 mass % and lower than 0.20 mass % P, with the balance being Zn and inevitable impurities. Among the inevitable impurities, the total content of Fe, Mn, Co, and Cr is lower than 0.45 mass % and the total content of Sn and Al is lower than 0.45 mass %. The composition relational expression f1 is in a range of 56.3 f1≤59.5, the composition relational expression f2 is in a range of 0.12≤f2<1.0, the metallographic structure relational expression f3 is in a range of 20≤f3=(α)≤85, the metallographic structure relational expression f4 is in a range of 15≤f4≤80, the metallographic structure relational expression f5 is in a range of 0≤f5<4, the composition and metallographic structure relational expression f6 is in a range of 8.5≤f6≤18.0, and the composition and metallographic structure relational expression f7 is in a range of 0.45≤f7≤3.6. Particles mainly composed of Bi are present in α phase.

A free-cutting copper alloy according to the second embodiment of the present invention includes: higher than or equal to 58.5 mass % and lower than or equal to 64.0 mass % Cu; higher than 0.35 mass % and lower than 1.15 mass % Si; higher than or equal to 0.003 mass % and lower than or equal to 0.095 mass % Pb; higher than or equal to 0.12 mass % and lower than or equal to 0.49 mass % Bi; higher than or equal to 0.010 mass % and lower than or equal to 0.15 mass % P, with the balance being Zn and inevitable impurities. Among the inevitable impurities, the total content of Fe, Mn, Co, and Cr is 0.35 mass % or lower and the total content of Sn and Al is 0.35 mass % or lower. The composition relational expression f1 is in a range of 56.8≤f1≤59.0, the composition relational expression f2 is in a range of 0.15≤f2<0.50, the metallographic structure relational expression f3 is in a range of 28≤f3≤75, the metallographic structure relational expression f4 is in a range of 25≤f4≤72, the metallographic structure relational expression f5 is in a range of 0≤f5<2, the composition and metallographic structure relational expression f6 is in a range of 10.0≤f6≤16.0, and the composition and metallographic structure relational expression f7 is in a range of 0.6≤f7≤2.4. Particles mainly composed of Bi are present in α phase, and P-containing compounds are present in β phase.

Here, it is preferable that a free-cutting copper alloy according to the first or second embodiment of the present invention is a hot worked material, a material obtained by performing cold working on a hot worked material, or a material on which hot working, annealing, and cold working are performed, in which electrical conductivity is 15% IACS or higher, at least tensile strength S (N/mm$^2$) is 430 N/mm$^2$ or higher, and characteristic relational expression f8=S×(100+E)/100 representing the balance between tensile strength S and elongation E (%) is 580 or higher.

The reasons why the component composition, the composition relational expressions f1 and f2, the metallographic structure relational expressions f3, f4, and f5, the composition and metallographic structure relational expressions f6 and f7, the characteristic relational expression f8, and the like are defined as described above are explained below.

<Component Composition>

(Cu)

Cu is a main element of an alloy according to an embodiment of the present invention. In order to achieve the object of the present invention, it is necessary to contain Cu in an amount exceeding 57.5 mass % at least. When the Cu content is 57.5 mass % or lower, the proportion of β phase exceeds 80% although depending on the contents of Si, Zn, P, Pb, and Bi, and the production process, and as a result, ductility of the material is poor. Accordingly, the lower limit of the Cu content is higher than 57.5 mass %, preferably 58.0 mass % or higher, more preferably 58.5 mass % or higher, and still more preferably 59.0 mass % or higher.

On the other hand, when the Cu content is 64.5 mass % or higher, the proportion of β phase decreases and the proportions of α phase and γ phase increase although depending on the contents of Si, Zn, P, Pb and Bi, and the production process. In some cases, β phase also appears. Accordingly, the Cu content is lower than 64.5 mass %, preferably 64.0 mass % or lower, and more preferably 63.5 mass % or lower. For a free-cutting brass bar containing about 3 mass % Pb, the Cu content range is defined to be between 56.0 mass % and 63.0 mass % by JIS standards, indicating that embodiments of the present invention satisfy conditions required in terms of economy.

(Si)

Si is a main element of a free-cutting copper alloy according to an embodiment of the present invention. Si contributes to formation of metallic phases such as κ phase, γ phase, μ phase, β phase, and ζ phase. Si improves the machinability, strength, deformability under high temperature, wear resistance, corrosion resistance, and stress corrosion cracking resistance, of an alloy according to an embodiment of the present invention.

In addition, due to inclusion of Si, machinability, in particular, that of β phase, improves and α phase and β phase are strengthened by solid-solubilization, which strengthen alloys. Inclusion of Si also affects ductility and toughness of alloy. When Si is included, the electrical conductivity of α phase decreases, but the electrical conductivity of alloy is improved by formation of β phase. Further, by containing Si, castability improves, hot deformation resistance reduces, and hot deformability improves.

In order to obtain excellent machinability as an alloy, obtain high strength, and improve castability and hot workability, it is necessary to include higher than 0.20 mass % Si. The Si content is preferably higher than 0.35 mass %, more preferably higher than 0.50 mass %, and still more preferably 0.70 mass % or higher. That is, the higher the Si concentration in the alloy, the higher the Si concentration in β phase, and the more the machinability and the strength improve.

Regarding hot workability, by including Si, the hot deformability of α phase and β phase improves in a temperature range exceeding 500° C., and hot deformation resistance lowers. As a result, the hot deformability of the alloy improves, and deformation resistance lowers.

Incidentally, when a Cu—Zn alloy composed of α phase and β phase includes Si in an amount higher than 0.20 mass %, Bi particles come to be present in α phase. Further, when a large amount of Si is included, specifically, in an amount exceeding 0.35 mass %, or further, exceeding 0.50 mass %, the likelihood that Bi particles are present in α phase increases. When the temperature of the copper alloy including Bi during cooling as part of a casting process, during hot working, or after hot working is about 270° C. or higher, Bi in the alloy is present in a liquid state (molten state). In a Cu—Zn—Bi alloy composed of α phase and β phase containing no Si, Bi particles are mainly present at α phase boundary between α phase and β phase or in β phase. For this reason, Si does not contribute to improvement of the machinability of α phase. As Si is present at α phase boundary between α phase and β phase, ductility, castability, hot workability, and cold workability are adversely affected. In embodiments of the present invention, the machinability of α phase can be improved since Bi particles can be present in α phase due to an action of Si, which leads to improvement of other properties.

On the other hand, when the Si content is excessive, the amount of γ phase is excessive. In some cases, κ phase or β phase appears. γ phase improves the machinability of alloy but deteriorates alloy's ductility because its ductility and toughness are lower than those of β phase. When the amount of γ phase is excessive, the alloy's machinability is worsened instead of improved, and the thrust in drilling deteriorates. An increase in the amount of Si (increase of Si content) deteriorates the electrical conductivity of the alloy. In the embodiments, since excellent machinability, high strength, excellent ductility, and electrical components and the like are targeted, obtaining conductivity is also aimed at. Accordingly, the upper limit of the Si content is lower than 1.20 mass %, preferably lower than 1.15 mass %, and more preferably 1.10 mass % or lower. Although depending on the production process, the Cu concentration, and the amount of inevitable impurities, when the Si content is lower than about 1.0 mass %, γ phase is no longer present. However, by increasing the proportion of β phase and including small amounts of Bi and Pb, excellent machinability can be secured, and the balance between strength and ductility becomes excellent.

β phase formed by including Cu, Zn, and Si in the above-described content ranges has excellent machinability. Since Si is preferentially distributed in β phase, Si exhibits its effect even if its content is small. In addition, if Si is added to a Cu—Zn alloy in an amount exceeding a predetermined level, particles mainly composed of Bi (hereinafter, referred to as "Bi particles") are likely to be present in α phase, and the machinability of a phase having poor machinability can be improved by the particles. Examples of composition of β phase having excellent machinability include a composition including about 59 mass % Cu, about 1 mass % Si, and about 40 mass % Zn. Examples of composition of α phase include a composition of about 67 mass % Cu, about 0.6 mass % Si, and about 32 mass % Zn. Machinability of α phase of an alloy having a composition that falls within a composition range of an embodiment of the present invention is also improved by including Si, but the degree of the improvement is far less than that of β phase. By causing Bi particles which can improve machinability to be present in α phase, the machinability of α phase improves.

When a Cu—Zn binary alloy as a base alloy includes third and fourth elements and the contents of the third and fourth elements increase or decrease, the properties and characteristics of β phase change. As described in Patent Documents 2 to 5, β phase present in an alloy including about higher than or equal to 69 mass % Cu, about higher than or equal to 2 mass % Si, and Zn as the balance does not have the same properties or characteristics as β phase formed in an alloy, for example, an alloy including about 61 mass % Cu, about 0.8 mass % Si, and Zn as the balance. Further, when a large amount of inevitable impurities are included, the characteristics of β phase also change. In some cases, properties including machinability deteriorate. In the case of γ phase also, the characteristics of γ phase to be formed change when the amounts of main elements or the blending ratio between them are changed. Also, when a large amount of inevitable impurities are included, the characteristics of γ phase change. Further, even when the composition is the same, the kinds of phases to be present, their amounts, the amount of each element distributed in each phase changes depending on the production conditions such as temperature.

(Zn)

Zn is a main element of the free-cutting copper alloys according to an embodiment of the present invention together with Cu and Si, and is an element necessary to enhance machinability, strength, high temperature properties, and castability. Zn is described as the balance in the composition, but to be specific, its content is lower than about 42 mass % and preferably lower than about 41 mass % and higher than about 32 mass % (preferably higher than 33 mass %).

(Pb)

In embodiments of the present invention, machinability is improved by β phase including Si. By containing small amounts of Pb and Bi in addition to that, a high level of machinability is achieved. In a composition according to an embodiment of the present invention, about 0.001 mass % Pb is solid solubilized in the matrix, and Pb in excess of such amount is present in the form of Pb particles of about 0.1 to about 3 μm in diameter. Pb is effective in machinability improvement even when its content is very small. Specifically, Pb exhibits its effectiveness when contained in an amount exceeding 0.001 mass %. Pb content is preferably 0.003 mass % or more.

Apart from its machinability improvement effect, Pb is harmful to human body, is related to the metallographic structure, and affects alloys' ductility and cold workability, too. In embodiments of the present invention, it is naturally necessary to restrict Pb content since Bi, an element whose influence on human body is yet to be known, is contained as a main component. Therefore, the Pb content is less than 0.20 mass %, preferably 0.095 mass % or less, and more preferably 0.080 mass % or less. Incidentally, Pb and Bi are sometimes present alone apart from each other, but in many cases, they coexist (present in the form of an alloy of Bi and Pb). In particular, in many of the embodiments, Bi is contained more than Pb. Therefore, Pb and Bi are present in the form of particles mainly composed of Bi. Even when Bi and Pb are present together, their inherent machinability improvement effects are not impaired by the coexistence.

(Bi)

In embodiments of the present invention, the objective is to obtain a high level of machinability with the content of Pb, a substance that is harmful to human body, limited to less than 0.20 mass %. In the embodiments, the machinability of α phase is improved by Bi which is made to be present in α phase by an action of Si. That, in addition to β phase whose machinability is improved by Si and P, has enabled the alloy to obtain superb machinability. It has been known that the function of improving machinability that Bi has is poorer than that of Pb. However, in the embodiments, it was ascertained that Bi exhibits an equivalent or better effect compared with Pb. In addition, the amount necessary to be effective is small.

In order to improve the machinability of α phase, it is necessary that Bi particles are present in α phase and the likelihood of the presence of Bi particles is increased. In order to realize a high level of machinability, Bi needs to be contained in an amount of at least higher than 0.10 mass %. The Bi content is preferably 0.12 mass % or higher and more preferably 0.15 mass % or higher although it depends on the Pb content. If the composition and the metallographic structure are appropriately adjusted and higher than or equal to about 1.00 mass % Bi is contained, machinability that is more or less the same as that of C3604, a free-cutting brass bar containing about 3 mass % Pb, can be obtained. However, Bi particles are enlarged, and those having a diameter of more than 5 μm sometimes appear. As a result, the ductility and the strength of the alloy deteriorate, Bi's machinability improvement effect saturates, and cracking during casting becomes likely. In consideration of the influence on human body, the machinability improvement effect, the influence on various mechanical characteristics and castability, the Bi content is lower than 1.00 mass %, preferably 0.49 mass % or lower, and more preferably 0.39 mass % or lower. By making the composition such as the contents of Si and P or the amount of β phase and the requirements regarding metallographic structure (f1 to f7) more appropriate, even when the Bi content is 0.39 mass % or lower, or further, 0.29 mass % or lower, a high level of machinability can be achieved. Incidentally, Bi particles may be present outside of α phase, but even in such a case, Bi is still able to improve an alloy's machinability although its machinability improvement effect is weaker than that of Pb.

(P)

In a Cu—Zn—Si alloy comprising α phase and β phase, P is preferentially distributed in β phase. Regarding P, the machinability of β phase including Si can be improved more by solid-solubilization of P in β phase. Further, by containing P and adjusting the production process, P-containing compounds having an average diameter of about 0.3 to 3 μm are formed. Due to the compounds, in the case of turning, the three force components—principal cutting force, feed force, and thrust force decrease. In the case of drilling, the torque decreases among others. The three force components during turning, the torque during drilling, and the chip shape correlate to each other. The smaller the three force components and the torque, the more broken chips get.

P-containing compounds are not formed during hot working. P is mainly solid solubilized in β phase during hot working. In the process of cooling after hot working, P-containing compounds precipitate mainly in β phase at a certain critical cooling rate or lower. P-containing compounds precipitate in α phase, but not much. When observed with a metallographic microscope, precipitates including P appear to have a small granular shape having an average particle size of about 0.5 to 3 μm. β phase including such precipitate can obtain even better machinability. P-containing compound hardly affects the life of cutting tool and does not substantially impair the ductility or toughness of an alloy. Compound including Fe, Mn, Cr or Co and Si or P contributes to improvement of strength and wear resistance of an alloy, but consumes Si and P in the alloy, causes the cutting resistance of the alloy to increase, deteriorates chip breakability, shortens the tool life, and impairs ductility of the alloy.

Regarding castings, at the stage of completion of solidification, P-containing compounds are not formed. They precipitate mainly in β phase during the process of cooling after casting when cooled at a certain critical cooling rate or lower for a certain critical temperature range.

In addition, when P is added together with Si, P also exhibits an effect of facilitating the presence of particles mainly composed of Bi in α phase, contributing to the improvement of α phase's machinability.

In order to exhibit the above-described effects, the lower limit of the P content is higher than 0.001 mass %, preferably 0.003 mass % or higher, more preferably 0.010 mass % or higher, and still more preferably 0.020 mass % or higher. If P is contained in an amount of 0.010 mass % or more, P-containing compounds become visible with a 500× metallographic microscope.

When P is contained in an amount of 0.20 mass % or more, precipitates enlarge and its machinability improving effect saturates. In addition, Si concentration in 1 phase decreases causing deterioration rather than improvement in machinability, ductility, and toughness. For this reason, P content is less than 0.20 mass %, preferably 0.15 mass % or less, and more preferably 0.10 mass % or less. Even when P content is less than 0.05 mass %, P precipitates in 1 phase, and a sufficient amount of P-containing compounds are formed.

Incidentally, take P-containing compound as an example, the component ratio in its composition gradually changes as the content of an element such as Mn, Fe, Cr, or Co that easily combines with Si or P increases. That is, P-containing compound having a significant effect of improving the machinability of β phase gradually changes into a compound having a less effect on machinability. Accordingly, at least the total content of Fe, Mn, Co, and Cr needs to be limited to less than 0.45 mass %, preferably 0.35 mass % or less.

(Inevitable Impurities Particularly Fe, Mn, Co, and Cr; Sn and Al)

Examples of the inevitable impurities in an embodiment of the present invention include Mn, Fe, Al, Ni, Mg, Se, Te, Sn, Co, Ca, Zr, Cr, Ti, In, W, Mo, B, Ag, and rare earth elements.

Conventionally, a free-cutting copper alloy, in particular, a free-cutting brass including about higher or equal to 30 mass % Zn is not mainly formed of quality raw material such as electrolytic copper or electrolytic zinc but is mainly formed of recycled copper alloy. In a subsequent step (downstream step, working step) in this field of art, machining is performed on almost all the parts and components, during which a large amount of copper alloy, accounting for 40 to 80% of the material, is disposed of. Examples of such disposed copper alloy include chips, mill ends, burrs, runners, and products having production defects. These disposed copper alloys are the main raw material. If cutting chips, mill ends, and the like are not properly separated, Pb, Fe, Mn, Si, Se, Te, Sn, P, Sb, As, Bi, Ca, Al, Zr, Ni, and/or rare earth elements mix in as part of a raw material from a leaded free-cutting brass, a free-cutting copper alloy not containing Pb but containing Bi or the like, a special brass alloy including Si, Mn, Fe, and Al, or other copper alloys. In addition, cutting chips include Fe, W, Co, Mo, and the like which originate from tools. Wasted materials include plated products, and thus Ni, Cr, and Sn mix in. In addition, Mg, Sn, Fe, Cr, Ti, Co, In, Ni, Se, and Te are mixed into pure copper-based scrap that is used instead of electrolytic copper. Brass-based scraps that are used instead of electrolytic copper or electrolytic zinc are often plated with Sn, resulting in contamination by a high concentration of Sn.

From a viewpoint of reuse of resources and costs, scraps including these elements are used as a raw material to the extent that there is no bad influence on the properties at least. In a leaded JIS free-cutting brass bar, C3604 (JIS H 3250) including about 3 mass % Pb as an essential element, Fe may be contained up to 0.5 mass % and Fe+Sn (the total content of Fe and Sn) may be contained up to 1.0 mass % as impurities. Also, in a leaded JIS standard brass casting (JIS H 5120), Pb is contained as an indispensable element in an amount of about 2 mass %, and aside from that, the upper limits of the remaining components are defined to be 0.8 mass % for Fe, 1.0 mass % or less for Sn, 0.5 mass % for Al, and 1.0 mass % or less for Ni. The total amount of Fe and Sn contained in C3604 which is available in the market is about 0.5 mass %. Fe or Sn may be contained in a free-cutting brass bar at a higher concentration.

Fe, Mn, Co, and Cr are solid-solubilized in α phase, β phase, and γ phase of a Cu—Zn alloy to a certain concentration. However, if Si is present then, Fe, Mn, Co, and Cr are likely to compound with Si. In some cases, Fe, Mn, Co, and Cr may combine with Si potentially resulting in consumption of Si, an element that is effective for machinability. Fe, Mn, Co, or Cr that is compounded with Si forms a Fe—Si compound, an Mn—Si compound, a Co—Si compound, or a Cr—Si compound in the metallographic structure. Since these intermetallic compounds are extremely hard, cutting resistance increases, and the tool life decreases. Therefore, the content of each of Fe, Mn, Co, and Cr is required to be limited and is preferably lower than 0.30 mass %, more preferably lower than 0.20 mass %, and still more preferably 0.15 mass % or lower. In particular, the total content of Fe, Mn, Co, and Cr is required to be limited to lower than 0.45 mass % and is preferably 0.35 mass % or lower, more preferably 0.25 mass % or lower, and still more preferably 0.20 mass % or lower.

On the other hand, Sn and Al mixed in from free-cutting brass, plated waste products, or the like promote formation of γ phase in an alloy according to an embodiment of the present invention, which is seemingly effective for machinability. However, Sn and Al change the inherent characteristics of γ phase comprising Cu, Zn, and Si. In addition, larger amounts of Sn and Al are distributed in β phase than in α phase and change characteristics of 3 phase. As a result, the alloy's ductility, toughness, or machinability may deteriorate. Therefore, it is necessary to limit the contents of Sn and Al, too. The Sn content is preferably lower than 0.40 mass %, more preferably lower than 0.30 mass %, and still more preferably 0.25 mass % or lower. The Al content is preferably lower than 0.20 mass %, more preferably lower than 0.15 mass %, and still more preferably 0.10 mass % or lower. In particular, from a viewpoint of influence on machinability and ductility, the total content of Sn and Al is required to be limited to lower than 0.45 mass %, preferably to 0.35 mass % or lower, more preferably to 0.30 mass % or lower, and still more preferably to 0.25 mass % or lower.

As other main inevitable impurity elements, empirically speaking, in many cases, Ni often mixes in from scraps of plated products and the like, but the influence of Ni on properties is less than that of Fe, Mn, Sn and the like. Even if a small amount of Fe or Sn mixes in, as long as the amount of Ni is lower than 0.3 mass %, the influence on the properties is limited. It is more preferable if Ni content is 0.2 mass % or less. It is not necessary to particularly limit the content of Ag because Ag is commonly regarded as Cu and does not substantially affect various properties of an alloy. Yet, the Ag content is preferably lower than 0.1 mass %. Te and Se themselves have machinability, and contamination by a large amount of Te or Se may occur although it is rare. In consideration of influence on ductility or impact resistance, each content of Te and Se is preferably lower than 0.2 mass %, more preferably 0.05 mass % or lower, and still more preferably 0.02 mass % or lower. In addition, corrosion-resistant brass includes As and/or Sb in order to improve its corrosion resistance. In consideration of influence on ductility and impact resistance, the contents of As and Sb are preferably lower than 0.05 mass % and preferably 0.02 mass % or lower, respectively.

The content of each of the other elements, specifically, Mg, Ca, Zr, Ti, In, W, Mo, B, and rare earth elements is preferably lower than 0.05 mass %, more preferably lower than 0.03 mass %, and still more preferably lower than 0.02.

The content of the rare earth elements refers to the total content of one or more of the following elements: Sc, Y, La, Ce, Pr, Nd, Pm, Sm, Eu, Gd, Tb, Dy, Ho, Er, Tm, Yb, and Lu.

The total content of these inevitable impurities is preferably lower than 1.0 mass %, more preferably lower than 0.8 mass %, and still more preferably lower than 0.7 mass %.

(Composition Relational Expression f1)

The composition relational expression $f1=[Cu]-4.8\times[Si]+0.5\times[Pb]+0.5\times[Bi]-0.5\times[P]$ is an expression indicating a relationship between the composition and the metallographic structure. Even when the amount of each of the elements is within the range defined above, unless this composition relational expression f1 is not satisfied, the properties targeted in embodiments of the present invention cannot be obtained. When the composition relational expression f1 is lower than 56.3, the proportion of β phase increases, and ductility deteriorates even if the production process is modified. Accordingly, the lower limit of the composition relational expression f1 is 56.3 or higher, preferably 56.8 or higher, and more preferably 57.0 or higher. As the composition becomes more preferable within the defined range of the composition relational expression f1, the proportion of α phase increases, excellent machinability can be maintained, and good ductility, cold workability, impact resistance, and corrosion resistance can be obtained.

On the other hand, the upper limit of the composition relational expression f1 affects the proportion of β phase, the proportion of γ phase, and the range of temperature at which the alloy solidifies. When the composition relational expression f1 is higher than 59.5, the proportion of 1 phase decreases, and excellent machinability cannot be obtained. At the same time, the proportion of γ phase increases, ductility decreases, and strength also decreases. Then, the solidification temperature range exceeds 25° C. and defects peculiar to castings such as porous shrinkage cavity and recess are more likely to appear. Accordingly, the upper limit of the composition relational expression f1 is 59.5 or lower, preferably 59.0 or lower, more preferably 58.5 or lower, and still more preferably 58.0 or lower.

In addition, the composition relational expression f1 also deeply relates to hot workability performed at about 600° C. When the composition relational expression f1 is lower than 56.3, a problem occurs in hot deformability. When the composition relational expression f1 is higher than 59.5, hot deformation resistance increases, and performing hot working at 600° C. becomes difficult. In addition, hot deformability deteriorates.

A free-cutting copper alloy according to an embodiment of the present invention has machinability, a property that requires a kind of brittleness obtained by decreasing cutting resistance so that finely broken chips are generated, and good ductility, which is completely opposite to machinability. By discussing not only the composition but also the composition relational expressions f1 and f2, the metallographic structure relational expressions f3 to f5, and the composition and metallographic structure relational expressions f6 and f7 in detail, an alloy more suitable for the purpose and intended use of the alloy can be provided.

Sn, Al, Cr, Co, Fe, Mn, and inevitable impurities, that are separately defined, are not defined by the composition relational expression f1 because their influence on the composition relational expression f1 is small if the content is within the range that can be treated as inevitable impurities.

(Composition Relational Expression f2)

In embodiments of the present invention, obtaining a higher level of machinability is targeted. Bi mainly acts for improving the machinability of α phase, and its machinability improvement effect is higher than or equal to that of Pb. In order to represent the effect of improving machinability in a concise manner, it is not sufficient to define Bi and Pb individually. Therefore, these elements are defined with a composition relational expression f2=[Pb]+[Bi].

In order to obtain a high level of machinability, at least f2 needs to be 0.12 or higher, preferably 0.15 or higher, and more preferably 0.20 or higher. Regarding the upper limit of f2, the higher the value of f2, the better the machinability. By appropriately adjusting the composition and the metallographic structure, if the f2 value is 1.0, machinability that is largely equivalent to that of C3604, a free-cutting brass bar containing 3 mass % Pb, can be obtained. On the other hand, Pb is harmful to human body, and the effect of Bi on human body is unknown. Therefore, it is necessary to limit the total content of Pb and Bi. In addition, as the value of f2 increases, specifically, when f2 is 1.0 or higher, ductility and impact resistance deteriorate, and strength also decreases. Further, the effect of improving machinability starts to saturate, and castability-related problem occurs. For example, cracking becomes more likely during casting. Accordingly, f2 needs to be lower than 1.0, and, by more appropriately adjusting the composition and the metallographic structure, even when f2 is lower than 0.70 or 0.50, more preferably lower than 0.40, a high level of machinability can be obtained. And, as the value of f2 decreases, ductility, impact resistance, and castability improve. Further, by making the requirements of the composition and the metallographic structure more appropriate in consideration of the influence on human body, even when the value of f2 is 0.30 or lower, the alloy can obtain a high level of machinability.

(Comparison with Patent Documents)

Here, the results of comparison between the compositions of the Cu—Zn—Si alloys described in Patent Documents 1 to 14 and the compositions of alloys according to embodiments of the present invention are shown in Tables 1 and 2.

The embodiments and the alloys disclosed by Patent Documents 1 and 12 are different from each other in the Sn content, and a large amount of Bi is required in effect.

The embodiments and the alloys disclosed by Patent Documents 2 to 9 are different from each other in the contents of Cu and Si, the main elements of the alloys. In Patent Documents 2 to 11, a large amount of Cu is required.

In Patent Documents 2 to 4 and 7 to 9, β phase is depicted as a metallic phase that is not preferable in a metallographic structure because it impairs machinability. It is also disclosed that when β phase is present, it is preferable that β phase is changed into γ phase having excellent machinability through a heat treatment.

In Patent Documents 4 and 7 to 9, in which an allowable amount of β phase is described, the maximum area ratio of β phase is 5%.

In Patent Document 10, the content of each of Sn and Al is at least 0.1 mass % or higher in order to improve dezincification corrosion resistance, and large amounts of Pb and Bi need to be included in order to obtain excellent machinability.

Patent Document 11 describes a copper alloy casting having corrosion-resistance which requires greater than or equal to 65 mass % Cu and has excellent mechanical characteristics and castability achieved by including Si and a small amount of Al, Sb, Sn, Mn, Ni, B, or the like.

Patent Document 13 does not disclose that P is contained.

Patent Document 14 discloses that Bi is not included, Sn is included in an amount of 0.20 mass % or higher, the material is held at a high temperature of 700° C. to 850° C., and subsequently hot extrusion is performed.

Further, none of these Patent Documents disclose or imply the essential requirements of the embodiments, specifically, β phase containing Si has excellent machinability, β phase is required at a proportion of at least 15% or higher, P is effective for improving the machinability of β phase, fine P-containing compounds are present in β phase, and particles mainly composed of Bi are present in α phase.

TABLE 1

|  | Cu | Si | P | Pb | Bi | Sn | Al | Others |
|---|---|---|---|---|---|---|---|---|
| First Embodiment | 57.5-64.5 | 0.20-1.20 | 0.001-0.20 | 0.001-0.20 | 0.10-1.00 | Sn + Al < 0.45, | | Fe + Mn + Cr + Co < 0.45 |
| Second Embodiment | 58.5-64.0 | 0.35-1.15 | 0.010-0.15 | 0.003-0.095 | 0.12-0.49 | Sn + Al ≤ 0.35, | | Fe + Mn + Cr + Co ≤ 0.35 |
| Patent Document 1 | 59.5-66.0 | — | — | — | 0.5-2.0 | 0.7-2.5 | — | — |
| Patent Document 2 | 69-79 | 2.0-4.0 | 0.02-0.25 | — | 0.02-0.4 | 0.3-3.5 | 0.1-1.5 | — |
| Patent Document 3 | 69-79 | 2.0-4.0 | 0.02-0.25 | 0.02-0.4 | 0.02-0.4 | 0.3-3.5 | 0.1-1.5 | — |
| Patent Document 4 | 71.5-78.5 | 2.0-4.5 | 0.01-0.2 | 0.005-0.02 | 0.01-0.2 | 0.1-1.2 | 0.1-2.0 | — |
| Patent Document 5 | 74.5-76.5 | 3.0-3.5 | 0.04-0.10 | 0.01-0.25 | 0.01-0.4 | 0.05-0.2 | 0.05-0.2 | Fe: 0.11-0.2 |

TABLE 1-continued

|  | Cu | Si | P | Pb | Bi | Sn | Al | Others |
|---|---|---|---|---|---|---|---|---|
| Patent Document 6 | 70-83 | 1-5 | 0.1 or less | — | — | 0.01-2 | — | Fe, Co: 0.01-0.3 Ni: 0.01-0.3 Mn: 0.01-0.3 |
| Patent Document 7 | 73.0-79.5 | 2.5-4.0 | 0.015-0.2 | 0.003-0.25 | — | 0.03-1.0 | 0.03-1.5 | — |
| Patent Document 8 | 73.5-79.5 | 2.5-3.7 | 0.015-0.2 | 0.003-0.25 | 0.003-0.30 | 0.03-1.0 | 0.03-1.5 | — |
| Patent Document 9 | 75.4-78.0 | 3.05-3.55 | 0.05-0.13 | 0.005-0.070 | 0.005-0.10 | 0.05 or less | 0.05 or less | — |
| Patent Document 10 | 55-75 | 0.01-1.5 | less than 0.15 | 0.01-4.0 | 0.01-4.0 | 0.1 or more | 0.1 or more | — |
| Patent Document 11 | 65-75 | 0.5-2.0 | — | — | — | 0.01-0.55 | 0.1-1.0 | — |
| Patent Document 12 | 61.0-63.0 | 0.05-0.30 | 0.04-0.15 | 0.01 or less | 0.5-2.5 | 1.5-3.0 | — | Sb: 0.02-0.10 |
| Patent Document 13 | — | 0.25-3.0 | — | — | — | — | — | — |
| Patent Document 14 | 60.0-66.0 | 0.01-0.50 | 0.15 or less | 0.05-0.50 | — | 0.20-0.90 | — | Fe: 0.60 or less |

TABLE 2

|  | Metallographic Structure |
|---|---|
| First Embodiment | $20 \leq \alpha \leq 85, 15 \leq \beta \leq 80, 0 \leq \gamma < 4$ |
| Second Embodiment | $28 \leq \alpha \leq 75, 25 \leq \beta \leq 72, 0 \leq \gamma < 2$ |
| Patent Document 1 | $\alpha + \gamma$ structure or $\alpha + \beta + \gamma$ structure |
| Patent Document 2 | $\gamma$ phase, in some cases, $\kappa$ phase is present. $\beta$ phase is turned into $\gamma$ phase by heat treatment. |
| Patent Document 3 | $\gamma$ phase, in some cases, $\kappa$ phase is present. $\beta$ phase is turned into $\gamma$ phase by heat treatment. |
| Patent Document 4 | $18\text{-}500\text{Pb} \leq \kappa + y + 0.3\mu - \beta \leq 56 + 500\text{Pb}, 0 \leq \beta \leq 5$ |
| Patent Document 5 | — |
| Patent Document 6 | — |
| Patent Document 7 | $30 \leq \alpha \leq 84, 15 \leq \kappa \leq 68, \beta \leq 3$, etc. |
| Patent Document 8 | $60 \leq \alpha \leq 84, 15 \leq \kappa \leq 40, \beta \leq 2$, etc. |
| Patent Document 9 | $29 \leq \kappa \leq 60, \beta = 0$, etc. $\kappa$ phase is present in $\alpha$ phase. |
| Patent Document 10 | — |
| Patent Document 11 | — |
| Patent Document 12 | — |
| Patent Document 13 | — |
| Patent Document 14 | — |

<Metallographic Structure>

In a Cu—Zn—Si alloy, 10 or more kinds of phases are present, and a complicated phase change occurs, and desired properties may not be necessarily obtained simply by satisfying the composition ranges and relational expressions of the elements. Eventually, by specifying and determining the kinds of metallic phases present in the metallographic structure and the area ratio ranges thereof, desired properties can be obtained. Accordingly, the metallographic structure relational expressions and composition and metallographic structure relational expressions are defined as follows.

$$20 \leq f3 = (\alpha) \leq 85$$

$$15 \leq f4 = (\beta) \leq 80$$

$$0 \leq f5 = (\gamma) < 4$$

$$8.5 \leq f6 = ([Bi]+[Pb])^{1/2} \times 10 + [P]^{1/2} \times 6 + (\beta)^{1/2} \times [Si]^{1/2} \times 0.8 + (\gamma)^{1/2} \times 0.5 \leq 18.0$$

$$0.45 \leq f7 = (([Bi]+[Pb])^{1/2} - 0.05) \times ((\beta)^{1/2} - 3) \times ([Si]^{1/2} - 0.2)) \leq 3.6$$

(γ Phase, Metallographic Structure Relational Expression f5)

As described in Patent Documents 2 to 9, γ phase is a phase that contributes most to machinability in a Cu—Zn—Si alloy in which the Cu concentration is about 69 mass % to 80 mass % and the Si concentration is about 2 mass % to 4 mass %. In embodiments of the present invention also, γ phase was confirmed to be contributing to machinability. However, it is necessary to drastically reduce γ phase in order to obtain a good balance between ductility and strength. Specifically, when the proportion of γ phase is 4% or higher, excellent ductility or toughness cannot be obtained. Even when the amount of γ phase is small, γ phase exhibits an effect of reducing the torque and improving chip breakability in drilling. However, when a large amount of γ phase is present, thrust resistance value for drilling increases. Providing that β phase is present at a proportion of 15% or higher (in terms of area ratio; hereinafter, the unit for the amount of phase shall be area ratio), the effect of γ phase on machinability corresponds to the value obtained by raising the amount of γ phase to the power of ½. When a small amount of γ phase is included, γ phase has a large effect on improving machinability. However, when the amount of γ phase is increased, the effect of improving machinability decreases. In consideration of ductility and cutting resistance in drilling and turning, the proportion of γ phase needs to be lower than 4%. Further, the amount of γ phase is preferably less than 2% and more preferably less than 1%. Even when γ phase is not present, that is, (γ)=0, excellent machinability can be obtained by causing β phase including Si to be present at a proportion described below and also causing the alloy to contain Pb and Bi.

(β Phase, Metallographic Structure Relational Expression f4)

In order to obtain excellent machinability with a limited amount of γ phase and without κ phase or μ phase, it is important to optimize the Si content, the blending ratio between Cu and Zn, the amount of β phase, and the amount of Si solid-solubilized in β phase. Incidentally, it should be noted that β phase includes β' phase.

β phase of an alloy whose composition falls within a composition range according to an embodiment of the present invention has lower ductility than α phase, but has much higher ductility than γ phase, α phase having poor ductility and toughness. Compared with the ductility of κ phase or β phase of a Cu—Zn—Si alloy, it has better ductility, too. Accordingly, from a viewpoint of ductility, a relatively large amount of β phase can be included. In addition, β phase can obtain excellent conductivity although it includes high concentrations of Zn and Si. The amounts of β phase and γ phase are significantly affected not only by the composition but also by the process.

In a Cu—Zn—Si—P—Pb—Bi alloy, a free-cutting copper alloy according to an embodiment of the present invention, in order to obtain excellent machinability while minimizing the contents of Bi and Pb, it is necessary that the amount of β phase is at least 15% or more, and the area ratio of β phase is preferably 20% or higher, more preferably 25% or higher, and still more preferably 30% or higher. Even when the amount of γ phase is 0%, if the amount of 1 phase is about 20% or more, excellent machinability can be obtained. In the case Bi is not contained, even when the proportion of β phase is about 50% and the proportion of α phase having poor machinability is about 50%, machinability can be maintained at a high level even compared with an alloy where the proportion of β phase including Si is 100%, and excellent ductility and strength can be obtained. For example, when β phase including about 1 mass % Si, in which P-containing compounds are preferably present, and soft α phase having excellent ductility coexist, it is presumed that soft α phase functions as some kind of a cushioning material, or α phase boundary between α phase and hard β phase makes an origin of chip breakage. Even when the amount of β phase is about 50%, excellent machinability that is inherent to β phase is retained. That is, low cutting resistance is maintained, and chip breakability improves in some cases.

Regarding mechanical characteristics, the strength of β phase is maintained by an increase in ductility and crystal grains that have become fine due to precipitation of α phase in a β single-phase state. The strength of β phase relates to the amount of Si solid-solubilized in β phase, and when higher than or equal to about 0.25 mass % Si is solid-solubilized in β phase, a high strength can be obtained. With respect to ductility, even if the amount of β phase is about 50%, or higher than about 50%, excellent ductility of α phase takes precedence and is maintained due to the action of α phase as a cushioning material. Yet, as the amount of β phase increases, ductility gradually deteriorates. In order to obtain excellent ductility and a good balance between strength and ductility, the proportion of β phase is required to be 80% or lower. The area ratio of β phase is preferably 72% or lower, more preferably 64% or lower. When ductility and cold workability are important, the proportion of β phase is preferably 60% or lower. The appropriate proportion of β phase slightly varies depending on the intended purpose of use and application.

Incidentally, β phase including about 1 mass % Si exhibits excellent hot deformability and low hot deformation resistance from a minimum level of hot working temperature of 500° C., and the alloy having such β phase exhibits excellent hot deformability and low hot deformation resistance.

(Si Concentration and Machinability of β Phase)

In a composition range of an embodiment of the present invention, the more the Si content solid-solubilized in β phase, the better the machinability. Further, the larger the amount of β phase, the better the machinability. The amount of Si solid-solubilized in β phase is preferably 0.25 mass % or higher, more preferably 0.5 mass % or higher, still more preferably 0.7 mass % or higher, and most preferably 1.0 mass % or higher. On the other hand, as the amount of Si solid-solubilized in β phase and the amount of β phase increase, the effect is gradually saturated. As a result of diligent study on the relationship between the Si concentration in the alloy, the amount of β phase, and the machinability of the alloy, it was revealed that, when Si concentration (mass %) is represented by [Si] for the purpose of convenience, the machinability of the alloy is well expressed by the value obtained by multiplying $(β)^{1/2}$, which is the amount of β phase (%) raised to the power of ½, by $[Si]^{1/2}$, which is the concentration of Si raised to the power of ½. That is, even when the same amount of β phase is contained, if the β phase has a higher concentration of Si, better machinability is obtained. When the Si concentrations are the same, the more the amount of β phase, the better the machinability. Providing that the Si concentration and the amount of β phase are within the ranges defined by an embodiment of the present invention, its machinability improvement effect can be represented by $(β)^{1/2} \times [Si]^{1/2}$.

(Composition and Metallographic Structure Relational Expressions f6 and f7)

The composition and metallographic structure relational expressions f6 and f7 are relational expressions involving requirements relating to composition and metallographic structure for obtaining generally excellent machinability, high strength, good ductility, and impact resistance, in addition to the composition relational expressions f1 and f2 and the metallographic structure relational expressions f3 to f5. Regarding machinability, f6 is an addition expression for obtaining machinability, and f7 is a relational expression representing the interaction and synergistic effect of machinability.

In a Cu—Zn—Si—P—Pb—Bi alloy according to an embodiment of the present invention, the machinability is affected by the total content of Pb and Bi (f2), the amount of β phase and the amount of Si and the amount of P (the amount solid-solubilized in β phase), the presence of P-containing compound, and the amount of γ phase. Therefore, their effects are added up. In consideration of the amounts of Pb and Bi and their influences on machinability, their effects on machinability can be reduced (represented) by the total amount of Pb and Bi raised to the power of ½. As stated above, the amounts of β phase and Si can be represented by $(β)^{1/2} \times [Si]^{1/2}$. Regarding the amount of γ phase, the effect on machinability can be obtained by raising the amount (%) of γ phase to the power of ½. Further, regarding the amount of P, in consideration of the presence of P-containing compounds, the effect on machinability can be reduced to the amount of P (mass %) raised to the power of ½. The coefficients of the respective terms were derived from the results of a series of diligent studies conducted regarding these contributing factors, and f6 was obtained by multiplying the respective terms by the coefficients. f6 is an addition expression which represents effect on machinability.

$$f6 = ([Bi]+[Pb])^{1/2} \times 10 + [P]^{1/2} \times 6 + (β)^{1/2} \times [Si]^{1/2} \times 0.8 + (γ)^{1/2} \times 0.5$$

In order to obtain excellent machinability, f6 is required to be at least 8.5 or higher, preferably 9.2 or higher, more preferably 10.0 or higher, and still more preferably 11.0 or higher. On the other hand, in consideration of the fact that the effect on machinability eventually saturates, the ductility, the strength, the cold workability, and the impact resistance of the alloy, the upper limit of f6 is 18.0 or lower, preferably 16.0 or lower, and more preferably 14.0 or lower from the viewpoint of reducing the term $([Bi]+[Pb])^{1/2}$.

On the other hand, in the interaction and synergistic effect regarding machinability, the product of the total content of Pb and Bi (f2), the amount of β phase, and the amount of Si is involved. In consideration of the facts that the total content of Pb and Bi from which an effect starts to appear is about 0.002 mass %, the amount of β phase from which it starts to exhibit an effect is about 9%, and the Si content from which it starts to exhibit an effect is about 0.04 mass %, the following relational expression is defined:

$$f7 = (([Bi]+[Pb])^{1/2} - 0.05) \times ((β)^{1/2} - 3) \times ([Si]^{1/2} - 0.2))$$

f7 is the product of the term of Pb and Bi, the term of β phase, and the term of Si. Therefore, if the value of any of these terms is excessively small, f7 cannot be satisfied. As a result of diligent study, in order to obtain a high level of machinability, f7 is required to be 0.45 or higher, preferably 0.6 or higher, more preferably 0.8 or higher, and still more preferably 1.0 or higher. When f7 exceeds 3.6, machinability improvement is capped, and the ductility, the strength, and the cold workability of the alloy deteriorate. Therefore, f7 is 3.6 or lower, preferably 3.0 or lower, and for the purpose of reducing the term of Pb+Bi, more preferably 2.4 or lower, and still more preferably 2.0 or lower.

Excellent machinability and various good mechanical characteristics cannot be obtained unless the addition expression f6 and the product expression f7 including the factors of the composition: ([Bi]+[Pb]), [Si], and [P], and the factors of the metallographic structure: (β) and (γ) are set in narrow ranges as described above, that is, the requirements of the composition and the requirements of the metallographic structure are appropriately adjusted, and both of the expressions are satisfied. In particular, by more appropriately adjusting the requirements of the composition excluding ([Bi]+[Pb]) and the requirements of the metallographic structure, ([Bi]+[Pb]) can be reduced. When f6 and f7 are within preferable ranges, higher machinability and various good mechanical characteristics can be obtained.

Incidentally, in the metallographic structure relational expressions f3 to f5 and the composition and metallographic structure relational expressions f6 and f7, α phase, β phase, γ phase, δ phase, ε phase, ζ phase, η phase, κ phase, μ phase, and χ phase are the subject metallic phases, and intermetallic compounds excluding P-containing compounds, Pb particles, Bi particles, particles mainly composed of Bi and Pb, oxides, non-metallic inclusions, non-melted materials, and the like are not the subjects, that is, they are excluded from the subjects of area ratio calculation. P-containing compounds are tiny with the average size of about 0.5 to 3.0 μm and mostly present in β phase or at a boundary between α phase and β phase. Therefore, P-containing compounds present in β phase or at a boundary between α phase and β phase are regarded as part of β phase. Should they be present in α phase although it is rare, such P-containing compounds are regarded as part of a phase. On the other hand, Intermetallic compounds that are formed by Si, P, and/or inevitably mixed-in elements (for example, Fe, Mn, Co, and Cr) are outside the scope of the calculation of the area ratios of metallic phases. In embodiments of the present invention, precipitates and metallic phases having a size that can be observed with a metallographic microscope having a magnification power of 500× or that can be distinguished and recognized with a metallographic microscope having a magnification power of about 1000× are the subjects of the area ratio calculation.

Accordingly, the minimum size of a precipitate or metallic phase that can be observed is about 0.5 μm. For example, γ phase having a size of 0.1 to 0.4 μm that is less than about 0.5 μm can be present in β phase. However, since such γ phase cannot be recognized with a metallographic microscope, it is regarded as β phase.

(α Phase, Metallographic Structure Relational Expression f3)

α phase is a main phase forming the matrix together with β phase or γ phase. α phase including Si improves machinability better than that without Si but only slightly. However, when the Si content is in a certain predetermined range, ductility is high. When β phase accounts for 100%, there is a problem in the ductility of the alloy. Therefore, an appropriate amount of α phase is required. It is considered that even if a β single-phase alloy comes to include a relatively large amount of α phase, for example, about 50% in terms of area ratio, α phase itself functions as a cushioning material, and β phase grains become fine due to presence of α phase such that phase boundaries between a phase and hard β phase become stress concentration source during machining. As a result, chips are broken, excellent machinability that a β single-phase alloy has is maintained, and machinability is improved in some cases.

As a result of a series of diligent studies, it was found that from a viewpoint of ductility of the alloy, the amount of α phase is required to be 20% or higher, preferably 28% or higher, and more preferably 36% or higher. On the other hand, in order to obtain a high level of machinability, the upper limit of the amount of α phase is at least 85% or lower, preferably 75% or lower, more preferably 70% or lower, and still more preferably 65% or lower. When the amount of α phase is large, the amount of β phase having improved machinability is small and Bi that improves the machinability of α phase, that is, a large amount of Bi particles are required to be present in α phase.

(Machinability, Mechanical Characteristics, Shape of α Phase, and Distribution of β Phase)

Regarding the shape and distribution of α phase and the distribution of β phase that affect the machinability and/or the mechanical characteristics of the alloy, when the shape of α phase crystal grains is acicular (an elliptical shape in which the longer side/shorter side ratio of a crystal grain is higher than 4), the dispersion of α phase deteriorates, and acicular α phase having a large longer side hinders machining. Accordingly, in a preferable embodiment of the present invention, when the proportion of granular crystal grains of α phase whose longer side/shorter side ratio is 4 or less is 50% or higher and preferably 75% or higher in all the α phase crystal grains, machinability is improved. To be exact, the proportion of granular crystal grains of α phase refers to the proportion calculated by dividing the number of granular crystal grains of α phase, in one visual field, whose longer side/shorter side ratio is 4 or lower, by the total number of α phase crystal grains in the same visual field, which can be expressed with: (the number of granular crystal grains of a phase whose longer side/shorter side ratio is 4 or lower/the total number of α phase crystal grains)×100. When the proportion of α phase having a large longer side exceeds 50%, ductility is substantially maintained, but the strength of the alloy decreases. Accordingly, when the proportion of granular α phase increases, the strength increases, and the balance between strength and ductility improves. Whether or not the proportion of granular crystal grains of α phase whose longer side/shorter side ratio is 4 or lower exceeds 50% or 75% is affected by not only the composition but also the production process. When the hot working temperature is high, the proportion of granular crystal grains of α phase whose longer side/shorter side ratio is 4 or lower is small.

Incidentally, in embodiments of the present invention, longer side and shorter side of crystal grain are measured by observing the crystal grain at a magnification of, for example, 500-fold and analyzing with an image analysis method. Specifically, assuming that a crystal grain has an elliptical shape, the longer side (major axis) refers to the longest line among the lines connecting any two points on the contour of the crystal grain, and the shorter side (minor axis) refers to the longest line among the lines drawn perpendicular to the longer side and severed by a grain boundary (the contour of the crystal grain).

(μ Phase, κ Phase, and Other Phases)

In order to obtain high ductility, toughness, and strength together with excellent machinability, presence of phases other than α, β, and γ phases is also important. In embodiments of the present invention, considering the properties of the alloy, κ phase, μ phase, δ phase, ε phase, ζ phase, or η phase is not required. When the sum of the constituent phases (α), (β), (γ), (μ), (κ), (δ), (ε), (ζ), and (η) that form the metallographic structure is represented by 100, it is preferable that (α)+(β)+(γ)>99, and it is most preferable that (α)+(β)+(γ)=100 providing that measurement error and number rounding (rounding off) are disregarded.

(Bi Particles (Particles Mainly Composed of Bi) Present in α Phase)

Machinability of a β single-phase alloy including Si and a β single-phase alloy in which P-containing compounds are present in addition to Si is close to that of a free-cutting brass including 3 mass % Pb but is yet to reach the same level. In order to obtain a high level of machinability, the machinability of α phase needs to be improved. In an alloy according to an embodiment of the present invention, by containing Si, Bi particles having an average particle size of about 0.3 to 3 μm are more likely to be present within α phase. By causing Bi particles to be present within α phase, the machinability of α phase significantly improves, and the machinability of the alloy can be significantly improved due to the effects of β phase having improved machinability in addition to the α phase having significantly improved machinability.

Bi is hardly solid solubilized in a copper alloy and is present in the form of circular particles having a particle size of 0.3 μm to 3 μm, which can be observed with a metallographic microscope. Bi has a lower melting point, a larger atomic number, and a larger atomic size than those of Cu or brass, an alloy comprising Cu and Zn. Therefore, in the case of a brass alloy that does not include Si and in which the proportion of β phase exceeds about 20%, very few Bi particles are present in α phase. They are mainly present at α phase boundary between α phase and β phase. The more the amount of β phase, the more the amount of Bi particles present in β phase. In embodiments of the present invention, it was ascertained that the likelihood of Bi particles present in α phase increases due to an action of Si on a Cu—Zn alloy. When the Si content is approximately 0.1 mass %, the action starts to be effective but not sufficiently. As the Si content is increased to higher than 0.2 mass %, higher than 0.35 mass %, and to higher than 0.5 mass %, the effect becomes clear. Further, by including P, the likelihood of Bi particles present in α phase increases. It is known that Bi has lower machinability than Pb. However, in the embodiments, by causing Bi particles to be present in α phase, machinability higher than or equal to that of Pb can be obtained. When Bi and Pb are added together, Bi and Pb are present together in most of the particles, but an effect that is equivalent to that when Bi alone is included is exhibited. In order to increase the likelihood of Bi particles present in α phase and drastically improve the machinability of α phase, Bi needs to be contained in an amount exceeding 0.10 mass %.

Further, when Bi particles are present in α phase, ductility and workability at a normal temperature improve compared with when Bi particles are present at α phase boundary between α phase and β phase. In addition, cracking becomes less likely to occur during casting, and casting defects such as shrinkage cavities significantly decrease.

(Presence of Compounds of P and Si or Zn)

By including Si, the machinability of β phase is significantly improved, and the machinability is further improved by including P and solid-solubilization of P in β phase. Further, by causing P-containing compounds having an average particle size of about 0.3 to about 3 μm and composed of P and Si or Zn to be present in β phase through adjusting the manufacturing conditions, the machinability of β phase can be further improved. Machinability of a β single-phase alloy including 0.01 mass % Pb, 0.05 mass % P, and about 1 mass % Si without including Bi is improved by about 10% points in terms of machinability index as compared to a β single-phase alloy to which P is not added by the presence of P-containing compounds in a sufficient amount.

By causing P-containing compound to be present in β phase including Si, the machinability of β phase can be further improved. In addition, the machinability of α phase is improved by the presence of Bi particles. Machinability improvement by 10% points may not be expected simply deriving from this, but in a more preferable embodiment, an alloy having higher machinability can be obtained by a combination of β phase having further improved machinability brought by P-containing compounds and α phase having improved machinability brought by the presence of Bi particles. Then, by causing P-containing compounds to be present in β phase, a reduction in the contents of Pb and Bi that is one of the challenges of the embodiments of the invention can also be achieved.

P-containing compound is a compound including P and at least either or both of Si and Zn. In some cases, it can further include Cu and/or inevitable impurities such as Fe, Mn, Cr, or Co. P-containing compound is affected by inevitable impurities such as Fe, Mn, Cr, and Co, too. When the concentration of the inevitable impurities exceeds the aforementioned defined amount, the composition of P-containing compound changes such that P-containing compound may no longer contribute to improvement of machinability. Incidentally, P-containing compounds are not present at a hot working temperature of about 600° C. They are produced at a cooling rate that is lower than the critical cooling rate during cooling after hot working. Accordingly, the cooling rate after hot working is important, and it is necessary that cooling is performed at an average cooling rate of 50° C./min or lower in a temperature range from 530° C. to 450° C. On the other hand, when the cooling rate is excessively slow, P-containing compounds are likely to grow bigger, which causes the effect on machinability to decrease. The lower limit of the average cooling rate is preferably 0.1° C./min or higher and more preferably 0.3° C./min or higher.

Likewise, in the case of casting, when its temperature is high after solidification, P-containing compounds are not present. They are formed by cooling at an average cooling rate of 50° C./min or lower in the temperature range from 530° C. to 450° C.

Now, FIG. 1 shows a picture of a metallographic structure of a free-cutting alloy according to an embodiment of the present invention.

FIG. 1 shows an alloy that includes 63.0 mass % Cu, 1.08 mass % Si, 0.056 mass % P, 0.005 mass % Pb, 0.27 mass % Bi, and Zn as the balance and is made by performing hot forging at 640° C. and cooling at a cooling rate of 10° C./min in a temperature range from 530° C. to 450° C.

As shown in FIG. 1, Bi particles having a dimension of about 0.5 to 3 μm are observed with a metallographic microscope in α phase with their contours. Also, presence of many fine and granular P-containing compounds that look black having a dimension of about 0.5 to 1.5 μm are observed in β phase. In addition, the metallographic structure is suitable for improving machinability since the grain size of α phase crystal grains is about 12 μm and the proportion of granular α phase crystal grains having a longer side/shorter side ratio of 4 or lower is 100% of all the α phase crystal grains.

(Si Content Solid-Solubilized in β Phase and Machinability)

The contents of Cu, Zn, and Si in α phase, β phase, and γ phase formed in an alloy having a composition that falls within a composition range according to an embodiment of the present invention roughly have the following relationships.

The Cu concentration: α>β≥γ.

The Zn concentration: β>γ>α.

The Si concentration: γ>β>α.

Regarding (1) a test sample (an alloy including 63.0 mass % Cu, 1.08 mass % Si, 0.056 mass % P, 0.005 mass % Pb, 0.27 mass % Bi, and Zn as the balance) that was hot-extruded to T24 mm at 580° C. using a mass production facility, (2) a test sample that was obtained by hot forging an alloy having the same composition as the alloy of above (1) at 640° C., and (3) a test sample (an alloy including 59.5 mass % Cu, 0.51 mass % Si, 0.055 mass % P, 0.026 mass % Pb, 0.26 mass % Bi, and Zn as the balance) that was extruded to φ24 mm at 590° C. in a laboratory, the concentrations of Cu, Zn, and Si in α, β, and γ phases were quantitatively analyzed with an X-ray microanalyzer using secondary electron images and compositional images of the samples taken at a magnification of 2000-fold. The measurement was performed using "JXA-8230" (manufactured by JEOL Ltd.) under the conditions of acceleration voltage: 20 kV and current value: $3.0 \times 10^{-8}$ A. The results are shown in Tables 3 to 5.

Tables 3 to 5 show that the concentration of the Si solid-solubilized in β phase is about 1.5 times that in α phase. That is, about 1.5 times the amount of Si in α phase is distributed in β phase. Incidentally, the result of analysis on γ phase formed in an alloy containing 63.0 mass % Cu, 1.08 mass % Si, 0.056 mass % P, 0.005 mass % Pb, and 0.27 mass % Bi with the balance being Zn indicated that the γ phase had 60 mass % Cu, 3 mass % Si, and 37 mass % Zn.

Incidentally, an alloy having a representative composition of Patent Document 2, that is, 76 mass % Cu, 3.1 mass % Si, and Zn as the balance, was prepared and analyzed with an X-ray microanalyzer (EPMA). The result was that the composition of γ phase was 73 mass % Cu, 6 mass % Si, and 20.5 mass % Zn. This composition of γ phase is significantly different from the composition of 60 mass % Cu, 3 mass % Si, and 37 mass % Zn, which is a composition example of γ phase in a free-cutting copper alloy according to an embodiment of the present invention, and therefore, it is expected that characteristics of the γ phases of the alloys are also different.

TABLE 3

Alloy of Zn-63.0 mass % Cu-1.08 mass % Si-0.056 mass % P-0.005 mass % Pb-0.27 mass % Bi (Step No. A1)

|  | Cu | Zn | Si |
| --- | --- | --- | --- |
| α phase | 65.5 | 33.5 | 0.8 |
| β phase | 60.0 | 38.5 | 1.2 |

TABLE 4

Alloy of Zn-63.0 mass % Cu-1.08 mass % Si-0.056 mass % P-0.005 mass % Pb-0.27 mass % Bi (Step No. F1)

|  | Cu | Zn | Si |
| --- | --- | --- | --- |
| α phase | 65.5 | 33.5 | 0.8 |
| β phase | 60.5 | 38.0 | 1.3 |

TABLE 5

Alloy of Zn-59.5 mass % Cu-0.51 mass % Si-0.055 mass % P-0.026 mass % Pb-0.26 mass % Bi (Step No. C1)

|  | Cu | Zn | Si |
| --- | --- | --- | --- |
| α phase | 62.5 | 37.0 | 0.4 |
| β phase | 57.0 | 42.0 | 0.6 |

(Machinability Index)

In general, machinability of various copper alloys is expressed by numerical value (%) indicative of a difference from a free-cutting brass including 3 mass % Pb which is used as a standard alloy, i.e., 100% refers to the machinability of the standard alloy. Machinability of copper alloy is described, for example, in "Basic and Industrial Technique of Copper and Copper Alloy (Revised Edition)" (1994, Japan Copper and Brass Association), p. 533, Table 1, and Metals Handbook TENTH EDITION Volume 2 Properties and Selection: Nonferrous Alloys and Special-Purpose Materials" (1990, ASM International), p. 217 to 228.

The alloys shown in Table 6 are alloys including 0.01 mass % Pb prepared in a laboratory as described below by hot extruding to φ22 mm using an extrusion test machine in the laboratory. In the case of Cu—Zn binary alloys, containing a small amount of Pb hardly affects the machinability of the alloy. Therefore, 0.01 mass % Pb, which falls within a component range according to an embodiment of the present invention, was added to each of the alloys. The hot extrusion temperature of Alloys A and D was 750° C., and the hot extrusion temperature of the other alloys, Alloys B, C, E, F, G, and H, was 635° C. After the extrusion, a heat treatment was performed at 500° C. for 2 hours to adjust the metallographic structure. The turning and drilling tests described below were performed to find out the machinability of the alloys. The results of the evaluation are shown in Table 7. A commercially available free-cutting brass, C3604 (comprising 59 mass % Cu, 3 mass % Pb, 0.2 mass % Fe, 0.3 mass % Sn, and Zn as the balance) was used as the standard free-cutting brass material.

TABLE 6

| Material | | Component Composition (mass %) | | | | | Metallographic Structure (%) | |
|---|---|---|---|---|---|---|---|---|
| | | Cu | Zn | Si | Pb | P | α | β |
| Alloy A | α brass | 65.0 | 35.0 | 0.00 | 0.01 | 0.00 | 100 | 0 |
| Alloy B | 50% β brass | 58.1 | 41.9 | 0.00 | 0.01 | 0.00 | 52 | 48 |
| Alloy C | β brass | 54.0 | 46.0 | 0.00 | 0.01 | 0.00 | 0 | 100 |
| Alloy D | α brass with 0.6 Si | 68.3 | 31.0 | 0.60 | 0.01 | 0.00 | 100 | 0 |
| Alloy E | β brass with 0.5 Si | 56.6 | 42.8 | 0.52 | 0.01 | 0.00 | 0 | 100 |
| Alloy F | β brass with 1.0 Si | 58.7 | 40.2 | 1.00 | 0.01 | 0.00 | 0 | 100 |
| Alloy G | β brass with P + 0.5 Si | 56.6 | 42.8 | 0.51 | 0.01 | 0.05 | 0 | 100 |
| Alloy H | β brass with P + 1.0 Si | 58.5 | 40.4 | 1.00 | 0.01 | 0.05 | 0 | 100 |

TABLE 7

| | Machinability | Turning | | Hole Drilling | | | | |
|---|---|---|---|---|---|---|---|---|
| | | Cutting | | Cutting Resistance | | | | |
| | Overall (%) | Resistance (%) | Overall | Chips (%) | Torque (%) | Thrust (%) | Chips | |
| Alloy A | 31 | 33 | D | 28 | 26 | 30 | D | |
| Alloy B | 44 | 39 | D | 49 | 46 | 52 | D | |
| Alloy C | 51 | 41 | D | 61 | 53 | 68 | D | |
| Alloy D | 35 | 36 | D | 33 | 30 | 35 | D | |
| Alloy E | 68 | 69 | D | 67 | 62 | 72 | D | |
| Alloy F | 72 | 75 | D | 69 | 64 | 74 | D | |
| Alloy G | 76 | 80 | C | 72 | 70 | 73 | C | |
| Alloy H | 82 | 89 | B | 74 | 73 | 75 | B | |

The above-mentioned Patent Documents describe that the machinability of a 70 Cu-30 Zn alloy which is an α single-phase brass is 30%. In an embodiment of the present invention, as shown in Tables 6 and 7, the overall machinability index of a 65 Cu-35 Zn alloy (Alloy A), which is also an α single-phase brass, was 31%. In an α single-phase brass in which the contents of Cu and Zn were adjusted and the Si content was 0.6 mass % (Alloy D), that is, an α single-phase brass in which 0.6 mass % Si was solid solubilized in α phase, the machinability index was improved by about 4% points compared with an α brass not including Si. Chips of Alloys A and D generated in the turning and drilling tests were both continuous.

Force related to turning can be decomposed into a principal cutting force, a feed force, and a thrust force, and the combined force (three force components) thereof was regarded as cutting resistance. In the case of drilling, the force was decomposed into torque and thrust, and their average values are shown in the "Overall" column in the "Hole Drilling" section. Further, cutting resistance during turning and that during drilling were averaged and the resultant values are shown in the "Overall" column in the "Machinability" section as overall machinability index (evaluation).

"Cutting Resistance" in the "Turning" section of Table 7 corresponds to the combined force (machinability index) that appears in the description of the Examples. "Torque", "Thrust", and "Overall" in the "Hole Drilling" section of Table 7 correspond to the torque index, the thrust index, and the drill index in the description of the Examples, respectively. The evaluation standards of chips are the same as those that appear in the description of the Examples.

In a β single-phase brass in which the amounts of Cu and Zn were adjusted and Si was not included (Alloy C, 54 Cu-46 Zn), the "overall" machinability index improved about 20% points compared with an α single-phase brass not including Si. Yet, the "overall" machinability index was still quite low standing at 51%. There was little improvement in chip shape, and the chip evaluation remained the same.

In a β single-phase alloy including 0.5 mass % Si (Alloy E), the "overall" machinability index was improved by about 17% points as compared to a β single-phase brass not including Si (Alloy C). In particular, the cutting resistance during turning was improved by about 28% points, the torque was improved by about 9% points. In a 1 phase alloy including about 1 mass % Si (Alloy F), the "overall" machinability index was improved by about 21% points as compared to the β single-phase alloy not including Si. Thus, the machinability of β phase was much better when the amount of Si in β phase was in a range of 0 mass % to 0.5 mass %. That is, the following is presumed. When the amount of Si in β phase is about 0.25 mass %, a significant effect on machinability starts to be exhibited. When the amount of Si is about 0.5 mass %, the effect on machinability is remarkable. From the result of Alloy H, it is presumed that when the amount of Si is about 1.0 mass %, the effect on machinability is more remarkable. Accordingly, in the embodiments of the present invention, the amount of Si solid-solubilized in β phase is preferably 0.3 mass % or higher, more preferably 0.5 mass % or higher or 0.7 mass % or higher.

When not only 0.5 mass % Si but also 0.05 mass % P were added to a β single-phase brass (Alloy G), the "overall" machinability index was improved by about 8% points as compared to Alloy E, and the chip shape was improved in both the turning and the drilling tests. In a β single-phase alloy including 0.05 mass % P and 1 mass % Si (Alloy H), the "overall" machinability index was improved by about 10% points as compared to a β single-phase alloy including about 1 mass % Si without including P. Due to presence of P, the cutting resistance during turning was improved by about 14% points, and the torque during drilling was improved by about 9% points. The magnitude of cutting resistance in turning and that of torque are related to chip shape, and by including 0.05 mass % P, the evaluation results of the chip shape in both the turning test and the drilling test were improved from "D" to "B". The difference with a free-cutting brass including 3 mass % Pb in the cutting resistance during turning narrowed, and chips produced during turning and drilling remarkably improved becoming more similar to those of a free-cutting brass including 3 mass % Pb. Cutting resistance is affected by the strength of a material, and the higher the strength, the higher the cutting resistance. β single-phase brasses and free-cutting copper alloys according to an embodiment of the present invention have about 1.2 times the strength of a free-cutting brass including 3 mass % Pb. If the difference in strength is taken into consideration, the machinability of a β single-phase alloy including 1 mass % Si and 0.05 mass % P can be said to be close to the machinability of a free-cutting brass including 3 mass % Pb, particularly in turning.

Alloy B is a brass including 0.01 mass % Pb and not including Si or P, in which the proportion of β phase is about 48%. Alloy B is formed of an α single-phase brass having an "overall" machinability index of 31% (Alloy A) and a β single-phase brass having an "overall" machinability index of 51% (Alloy C). The "overall" machinability index of Alloy B is 44% indicating that influence of β phase is slightly stronger than expected for its area ratio. The chip shape of the brass including 48% β phase was continuous. Considering its "overall" machinability index and the chip shape, this brass cannot be a replacement of a free-cutting brass including 3 mass % Pb. In a free-cutting brass bar including 3 mass % Pb, the proportion of β phase is about 20%, and the machinability of its matrix is at least worse than that of Alloy B. Due to an action of Pb, the "overall" machinability index was higher than that of its matrix by 60 percentage points or more and chips were broken.

According to Tables 3, 4, and 7, Alloys G and H that are β single-phase alloys largely correspond to β phase of a free-cutting copper alloy according to an embodiment of the present invention, and Alloy D largely corresponds to a phase thereof. That is, the machinability of β phase is at a high level due to inclusion of Si and P. It is presumed that, by causing Bi particles to be present in α phase, the machinability of α phase is enhanced and the machinability of the alloy has achieved a high level.

<Properties>

(Normal-Temperature Strength and High-Temperature Properties)

There is a strong demand for reduction in the thickness and weight of parts and components that are target applications of embodiments of the present invention such as auto parts. Among the strengths that are required, tensile strength is important, and the balance between tensile strength and ductility is also important.

In order to obtain the strength stated above, it is preferable that hot extruded materials, hot rolled materials, and hot forged materials are high strength materials having a tensile strength of 430 N/mm$^2$ or higher in a state where cold working is not performed after hot working. The tensile strength is more preferably 470 N/mm$^2$ or higher and still more preferably 510 N/mm$^2$ or higher. Many components that are used for valve, joints, pressure vessel, air conditioner, or freezer are manufactured by hot forging. C3771, a currently used brass for forging containing 2 mass % Pb has a tensile strength of about 400 N/mm$^2$ and an elongation of 30% to 35% despite presence of β phase in the alloy. A high strength can be achieved and a reduction in weight can be realized by containing Si and satisfying the requirements for metallographic structure defined by metallographic structure relational expressions f3 to f5.

Cold working may also be performed after hot working. In consideration of the influence of cold working, a material that falls within the following range is defined as a high-strength and high-ductility material.

Specifically, it refers to a hot worked material, a material that is further cold-worked at a working ratio of 30% or lower after hot working, or a material that is further cold-worked and heat-treated after hot working, in some cases repeatedly cold worked and heat treated, then cold-worked to the final working ratio of 30% or lower. Providing that cold working ratio is represented by [R]%, when cold working is not performed, [R]=0, the tensile strength S (N/mm$^2$) is preferably $(430+8\times[R])$ N/mm$^2$ or higher and more preferably $(470+8\times[R])$ N/mm$^2$ or higher. The elongation E (%) is preferably $(0.02\times[R]^2-1.15\times[R]+18)$ % or higher, and more preferably $(0.02\times[R]^2-1.2\times[R]+20)$ % or higher. The characteristic relational expression $f8=S\times(100+E)/100$ representing the balance between strength (tensile strength "S") and ductility (elongation "E") is preferably 580 or higher. f8 is more preferably 620 or higher, and still more preferably 650 or higher.

Incidentally, in a hot-worked, free-cutting brass including Pb on which no further working is performed after hot-working, the above-mentioned characteristic relational expression f8 is about 530. The characteristic relational expression f8 of a free-cutting copper alloy according to an embodiment of the present invention is higher than this by or more, possibly by 90 or more, indicating that the balance between strength and ductility is excellent.

Component segregation is more likely to occur to a casting than to a material subjected to hot working such as a hot extruded bar. Casting has larger crystal grains and some micro defects. Therefore, casting is said to be "brittle" or "weak" and is desired to have a high impact value in the evaluation of toughness and ductility. On the other hand, it is said that some kind of brittleness is necessary for a material having excellent chip breakability in machining. Impact resistance is a property contrary to machinability in some aspect. There is a strong demand for reduction in the thickness and weight of parts and components that are the target applications of embodiments of the present invention such as mechanical parts. Therefore, they need to have excellent toughness and ductility. Strength of casting relates to the Si content solid-solubilized in β phase and α phase, and a high strength can be obtained by containing Si in an amount exceeding about 0.25 mass % in β phase. In a casting, as described above, component segregation or micro defects are likely to occur, and it is difficult to appropriately evaluate the strength. In embodiments of the present invention, as a method for evaluating the strength, hardness (Vickers hardness) is adopted, and for the evaluation of toughness, impact test value (U-notch) is adopted.

To be a copper alloy casting having a high strength, it is preferable that its Vickers hardness is at least 100 Hv or higher. The Vickers hardness is more preferably 110 Hv or higher. There is a correlation between hardness and tensile strength, and Vickers hardness of 100 Hv corresponds to a tensile strength of about 400 N/mm$^2$, and Vickers hardness of 110 Hv corresponds to a tensile strength of about 420 N/mm$^2$. Considering that the Vickers hardness of the brass castings containing Pb, CAC202 (representative composition: 67 Cu-2 Pb-balance Zn) and CAC203 (representative composition: 60 Cu-2 Pb-balance Zn) are about 60 Hv and about 70 Hv, respectively, the strength of the free-cutting copper alloy casting according to an embodiment of the present invention is at a high level.

As described above, casting needs to be a tough material which does not only have a high strength but also have resistance to impact. To that end, when a Charpy impact test is performed using a U-notched specimen of a casting, the Charpy impact test value is preferably 25 J/cm$^2$ or higher, more preferably 30 J/cm$^2$ or higher, and still more preferably 40 J/cm$^2$ or higher. On the other hand, when a casting's Charpy impact test value exceeds 90 J/cm$^2$, for example, so-called viscosity of the material increases, which pushes up cutting resistance and eventually, the machinability is poor and unbroken chips are more likely to be generated.

(Electrical Conductivity)

Applications of embodiments of the present invention include electrical or electronic apparatus component, component of automobile, an increasing number of models of which are electric-powered, and other parts and components requiring high conductivity. Currently, phosphor bronzes including Sn in an amount of about 5 mass %, about 6 mass %, or about 8 mass % (JIS Standard Nos., C5102, C5191, and C5210) are widely used for these applications, and their electrical conductivities are about 15% IACS, about 14% IACS, and about 12% IACS, respectively. Accordingly, there is no serious problem related to electric conductivity to use a copper alloy according to an embodiment of the present invention for an electrical or electronic component or an automobile component as long as it has an electrical conductivity of 15% IACS or higher. The reason that copper alloys according to an embodiment of the present invention exhibit high conductivity despite inclusion of Si, an element that deteriorates electrical conductivity, and a high concentration of Zn, is an influence from the amount of β phase in the alloy and Si solid-solubilized in the β phase. Despite the fact that the concentration of Zn in β phase is higher than that in α phase, the more β phase is contained, the higher the electric conductivity. The upper limit of the electrical conductivity is not particularly defined because an increase in conductivity rarely causes a problem in practice.

From the above-stated results of studies the following findings were obtained.

First, in the conventional art, it was known that β phase formed in a Cu—Zn—Si alloy has no effect on the improvement of machinability of an alloy or has a negative effect on the machinability. However, as a result of devoted studies, the present inventors have ascertained that β phase comprising, for example, about 1 mass % Si, about 59 mass % Cu, and about 40 mass % Zn, has extremely excellent machinability.

Secondly, when a Cu—Zn—Si alloy included a small amount Bi, it was able to make Bi particles having an average particle size of about 0.2 to about 3 µm present in α phase due to an action of Si. α phase having poor machinability was changed to one having significantly improved machinability. Due to this α phase having improved machinability in combination with the above-mentioned β phase having excellent machinability, the alloy was able to obtain excellent machinability. Incidentally, it was verified that, even when particles contain Bi and Pb together (alloy comprising Bi and Pb), that is, even when Bi is the main component of the particles, the machinability is not impaired.

Thirdly, the present inventors have revealed that Pb is mainly present in the form of particle having an average dimension of about 0.2 to about 2 µm in which Bi and Pb coexist, that is, particle mainly composed of Bi, and exhibits the effects of improving chip breakability and reducing the cutting resistance.

Fourthly, when a Cu—Zn—Si alloy included P, P was preferentially present in β phase and further improved the machinability of β phase. It was ascertained that, when P-containing compounds having an average particle size of about 0.3 to about 3 µm are made to be present in β phase by appropriately modifying the production process, the cutting resistance is further reduced, and at the same time, chip breakability is improved more than those without P-containing compounds.

Fifth, it was ascertained that γ phase formed in a free-cutting copper alloy according to an embodiment of the present invention also has an effect on obtaining excellent chip breakability. The free-cutting copper alloys of the Patent Documents have compositions different than that of a free-cutting copper alloy according to an embodiment of the present invention. Even though the copper alloys of the Patent Documents and free-cutting copper alloys according to an embodiment of the present invention both have γ phase, if its composition is different, a large difference is exhibited in machinability similarly to β phase as described above. And it was found that γ phase present in an alloy having a composition that falls within a composition range of a free-cutting copper alloy according to an embodiment of the present invention has excellent machinability.

Sixth, the present inventors have accomplished free-cutting copper alloys according to the embodiments of the present invention by clarifying the machinability, the amount of β phase, the amount of Si in the alloy, the amount of Si solid-solubilized in β phase, the amount of P, P-containing compounds present in β phase, and the amount of γ phase, in order to reduce the amount of Pb, an element which may cause an environmental problem and the like, and the amount of Bi, and making these more appropriate together with various mechanical properties.

Lastly, conventional leaded copper alloys had a problem in hot deformability at 650° C. or lower because a large amount of Pb is in a molten state at a hot working temperature. Even though a free-cutting copper alloy according to an embodiment of the present invention contains Bi and Pb, it was able to be completed as a copper alloy having excellent hot deformability at about 600° C., a temperature lower than 650° C., low hot deformation resistance, good ductility during hot working and can be hot worked easily.

(Hot Workability)

Free-cutting copper alloys according to an embodiment of the present invention have a characteristic that it has excellent deformability at about 600° C. They can be hot-extruded into a bar having a small cross-sectional area and can be hot-forged into a complex shape. When high deformation is performed on a leaded copper alloy at about 600° C., a large crack is formed. Therefore, an appropriate hot extrusion temperature range is 625° C. to 800° C., and an appropriate hot forging temperature range is 650° C. to 775° C. A free-cutting copper alloy according to an embodiment of the present invention, however, has a characteristic that it does not crack when hot working is performed at 600° C. with a working ratio of 80% or higher. A preferable hot working temperature for a free-cutting copper alloy according to an embodiment of the present invention is a temperature lower than 650° C. and more preferably lower than 625° C.

In a free-cutting copper alloy according to an embodiment of the present invention, deformability is improved, and deformation resistance is reduced at 600° C. due to inclusion of Si. Since the proportion of β phase is high, hot working can be easily performed at 600° C.

When hot worked at about 600° C., a temperature lower than the working temperature of conventional copper alloys, tools such as an extrusion die for hot extrusion, containers of extruder, and metal molds for forging are heated to 400° C. to 500° C. before use. The smaller the difference in temperature between the tools and the hot worked material, the more homogeneous the metallographic structure, the better the dimensional accuracy of a hot worked material, and the longer the tool life because tool temperature does not substantially increase. In addition, a material having a high strength and a good balance between strength and elongation can be obtained.

(Castability)

In embodiments of the present invention, obtaining a sound casting is also targeted. Therefore, they should not have any cracks, and it is desired that there are not many micro defects, and component segregation is limited.

Regarding cracking during casting, what primarily matters is whether any metal whose melting point is low is presence a melt after the alloy is solidified but its temperature is still high, and when such a metal having a low melting point is present, the amount of the metal and whether the matrix has ductility under a high temperature are the factors that determine whether cracking occurs. Cracking is less likely to occur during casting to the embodiments of the present invention because the total amount of Bi and Pb that are low melting point metals present in the form of a melt in the matrix in the processes of solidification and cooling of the casting is limited to less than 1.0 mass %, and particles mainly composed of Bi are present in α phase. Further, if the composition and various relational expressions of the embodiments are satisfied, the adverse effect of the low melting point metal that is contained in a small amount can be covered since β phase having excellent ductility under a high temperature is contained in a large amount. Therefore, there is no problem of cracking during casting.

Incidentally, solidification temperature range cannot be read from a ternary phase diagram. Component segregation is related to solidification temperature range, and when the solidification temperature range is narrow, for example, 25° C. or lower, component segregation is unlikely to occur.

In the embodiments of the present invention, the challenge as a casting is minimization of micro defects. Micro defects are likely to occur in the portion that solidifies last. In most cases, the last-solidified portion is contained in the portion composed of additionally poured melt by a good casting plan. However, in some cases, the last-solidified portion is partially present in the main body of the casting, or, depending on the shape of the casting, is present in the main body of the casting in its entirety. Micro defect can be found through a Tatur Shrinkage Test performed in a laboratory. It was found that, in the case of castings according to an embodiment of the present invention, the result of the Tatur Shrinkage Test, the contents of Cu and Si, the composition relational expression f1, and the solidification temperature range have a close relationship with each other.

It was found that, when the Cu content is 64.5 mass % or higher or the Si content is 1.2 mass % or higher, micro defects in the last-solidified portion increases and that, when the composition relational expression f1 exceeds 59.5, the number of micro defects increases. When the solidification temperature range, that is, (liquidus temperature-solidus temperature) exceeds 25° C., shrinkage cavities and micro defects during casting appear to a remarkable level, and a sound casting cannot be obtained. The solidification temperature range is preferably 20° C. or lower and more preferably 15° C. or lower. When the solidification temperature range is 15° C. or lower, sounder castings can be obtained.

<Production Process>

Next, a method for producing free-cutting copper alloys according to the first and second embodiments of the present invention will be described.

The metallographic structure of an alloy according to an embodiment of the present invention varies not only depending on the composition but also depending on the production process. The metallographic structure of the alloy is affected not only by hot working temperatures in hot extrusion and hot forging and heat treatment conditions but also by the average cooling rate in the process of cooling after hot working or heat treatment. As a result of a diligent study, it was found that the metallographic structure is affected by the cooling rate in a temperature range from 530° C. to 450° C. in the process of cooling after casting, hot working, or heat treatment.

(Melting and Casting)

Melting is performed at about 950° C. to about 1200° C., a temperature that is about 100° C. to about 300° C. higher than the melting point (liquidus temperature) of an alloy according to an embodiment of the present invention. In casting and manufacture of cast products, a molten alloy at a temperature of about 900° C. to about 1100° C., a temperature that is about 50° C. to about 200° C. higher than the alloy's melting point, is cast into a predetermined mold and is cooled by several cooling means such as air cooling, slow cooling, or water cooling. After the alloy solidifies, constituent phases change in various ways.

(Production of Castings)

(Casting)

Castings that are made by casting are divided into two categories. One is a large cylindrical or rectangular ingot for hot working such as hot extrusion or hot rolling. Another is casting that will become a final product after machining without being subjected to hot working. Examples of such final products include faucet fitting and water meter. In both categories, fatal defects are not allowed.

The former is large but has a simple shape. Therefore, the portion that solidified last can be simply removed, and a relatively sound casting (ingot) is likely to be obtained by optimized casting conditions. Many of the latter category have a complicated shape, and castability of the material itself used for the casting greatly matters.

Regarding castings of the latter category, as a production method, there are various ways of casting such as die casting, metal mold casting, sand mold casting (including a continuous casting), and lost-wax casting. Depending on the thickness and shape of the casting and the material, thickness and the like of the metal mold or the sand mold, the cooling rate of a casting after it is solidified is roughly determined. The cooling rate can be changed by modifying the cooling method, heat retention, and the like. On the other hand, in the process of cooling after solidification, various changes occur in the metallographic structure, and the metallographic structure significantly changes depending on the cooling rate. A change in metallographic structure refers to a significant change in the kinds and the amounts of the phases that constitute the metallographic structure.

As described above, the cooling rate after casting and solidification varies in many ways depending on the weight and the thickness of the cast copper alloy and the material of the casting mold, e.g., whether it is a sand mold or metal mold. For example, in general, when a conventional copper alloy casting is produced by casting using a metal mold made of a copper alloy or an iron alloy, the casting is removed from the mold after casting when the temperature is at about 700° C. or lower and then is cooled by forced cooling, air cooling, or slow cooling at an average cooling rate of about 5° C./min to about 200° C./min.

On the other hand, when a sand mold is used, although depending on the size of the casting and the material and the size of the sand mold, the copper alloy cast into the sand mold is cooled at an average cooling rate of about 0.05° C./min to about 30° C./min. In free-cutting copper alloy castings according to an embodiment of the present invention, the metallographic structure immediately after solidification after casting is composed solely of β phase when the casting is at a high temperature like 800° C. During subsequent cooling, various phases such as α phase, γ phase, κ phase, and β phase are produced and formed. For example, when the cooling rate in a temperature range from 450° C. to 800° C. is high, the amount of β phase is large. When the cooling rate in a temperature range below 450° C. is low, γ phase is likely to be produced.

It is difficult to significantly change the cooling rate because the casting plan, the shape of the casting, and the like are fixed. However, in the case of castings that become final products after machining process without being subjected to hot working, castings are cooled with the average cooling rate in the temperature range from 530° C. to 450° C. adjusted to 0.1° C./min or higher and 50° C./min or lower. By doing so, P-containing compounds are formed.

On the other hand, when hot working is performed in the process after casting, a casting is heated to 530° C. or higher. When a casting is heated to 530° or higher, a large part of P becomes solid-solubilized at the stage it is still a casting irrespective of whether P compounds are present. By cooling in the temperature range from 530° C. to 450° C. with the cooling rate adjusted to 0.1° C./min or higher and 50° C./min or lower in the process of cooling after hot working, P-containing compounds are formed. Accordingly, if hot working is performed, whether P-containing compounds are present in the casting to be hot worked is not important.

As a result, the chip breaking action is improved, and the cutting resistance is reduced.

(Hot Working)

Examples of hot working include hot extrusion, hot forging, and hot rolling. Each of these processes is explained below. When two or more hot working steps are performed, the final hot working step is performed under the following conditions.

(1) Hot Extrusion

First, regarding hot extrusion, in a preferred embodiment, although depending on extrusion ratio (hot working ratio) and facility capacity, hot extrusion is performed such that the material's temperature when it is being hot worked, specifically, immediately after the material passes through the extrusion die (hot working temperature) is higher than 530° C. and lower than 650° C. The lower limit of the hot extrusion temperature relates to hot deformation resistance, and the upper limit thereof relates to the shape of α phase. By controlling the hot extrusion temperature such that it is within a narrower temperature range, a stable metallographic structure can be obtained. When hot extrusion is performed at 650° C. or higher, the shape of α phase crystal grains is likely to be acicular instead of granular, or large α phase crystal grains having a diameter of more than 50 μm are likely to appear. When acicular or large α phase crystal grains appear, the strength slightly decreases and the balance between strength and ductility slightly deteriorates. In addition, distribution of P-containing precipitates deteriorates, and the machinability slightly deteriorates because large α phase crystal grains having a large longer side hinder machining. The shape of α phase crystal grains relates to the composition relational expression f1, and when the composition relational expression f1 is 58.0 or lower, the extrusion temperature is preferably lower than 625° C. By performing extrusion at a temperature lower than the temperature at which leaded copper alloys are extruded, good machinability and high strength can be obtained.

Further, by adjusting the cooling rate after hot extrusion, that is, by performing cooling in a temperature range from 530° C. to 450° C. in the process of cooling after hot extrusion at an average cooling rate of 50° C./min or lower and preferably 45° C./min or lower, a material having excellent machinability can be obtained. By limiting the average cooling rate to 50° C./min or lower, the presence of P-containing compounds can be confirmed with a metallographic microscope at a magnification of 500× or 1000×. On the other hand, if the cooling rate is excessively low, P-containing compounds are likely to grow bigger, and the effect on machinability may decrease. Therefore, the average cooling rate is preferably 0.1° C./min or higher and more preferably 0.3° C./min or higher.

From a perspective of practicability of measurement position, hot working temperature is defined as a temperature of a hot worked material at which measurement can be performed about three or four seconds after hot extrusion, hot forging, or hot rolling is completed. Metallographic structure is affected by the temperature immediately after working where large plastic deformation occurs. The average cooling rate after hot working in question is about 50° C./min. Therefore, a temperature decrease during the 3 to 4 seconds after hot working is calculated to be about 3° C., which little affects the metallographic structure.

(2) Hot Forging

As a material for hot forging, a hot extruded material is mainly used, but a continuously cast bar is also used. Compared with hot extrusion, in hot forging, hot deformation speed is higher, and a more complex shape is formed. In some cases, high deformation is performed up to a thickness of as thin as about 3 mm, and thus the forging temperature is high. In a preferred embodiment, the temperature of a hot forged material on which plastic working is performed to form a main portion of a forged product, that is, the material's temperature about three or four seconds immediately after forging (at the point forging is completed) is preferably higher than 530° C. and lower than 675° C. In a brass alloy including 2 mass % Pb that is widely used as a brass alloy for forging (59Cu-2Pb-balance Zn), the lower limit of the hot forging temperature is 650° C. Hot forging temperature of embodiments of the present invention is more preferably lower than 650° C. Hot forging relates to the composition relational expression f1, and when the composition relational expression f1 is 58.0 or lower, the hot forging temperature is preferably lower than 650° C.

Although depending on the working ratio in hot forging, the lower the temperature, the smaller the α phase crystal grains, then the shape of α phase crystal grains changes from acicular to granular, the strength increases, the balance between strength and ductility improves, and the machinability improves.

By adjusting the cooling rate after hot forging, a material having various features of machinability can be obtained. That is, cooling is performed after hot forging with the average cooling rate in a temperature range from 530° C. to 450° C. set at 50° C./min or lower, preferably ° C./min or lower. By controlling the cooling rate such that P-containing compounds having a particle size of about 0.3 to 3 μm precipitate in β phase, the machinability of the alloy can be improved more. Incidentally, the lower limit of the above-mentioned average cooling rate is preferably 0.1° C./min or higher and more preferably 0.3° C./min or higher in order to inhibit enlargement of compounds in the cooling process.

(3) Hot Rolling

In hot rolling, an ingot is heated and rolled 5 to 15 times repeatedly. The material's temperature upon completion of the final hot rolling (the material's temperature three or four seconds after completion of the process) is preferably higher than 530° C. and lower than 625° C. After completion of hot rolling, the rolled material is cooled. In this cooling, like in hot extrusion, the average cooling rate in a temperature range from 530° C. to 450° C. is preferably 0.1° C./min or higher and 50° C./min or lower, more preferably 0.3° C./min or higher or 45° C./min or lower.

(Heat Treatment)

A main heat treatment of copper alloy is also called annealing. Heat treatment is performed as necessary. For example, when making a product so small that it cannot be processed by hot extrusion, heat treatment is performed after cold-drawing or cold wire drawing for the purpose of recrystallization, that is, to soften the material. Cold-rolling and heat treatment are performed on rolled materials, too. In embodiments of the present invention, heat treatment is also performed in order to control the amounts of γ phase and β phase.

When heat treatment to induce recrystallization is required, the material is heated to a temperature of 400° C. or higher and 600° C. or lower for 0.1 to 8 hours. When P-containing compounds are not formed in the previous step, they are formed during heat treatment. When heat treatment is performed at a temperature of higher than 530° C., P-containing compounds are solid-solubilized again then disappear. When heat treatment temperature is higher than 530° C., it is necessary to perform cooling with the average cooling rate in a temperature range from 530° C. to 450° C. in the process of cooling set to be 50° C./min or lower and preferably 45° C./min or lower such that P-containing compounds are formed. The lower limit of the average cooling rate is preferably 0.1° C./min or higher.

(Cold Working Step)

In the case of a hot extruded bar, cold working may be performed on a hot extruded material in order to obtain a high strength, to improve the dimensional accuracy, or to straighten (reduce the degree of bending of) an extruded bar or a coiled material. For example, cold-drawing, in some cases straightness correction, and/or low-temperature annealing are performed on a hot extruded material at a working ratio of about 2% to about 30%.

If the material is a slender bar, a wire, or a rolled material, cold working and heat treatment are repeatedly performed. After the heat treatment, cold working, straightness correction, and/or low-temperature annealing are performed such that the final working ratio becomes 0% to about 30%.

An advantage of cold working is that it can improve the strength of the alloy. By performing a combination of cold working and heat treatment on a hot worked material, no matter which step is performed first, high strength, ductility, and impact resistance can be well-balanced, and properties required by each application in which importance is placed on strength, ductility, or toughness can be obtained. Cold working hardly affects machinability.

(Low-Temperature Annealing)

Low-temperature annealing may be performed on bars, wires, forged products, and rolled materials at a temperature equal to or lower than the recrystallization temperature for the primary purposes of removal of residual stress, straightness correction of bar (bar's straightness), and adjustment and improvement of metallographic structure. In the case of embodiments of the present invention, in order to distinguish low-temperature annealing from the above-described heat treatment, low-temperature annealing is defined to be a process which induces recrystallization of less than 50% of the metallographic structure. Low-temperature annealing is performed with a holding temperature of 250° C. or higher and 430° C. or lower and a holding time of 10 minutes to 200 minutes. The lower limits of temperature and time are those where residual stress can be sufficiently removed. In addition, bars with excellent straightness can be obtained by arranging bars in a mold whose cross-section has a recess and the bottom surface is smooth and flat, for example, a steel mold having a width of about 500 mm, a height of about 300 mm, a thickness of about 10 mm, and a length of about 4000 mm (depth of a recess is obtained by deducting mold's thickness from height) and holding the bars at a temperature of 250° C. or higher and 430° C. or lower for 10 minutes to 200 minutes. When the temperature is represented by T° C. and the time is represented by t min, preferable condition would be 300≤annealing conditional expression f9=(T−200)×(t)$^{1/2}$≤2000. That annealing conditional expression f9 is lower than 300 indicates that the removal of residual stress or straightness correction is insufficient. If the annealing conditional expression f9 exceeds 2000, the strength of the material decreases due to recrystallization. The annealing conditional expression f9 is preferably 400 or higher and 1600 or lower. Irrespective of the cooling rate in the previous step, when the annealing conditional expression f9 is 400 or higher, compounds including fine P are formed during low-temperature annealing. In addition, although depending on the alloy's composition, when a material is held at 250° C. or higher and 430° C. or lower for 10 minutes to 200 minutes, fine γ phase may precipitate in β phase or at a phase boundary between β phase and α phase, making chips generated by drilling become fine.

Using the above-mentioned production method, high-strength free-cutting copper alloys according to the first and second embodiments of the present invention are produced.

The hot working step, the heat treatment step (also referred to as "annealing"), and the low-temperature annealing step are steps of heating copper alloy. Basic production steps are casting, hot working (extrusion, forging, rolling), cold working (drawing, wire drawing, rolling), straightness correction, and low-temperature annealing, but among these, straightness correction, cold working, or low-temperature annealing may not be included. Straightness correction is typically performed in a cold state, and thus is also referred to as "cold working". Heat treatment may also be included in the above-mentioned steps for slender bars having a diameter of T5 to 7 mm, wires, and plates having a thickness of 8 mm or less. Heat treatment is mainly performed after cold working, and heat treatment and cold working are repeated according to the final dimensions. The smaller the diameter of the final product, the more the cold workability matters, as much as or even more than machinability. Heat treatment may be performed before cold working after hot working.

A low-temperature annealing step is performed after the final step among a hot working step, a cold working step, a straightness correction step, and an annealing step. When a low-temperature annealing step is performed, an annealing step is typically performed between the working steps. It can be said that a low-temperature annealing step is performed after the final working step among a hot working step, a cold working step, and a straightness correction step.

Specifically, the following combinations of production steps can be provided as examples. Incidentally, hot rolling may be performed instead of hot extrusion.

(1) Hot extrusion and low-temperature annealing
(2) Hot extrusion, cold working (drawing, wire drawing, rolling), and low-temperature annealing
(3) Hot extrusion, cold working (drawing, wire drawing, rolling), straightness correction, and low-temperature annealing
(4) Hot extrusion, repetition of cold working (wire drawing, rolling) and annealing, cold working, and low-temperature annealing (5) Hot extrusion, repetition of cold working (cold wire drawing, rolling) and annealing, cold working, straightness correction, and low-temperature annealing
(6) Hot extrusion, annealing, cold working (drawing, wire drawing, rolling), and low-temperature annealing
(7) Hot extrusion, annealing, cold working (drawing, wire drawing, rolling), straightness correction, and low-temperature annealing
(8) Hot extrusion, annealing, repetition of cold working (drawing, wire drawing, rolling) and annealing, cold working, and low-temperature annealing
(9) Hot extrusion, annealing, repetition of cold working (drawing, wire drawing, rolling) and annealing, cold working, straightness correction, and low-temperature annealing
(10) Hot extrusion, cold-drawing, straightness correction (straightness correction may not be performed), hot forging, and low-temperature annealing
(11) Hot extrusion, straightness correction, hot forging, and low-temperature annealing
(12) Hot extrusion, hot forging, and low-temperature annealing
(13) Casting, hot forging, and low-temperature annealing
(14) Casting, straightness correction, hot forging, and low-temperature annealing In a free-cutting alloy according to the first or second embodiment of the present invention having the above-described constitution, since the alloy's composition, the composition relational expressions f1 and f2, the metallographic structure relational expressions f3 to f5, and the composition and metallographic structure relational expressions f6 and f7 are defined as described above, even though the contents of Pb and Bi are small, excellent machinability can be obtained, and excellent hot workability, high strength, excellent balance between strength and ductility, and good castability can be obtained.

Hereinabove, embodiments of the present invention have been described. However, the present invention is not limited to the embodiments, and appropriate modifications can be made within a range not departing from the technical requirements of the present invention.

EXAMPLES

Hereinafter, the results of the experiments that were performed to verify the effects of embodiments of the present invention will be described. The following Examples are for the purpose of explaining the effects of the embodiments. The constituent elements, the processes, and the conditions described in the Examples do not limit technical ranges of the embodiments.

Using a low-frequency melting furnace and a semi-continuous casting machine used for manufacturing commercial products, a trial production of copper alloys was performed.

In addition, using a laboratory facility, a trial production of copper alloys was performed.

Tables 8 to 10 show the alloys' compositions. In addition, Tables 11 to 16 show production steps. Regarding composition, "MM" refers to mischmetal which represents the total content of rare earth elements. Each of the production steps are explained below.

(Steps Nos. A1 to A3, AH1, AH2, A4, A5, and A10)

As shown in Table 11, using the low-frequency melting furnace and the semi-continuous casting machine used for manufacturing commercial products, a billet having a diameter of 240 mm was produced. As for raw materials, those equivalent to ones used for commercial production were used. The billet was cut into a length of 800 mm and was heated. Using a hot extruder having an officially announced capacity of 3000 tons, two round bars having a diameter of mm were extruded. The extruded bars were cooled at several different cooling rates in a temperature range from 530° C. to 450° C. The temperature was measured using a radiation thermometer mainly in a period from the middle stage to the final stage of the hot extrusion process about three or four seconds after the bars came out of the extruder. For the temperature measurement during hot extrusion, hot forging, and hot rolling described below, IGA 8Pro/MB20, a radiation thermometer manufactured by Luma Sense Technologies Inc., was used.

It was verified that the average temperature of the extruded material was within ±5° C. of a temperature shown in Table 11 (i.e., within a range from (temperature shown in the table)−5° C. to (temperature shown in the table)+5° C.)

In Steps Nos. A1, A2, A4, and A5, the extrusion temperature was 580° C. In Steps Nos. A3 and AH2, the extrusion temperature was 620° C. In Step No. AH1, the extrusion temperature was 680° C. The average cooling rate in a temperature range from 530° C. to 450° C. after hot extrusion was 40° C./min in Step No. A3 and was 70° C./min in Step No. AH2. In steps other than Steps Nos. A3, AH2, and A10, the average cooling rate was 30° C./min.

After completion of the hot extrusion, in Step No. A1, straightness correction was performed in a cold state. During the straightness correction, the cold working ratio was 0% in effect. In steps other than Steps Nos. A1 and A10, the extruded material having a diameter of 24.0 mm was cold drawn to reduce the diameter to 23.4 mm (working ratio: 4.9%). Further, in Steps Nos. A4 and A5, the material of Step No. A1 was put into a mold then low-temperature annealing was performed at 310° C. for 100 minutes and 350° C. for 60 minutes, respectively. In Step No. A10, the material was hot-extruded to modify the diameter to 45 mm at 570° C. and the average cooling rate for the temperature range from 530° C. to 450° C. was set to be 20° C./min. The material of Step No. A10 was used for a forging experiment.

Here, regarding the materials on which low-temperature annealing was performed, the annealing conditional expression f9 shown below was calculated.

$f9=(T-200)\times(t)^{1/2}$

T: temperature (material's temperature) (° C.)
t: heating time (min)

In addition, low-temperature annealing was performed on bars arranged (stacked in four tiers) in a steel mold having a recessed cross-section, a width of 500 mm, a height of 300 mm, a thickness of 10 mm, and a length of 4000 mm. Next, low-temperature annealing was performed, and bend of the bars was measured.

All the measurement results of bending were good standing at 0.1 mm or less for one meter of the test sample bars obtained by performing Step No. A4 or A5 on Alloy No. S1.

(Steps Nos. C1 to C3, CH1, CH2, and C10)

As shown in Table 12, in a laboratory, raw materials were melted at a predetermined component ratio. Test materials to which inevitable impurity elements were intentionally added were also prepared. The molten alloy was cast into a mold having a diameter of 100 mm and a length of 180 mm to prepare a billet (Alloys Nos. S20 to S41 and S101 to S114).

Incidentally, molten alloy was obtained also from a melting furnace used for manufacturing commercial products, then impurities such as Fe, Sn, etc. were intentionally added to the molten alloy, which was cast into a metal mold having a diameter of 100 mm and a length of 180 mm to prepare a billet (Alloys Nos. S1.1 to S1.7).

This billet was heated and extruded into a round bar having a diameter of 24 mm. In Steps Nos. C1 and C10, the extrusion temperature was 590° C. In Steps Nos. C2 and CH2, the extrusion temperature was 620° C. In Step No. CH1, the extrusion temperature was 680° C. The average cooling rate in a temperature range from 530° C. to 450° C. after extrusion was 65° C./min in Step No. CH2 and 25° C./min in Steps Nos. C1, C2, and CH1. Next, straightness correction was performed (working ratio: 0%) on bars whose straightness was poor, but not on those having good straightness. In Step No. C3, a bar subjected to Step No. C1 was used, and low-temperature annealing was performed at 320° C. for 60 minutes without putting the bar into a mold.

In Step No. C10, a forging material was prepared by extruding a bar to a diameter of 45 mm at an extrusion temperature of 590° C. and cooling the bar at an average cooling rate of 20° C./min in a temperature range from 530° C. to 450° C.

(Step No. D)

In Step No. D1, a molten alloy was obtained from a laboratory and was cast into a metal mold having an inner diameter of 45 mm. As shown in Table 13, the molten alloy was cooled at an average cooling rate of 40° C./min in a temperature range from 530° C. to 450° C. in the process of cooling, and the resultant material was used as a forging material in Step No. F.

(Step No. E)

As shown in Table 14, Step No. E1 is a step including annealing. Step No. E1 is a step mainly for slender bars having a diameter of, for instance, 7 mm or less. However, as the machining test was unable to be performed on a slender bar, an extruded bar having a large diameter was used for the testing instead.

In Step No. E1, a material having a diameter of 24 mm obtained in Step No. C1 was cold drawn to 20.0 mm, heat treated at 480° C. for 60 minutes, then cold drawn to a diameter of 19.0.

(Steps Nos. F1 to F4, FH1, and FH2)

As shown in Table 15, round bars having a diameter of 45 mm obtained in Steps Nos. A10, C10, and D1 were cut to a length of 180 mm. This round bar was horizontally placed and forged to a thickness of 16 mm using a press machine having a hot forging press capacity of 150 tons. About three to four seconds immediately after the material was hot forged to a predetermined thickness (upon completion of the hot forging), the temperature was measured using a radiation thermometer and a contact thermometer. It was verified that the hot forging temperature (hot working temperature) was within ±5° C. of a temperature shown in Table 15 (i.e., within a range from (temperature shown in the table)−5° C. to (temperature shown in the table)+5° C.)

In Steps Nos. F1, F2, F3, FH1, and FH2, hot forging was performed at varied temperatures—specifically, at 640° C., 600° C., 625° C., and 690° C., respectively. In the cooling process, cooling was performed in a temperature range from 530 to 450° C. at a cooling rate of 10° C./min in Step No. F1, 28° C./min in Steps Nos. F2, F3, and FH1, and 70° C./min in Step No. FH2. In Step No. F4, low-temperature annealing was performed at 340° C. for 40 minutes on the forged product of Step No. F1.

The hot forged materials were cut and provided for machining tests and experiments to examine mechanical characteristics.

(Step Nos. G1 to G3, GH1)

In a laboratory, raw materials were melted at a predetermined component ratio. At this time, inevitable impurities such as Fe or Sn were intentionally added in consideration of actual production. Molten alloy was then cast into a mold having an inner diameter of 35 mm and a depth of 200 mm.

In consideration of actual casting, when the temperature of the casting reached about 700° C., the test sample was removed from the mold and was cooled to a room temperature by natural cooling, temperature retention, or forced cooling by setting the average cooling rate in each of the temperature ranges from 650° C. to 550° C., from 530° C. to 450° C., and from 430° C. to 350° C. to any one of the four kinds of values. Table 16 shows a list of the cooling conditions. Regarding the temperature measurement, the temperature of the casting was measured using a contact thermometer, and the average cooling rate in each of the temperature ranges was adjusted to a predetermined value.

The above-described test materials were evaluated for the following items. The evaluation results are shown in Tables 17 to 29.

(Observation of Metallographic Structure)

The metallographic structure was observed using the following method, then the area ratios (%) of the respective phases such as α phase, β phase, γ phase, κ phase, and μ phase were measured by an image analysis method. It was assumed that α' phase, β' phase, and γ' phase were included in α phase, β phase, and γ phase respectively.

Each of the test materials (bars and forged products) was cut parallel to its long side or parallel to a flowing direction of the metallographic structure. Next, the surface was polished (mirror-polished) and was etched with a mixed solution of hydrogen peroxide water and ammonia water. For etching, an aqueous solution obtained by mixing 3 ml of 3 vol % hydrogen peroxide water and 22 ml of 14 vol % ammonia water was used. At a room temperature of about 15° C. to about 25° C., the polished metal surface was dipped in the aqueous solution for about 2 seconds to about 5 seconds.

The metallographic structure was observed with a metallographic microscope at a magnification of 500× to obtain the proportions of the phases and investigate where Bi particles were present and whether any P-containing compounds were present. Depending on the state of the metallographic structure, metallic phases, Bi particles, and P-containing compounds were observed at a magnification of 1000×. In micrographs of five visual fields, respective phases (α phase, β phase, γ phase, κ phase, and μ phase) were manually painted using image processing software "Photoshop CC". Next, the micrographs were binarized using image analysis software "WinROOF 2013" to obtain area ratio of each of the phases. Specifically, proportion of each of the phases was obtained by averaging area ratios of each phase in the five visual fields. In this area ratio calculation, the aggregate of the area ratio of each and every constituent phase excluding oxides, sulfides, Bi particles, Pb particles, precipitates (P-containing compounds are excluded), and crystallized particles constitutes 100%.

Then P-containing compounds were observed. The minimum size of a precipitated particle of a P-containing compound that can be observed at 500× with a metallographic microscope is about 0.5 μm. Among precipitates which can be observed with a 500× metallographic microscope and distinguished and recognized with a 1000× metallographic microscope, whether any P-containing compounds were present was determined first in the same manner as when the proportion of the phases were observed. Although depending on the P content and the production conditions, P-containing compounds are present in one visual field of the microscope in a quantity from several to several hundreds. As most of the P-containing compounds were present in β phase or at a phase boundary between α phase and 3 phase, they were assumed to be included in β phase. Further, γ phase having a size of less than 0.5 μm is sometimes present in β phase. Phases having a size of less than 0.5 μm are unable to be identified with a metallographic microscope at a magnification of 500× or in some cases even at a magnification of 1000×. Therefore, in embodiments of the present invention, ultrafine γ phase was treated as β phase. When observed with a metallographic microscope, a P-containing compound appears blackish grey. Therefore, it is distinguishable from a precipitate or a compound formed of Mn or Fe which has a light blue color.

Bi particles were observed with a metallographic microscope in the same manner as when P-containing compounds were observed. Bi particles and P-containing compounds can be clearly distinguished in a metallographic micrograph. Regarding distinction between Bi particles and Pb particles (including particles mainly composed of Pb), they can be distinguished because Bi particles are circular but Pb particles have an extended appearance since Pb is deformed in the process of polishing due to its softness. When it was difficult to distinguish them from one another, an electron microscope having an analytical function, for example, EPMA was used for the determination. If Bi particles were found in an α phase crystal grain in a micrograph, it was determined that Bi particles were present in α phase, and the evaluation was "B" (Good). Even if Bi particles were present in α phase, if the location was at a boundary between α phase and β phase, it was determined that Bi particles were not present in α phase. If Bi particles were not present in α phase, the evaluation was "D" (poor).

When it was difficult to identify phases, precipitates, P-containing compounds, or Bi particles, they were identified by an electron backscattering diffraction pattern (FE-SEM-EBSP) method in which an EDS equipped in a field emission scanning electron microscope (FE-SEM) (JSM-7000F, manufactured by JEOL Ltd.) was used, at a magnification of 500× or 2000× under the conditions of an acceleration voltage of 15 kV and a current value of 15 (set value). When no P-containing compound was observed in a test material containing P at the stage of observation using a metallographic microscope, presence of P-containing compound was checked at a magnification of 2000×.

In addition, regarding some alloys, when the Si concentration in α phase, β phase, and γ phase (particularly the concentration in β phase) was measured and when it was difficult to determine the presence of P-containing compound, or when Bi particles were small, quantitative analysis or qualitative analysis was performed with an X-ray microanalyzer on a secondary electron image and a compositional image taken at a magnification of 2000×. The measurement was performed using "JXA-8230" (manufactured by JEOL Ltd.) at an acceleration voltage of 20 kV and a current value of $3.0 \times 10^{-8}$ A.

If P-containing compounds were found when observed with a metallographic microscope, the alloy was evaluated as "B" (good) in terms of presence of P-containing compound. If a P-containing compound was found when observed at a magnification of 2000×, the alloy was evaluated as "C" (fair) in terms of presence of P-containing compound. If no P-containing compound was found, the alloy was evaluated as "D" (poor) in terms of presence of P-containing compound. Those evaluated as "C" (fair) regarding presence of P-containing compound are also acceptable in embodiments of the present invention. In the tables, the evaluation results regarding presence of P-containing compounds are shown in the "Presence of P Compound in β phase" row.

(Electrical Conductivity)

For the measurement of electrical conductivity, an electrical conductivity measurement device (SIGMATEST D2.068, manufactured by Foerster Japan Ltd.) was used. In this specification, the terms "electric conductivity" and "electrical conductivity" are meant to have the same meaning. In addition, thermal conductivity and electrical conductivity are closely corelated. Therefore, the higher the electrical conductivity, the better the thermal conductivity.

(Tensile Strength/Elongation)

Each of the test materials was processed in accordance with specimen No. 10 of JIS Z 2241, and their tensile strength and elongation were measured.

If a hot extruded material or a hot forged material not having undergone any cold working step has a tensile strength of preferably 430 N/mm$^2$ or higher, more preferably 470 N/mm$^2$ or higher, or still more preferably 510 N/mm$^2$ or higher, the material is considered to have the highest level of tensile strength among free-cutting copper alloys. With such a high tensile strength, a reduction in the thickness and weight of parts and components used in various fields or an increase in allowable stress can be realized. In addition, regarding the balance between strength and elongation, when tensile strength is represented by S (N/mm$^2$) and elongation is represented by E (%), if the value of the characteristic relational expression f8=S×(100+E)/100 which indicates the balance between strength and ductility is preferably 580 or higher, more preferably 620 or higher, or still more preferably 650 or higher, it can be said that the alloy has a very high standard of balance between strength and elongation among hot-worked copper alloys having machinability.

(Hardness/Impact Value)

For castings, the hardness of each of the test materials was measured using a Vickers hardness tester with a load of 49 kN applied. A high strength casting would have a Vickers hardness of preferably 100 Hv or higher and more preferably 110 Hv or higher. Then, it can be said that the casting has a very high level of hardness among free-cutting copper alloy castings.

In the impact test, a U-notched test piece (notch depth: 2 mm, notch bottom diameter: 1 mm) according to JIS Z 2242 was collected. Using an impact blade having a radius of 2 mm, a Charpy impact test was performed to measure the impact value. When the Charpy impact test value is at least 25 J/cm$^2$ or higher, there is no problem regarding toughness and so-called "brittleness".

(Measurement of Melting point and Castability Test)

The remainder of the melt used for the preparation of test samples of casting was used. A thermocouple was put into the melt to take liquidus temperature and solidus temperature, then the solidification temperature range was obtained.

In addition, the melt at 1000° C. was cast into an iron Tatur mold, and whether defects such as holes or shrinkage cavities were present in the portion that solidified last or in its vicinity was closely examined (Tatur Shrinkage Test).

Figure 3:
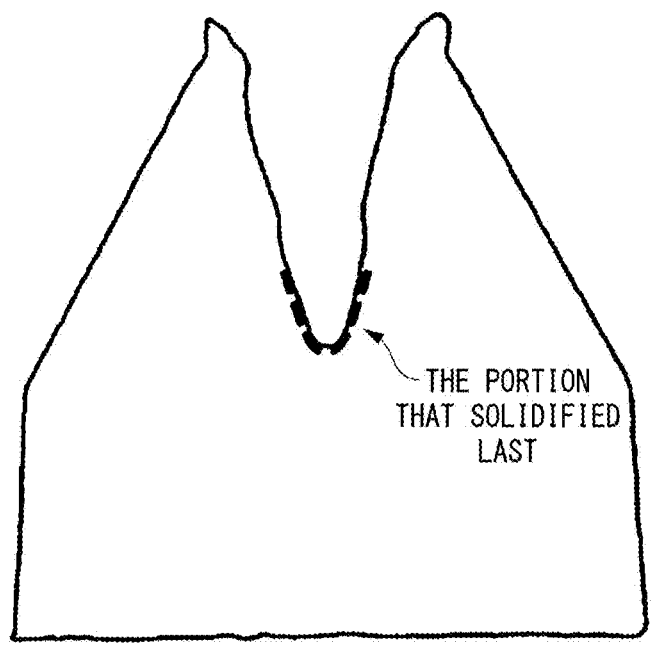
FIG. 3 is a diagram showing a cross-section of a casting obtained by casting in a Tatur mold in a Tatur Shrinkage Test.

Specifically, the casting was cut so that a vertical section including the last-solidified portion as shown in the illustration of a vertical section of FIG. 3 can be obtained. The surface of the test sample was polished with Emery paper of up to 400 grit, then a macrostructure was exposed using nitric acid to easily identify defective portions. Next, whether micro defects were present was examined by a penetration test.

Castability was evaluated as follows. When, in the vertical section, a pattern indicating that the portion was defective appeared in a location within 3 mm from the surface of the last-solidified portion or its vicinity, but no defect appeared anywhere more than 3 mm away from the surface of the last-solidified portion or its vicinity, castability was evaluated as "B" (good). When a pattern indicating that the portion was defective appeared in a location within 6 mm from the surface of the last-solidified portion or its vicinity, but no defect occurred anywhere more than 6 mm away from the last-solidified portion or its vicinity, castability was evaluated as "C" (acceptable or fair). When any defect occurred in a location more than 6 mm away from the surface of the last-solidified portion or its vicinity, castability was evaluated as "D" (defective or poor).

The last-solidified portion is usually present in the portion comprising additionally poured melt due to a good casting plan, but sometimes it is partially present in the main body of the casting. In the case of an alloy casting according to an embodiment of the present invention, the result of the Tatur shrinkage test and the solidification temperature range have a close relationship. When the solidification temperature range was 15° C. or lower or 20° C. or lower, castability was evaluated as "B" in many cases. When the solidification temperature range exceeded 25° C., castability was evaluated as "D" in many cases. When the solidification temperature range was 25° C. or lower, castability was evaluated as either "B" or "C". In addition, when the content of inevitable impurities was large, the solidification temperature range was wide, and the evaluation of the castability was bad.

<Machinability Test Using Lathe>

Machinability was evaluated by the machining test using a lathe as described below.

Test materials having a diameter of 14 mm were prepared by machining from a hot extruded bar, a hot forged product, and a casting. A carbide tool (chip) K10 not equipped with a chip breaker was attached to a lathe. Using this lathe, the circumference of the test material having a diameter of 14 mm was machined on dry conditions with a rake angle of 0°, a nose radius of 0.4 mm, a clearance angle of 6°, a cutting speed of 40 m/min, a cutting depth of 1.0 mm, and a feed rate of 0.11 mm/rev.

Signals emitted from a dynamometer (AST tool dynamometer AST-TL1003, manufactured by Mihodenki Co., Ltd.) composed of three portions attached to the tool were converted into electrical voltage signals and recorded on a recorder. Next, these signals were converted into cutting resistance (principal cutting force, feed force, thrust force, N). In the machining test, in order to suppress influence from wear on the insert, each sample was measured four times by reciprocating A→B→C→ . . . C→B→A twice. The cutting resistance can be obtained from the following expression.

Cutting resistance (combined force comprising principal cutting force, feed force, and thrust force)= ((principal cutting force)$^2$+(feed force)$^2$+(thrust force)$^2$)$^{1/2}$ Incidentally, each sample was measured four times, and their average value was adopted. Assuming that the cutting resistance of a commercially available free-cutting brass bar, C3604, made of an alloy including 59 mass % Cu, 3 mass % Pb, 0.2 mass % Fe, 0.3 mass % Sn, and Zn as the balance was 100, the relative value of the cutting resistance (machinability index) of each sample was calculated for relative evaluation. The higher the machinability index, the better the machinability. The "Combined Force" in the tables refers to a combined force comprising a principal cutting force, a feed force, and a thrust force, which represents the machinability index.

Machinability index was calculated as follows.

An index representing the results of the machining test performed on a sample (machinability index)=(cutting resistance of C3604/cutting resistance of the sample)×100

Concurrently, chips were collected, and machinability was evaluated based on the shape of the chips. Problems that occur in actual machining are entanglement of chips around the tool and bulking of chips. Therefore, regarding chip shape, if the average length of the generated chips was less than 1 mm, it was evaluated as "A" (excellent). If the average length was 1 mm or more and less than 3 mm, it was evaluated as "B" (good). If the average length of the generated chips was 3 mm or more and less than 10 mm, it was evaluated as "C" (fair). When the average length of the generated chips was 10 mm or longer, it was evaluated as "D" (poor). Incidentally, chips generated at the beginning of machining were excluded from the subject of the evaluation. Only those evaluated as either "A" or "B" under the aforementioned turning conditions were regarded as acceptable since a high level of drillability is aimed at in embodiments of the present invention.

Cutting resistance of a material depends on the shear strength and the tensile strength of the material, and there is a tendency that the higher the strength of a material, the higher the cutting resistance of the material. In the case of a high strength material, if the cutting resistance is approximately 40% points higher than that of a free-cutting brass bar including 1% to 4 mass % Pb, the cutting resistance is considered to be practically good. The shear strength of an extruded material according to an embodiment of the present invention is about 1.2 times that of C3604, a free-cutting brass including 3 mass % Pb. Therefore, machinability of embodiments of the present invention was evaluated based on the criteria that about 70 was the boundary machinability index (boundary value). As a high level of machinability is aimed at in the embodiments, when the machinability index was 85 or higher, the alloy was evaluated to have excellent machinability (evaluation: A). When the machinability index was 75 or higher and lower than 85, the alloy was evaluated to have good machinability (evaluation: B). When the machinability index was 66 or higher and lower than 75, the alloy was evaluated to have fair machinability (evaluation: C). When the machinability index was lower than 66, the alloy was evaluated to have poor machinability (evaluation: D).

When there isn't much difference in strength, there is a correlation between chip shape and machinability index. That is, if the machinability index of an alloy is high, the alloy's chip breakability tends to be good, and this correlation can be numerically expressed. Only those evaluated as "A" or "B" under the aforementioned turning conditions were regarded as acceptable.

Incidentally, the machinability index of an alloy comprising 58.1 mass % Cu, 0.01 mass % Pb, and Zn as the balance, which is a free-cutting copper alloy having a high Zn concentration and including 0.01 mass % Pb and about 50% β phase, was 39, and the alloy's chip length was longer than mm. Likewise, the machinability index of an alloy comprising 55 mass % Cu, 0.01 mass % Pb, and Zn as the balance, which is a β single-phase copper alloy not including Si and including 0.01 mass % Pb, was 41, and the alloy's chip length was longer than 10 mm.

Figure 2:
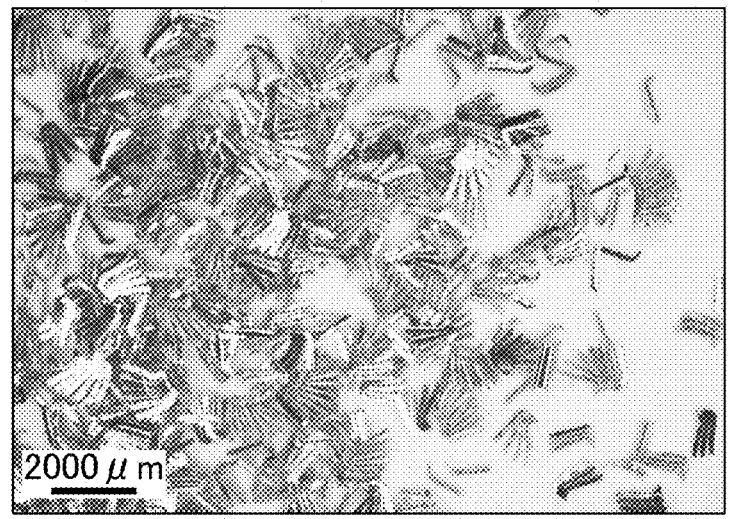
FIG. 2 is a picture of a chip collected after machining test No. T09.

The external appearance of the chips generated in Test No. T09 (Alloy No. S1) whose alloy comprises 1.08 mas % Si, 0.27 mass % Bi, 0.005 mass % Pb, and 0.056 mass % P, was produced by hot-forging at 640° C., have particles mainly composed of Bi present in the α phase, and in which P-containing compounds are present is shown in FIG. 2. The chips produced in Test No. T09 (Alloy No. S1) were finely broken with their average length being shorter than 1 mm.

<Drilling Test>

By using a drilling machine with a JIS standard drill made of high-speed steel having a diameter of 3.5 mm attached, 10 mm-deep holes were drilled on dry conditions at a rotation speed of 1250 rpm and a feed rate of 0.17 mm/rev. Voltage fluctuation in a circumferential direction and an axial direction were measured during drilling using an AST tool dynamometer, and torque and thrust during drilling were calculated. Each sample was measured four times, and their average value was adopted. Assuming that the torque and the thrust of C3604, a commercially available free-cutting brass bar comprising 59 mass % Cu, 3 mass % Pb, 0.2 mass % Fe, 0.3 mass % Sn, and Zn as the balance, was 100, the relative values (torque index, thrust index) of the torque and the thrust of each sample were calculated for relative evaluation. The higher the machinability index (torque index, thrust index, drill index), the better the machinability. In the drilling, in order to suppress influence from wear on the drill, each sample was measured four times by reciprocating A→B→C→ . . . C→B→A twice.

That is, the machinability index was obtained as follows.

Index representing the results of the drilling test performed on the sample (drill index)=(torque index+thrust index)/2

Torque index of the sample=(torque of C3604/torque of the sample)×100

Thrust index of the sample=(thrust of C3604/thrust of the sample)×100

During the third test, chips were collected. Machinability was evaluated based on the chip shape. Problems that occur in actual machining are entanglement of chips around the tool and bulking of chips. Therefore, regarding chip shape, if the average number of windings per chip was a half or less, it was evaluated as "A" (excellent). If the average number of windings per chip was more than a half and one or less, it was evaluated as "B" (good). If the average number of windings per chip was more than one and two or less, it was evaluated as "C" (fair). If the average number of windings per chip was more than two, it was evaluated as "D" (poor). Incidentally, Chips generated at the beginning of drilling were excluded from the subject of the evaluation. Only those evaluated as either "A" or under the above-mentioned drilling conditions were regarded as acceptable since a high level of drillability is aimed at in the embodiments of the present invention.

If the torque and the thrust of a high-strength material are higher than the cutting resistance of a free-cutting brass bar including 1% to 4 mass % Pb by about 40% points, the material is considered to be practically good regarding torque and thrust. In embodiments of the present invention, the machinability was evaluated based on the criteria that about 70% was the boundary machinability index (boundary value). Specifically, when the drill index was 78 or higher, the machinability was evaluated to be excellent (evaluation: A). When the drill index was 72 or higher and lower than 78, the machinability was evaluated to be good (evaluation: B). When the drill index was 67 or higher and lower than 72, the machinability was evaluated to be fair (evaluation: C). When the machinability index was lower than 67, the machinability was evaluated to be unacceptable (evaluation: D; poor). Only those evaluated as either "A" or "B" under the aforementioned drilling conditions were regarded as acceptable since a high level of drillability is aimed at in the embodiments of the present invention.

When there is no difference in strength, chip shape and torque index have a strong relationship. When torque index is high, chip breakability tends to be high. Therefore, chip shape can be numerically compared by torque index. In an alloy according to an embodiment of the present invention, the shear strength, which is more or less proportional to the tensile strength, is about 1.2 times that of a free-cutting brass including 3 mass % Pb. Since cutting resistance has a strong relationship with shear strength, it is necessary to take the material's strength into consideration.

Incidentally, the drill index of an alloy comprising 58.1 mass % Cu, 0.01 mass % Pb, and Zn as the balance, which is a free-cutting copper alloy having a high Zn concentration and including 0.01 mass % Pb and about 50% β phase, was 49 (the torque index was 46, and the thrust index was 52), and the number of windings per chip exceeded 3. Likewise, the drill index of a β single-phase copper alloy comprising 55 mass % Cu, 0.01 mass % Pb, and Zn as the balance, which is an alloy not including Si and including 0.01 mass % Pb, was 61 (the torque index was 53, and the thrust index was 68), and the number of windings per chip exceeded 3.

Regarding tools dedicated to precision drilling, with the recent accelerated trend toward reduction in the size of various devices and components, drilling tiny holes on such components is increasingly required. For example, there are a wide range of needs for tools such as those for drilling pin holes in a metal mold, tiny holes in a thread extruder mold, holes in a component of a device relating to a semiconductor such as a printed circuit board or to an optical device. A reduction in the size of various industrial products such as home information appliances, medical devices, and automobile components is expected to be increasingly accelerated. In this trend, drill manufacturers are attempting to expand the lineup of carbide drills having a diameter of 0.1 mm or less. In the past, the ratio between the diameter and the depth of a hole to be drilled was limited to about 10. However, recently, a number of drills that are capable of drilling a hole whose ratio between its diameter and depth is approximately 100 even if the diameter of the hole is 0.5 mm or less have emerged. Now that the potential of small and deep hole drilling has been expanded by such drills, materials having excellent machinability are in demand in this field.

(Hot Working Test)

The bars of Steps Nos. A1, C1, and C10 and the cast material of Step No. D were machined to a diameter of 15 mm and a length of 25 mm. The test materials were held at 600° C. for 20 minutes. Subsequently, the test materials were vertically placed and compressed to a thickness of 5 mm using an Amsler testing machine having a hot compression capacity of 10 tons equipped with an electric furnace at a strain rate of 0.02/sec and a working ratio of 80%. During the hot working, the test material was held at 600° C.

Hot deformability was evaluated based on whether any cracks that were visible with bare eyes were present and whether there was any large corrugation formed on the surface. Although depending on the capability of the facility used or the hot working ratio such as an extrusion ratio applied, 30 N/mm$^2$ is a boundary value of hot deformation resistance up to which hot extruded bars that are commonly manufactured can be produced without any problem. If no cracking occurred, no large corrugation was formed, and hot deformation resistance was 30 N/mm² or lower in a hot working test performed at 600° C., hot workability evaluation was "B" (good). If either hot deformability or hot deformation resistance did not satisfy the above-described standards, hot workability evaluation was "D" (acceptable, fair) with some reservations. If neither hot deformability nor hot deformation resistance satisfied the above-described standards, hot workability evaluation was "D" (non-conforming, poor). The evaluation results are shown in Tables 17, 19, 21, 23, 25, and 27.

Hot extrusion or hot forging at 600° C. is rarely performed on a common copper alloy. In a test of a free-cutting copper alloy including Pb at 600° C., cracking occurs, and hot deformation resistance exceeds 30 N/mm². By performing hot working at a low temperature, high strength, superb balance between high strength and elongation, and excellent machinability can be obtained, and improvement of dimensional accuracy and an increase in tool life can be realized, which in turn is eco-friendly.

When the value of the composition relational expression f1 was lower than 56.3, a large corrugation was formed. When the value of the composition relational expression f1 was higher than 59.5, deformation resistance exceeded 30 N/mm².

TABLE 8

| Alloy No. | Component Composition (mass %) | | | | | | Inevitable Impurities (mass %) | | | | | | | | | | Composition Relational Expression | |
|---|---|---|---|---|---|---|---|---|---|---|---|---|---|---|---|---|---|---|
| | Cu | Si | P | Pb | Bi | Zn | Fe | Mn | Cr | Co | Sn | Al | Ni | Ag | Sb | MM | f1 | f2 |
| S1 | 63.0 | 1.08 | 0.056 | 0.005 | 0.27 | Balance | 0.07 | 0.02 | 0.01 | 0.00 | 0.08 | 0.03 | 0.05 | 0.01 | 0.01 | 0.00 | 57.9 | 0.275 |
| S1.1 | 63.0 | 1.08 | 0.055 | 0.005 | 0.27 | Balance | 0.07 | 0.02 | 0.01 | 0.00 | 0.08 | 0.03 | 0.05 | 0.01 | 0.01 | 0.00 | 57.9 | 0.275 |
| S1.2 | 63.1 | 1.10 | 0.055 | 0.005 | 0.26 | Balance | 0.23 | 0.07 | 0.01 | 0.00 | 0.08 | 0.03 | 0.05 | 0.01 | 0.01 | 0.00 | 57.9 | 0.265 |
| S1.3 | 62.9 | 1.08 | 0.056 | 0.005 | 0.27 | Balance | 0.30 | 0.08 | 0.01 | 0.01 | 0.08 | 0.03 | 0.05 | 0.01 | 0.01 | 0.00 | 57.8 | 0.275 |
| S1.4 | 63.0 | 1.08 | 0.053 | 0.005 | 0.27 | Balance | 0.29 | 0.22 | 0.01 | 0.01 | 0.08 | 0.03 | 0.05 | 0.01 | 0.01 | 0.00 | 57.9 | 0.275 |
| S1.5 | 62.8 | 1.07 | 0.057 | 0.005 | 0.27 | Balance | 0.07 | 0.04 | 0.01 | 0.00 | 0.20 | 0.08 | 0.05 | 0.01 | 0.01 | 0.00 | 57.8 | 0.275 |
| S1.6 | 63.1 | 1.09 | 0.056 | 0.005 | 0.27 | Balance | 0.07 | 0.02 | 0.01 | 0.00 | 0.28 | 0.09 | 0.05 | 0.01 | 0.01 | 0.00 | 58.0 | 0.275 |
| S1.7 | 63.0 | 1.08 | 0.055 | 0.005 | 0.27 | Balance | 0.07 | 0.02 | 0.01 | 0.00 | 0.35 | 0.14 | 0.05 | 0.01 | 0.01 | 0.00 | 57.9 | 0.275 |
| S20 | 60.7 | 0.67 | 0.048 | 0.012 | 0.46 | Balance | 0.02 | 0.00 | 0.03 | 0.03 | 0.00 | 0.00 | 0.00 | 0.00 | 0.00 | 0.00 | 57.7 | 0.472 |
| S21 | 59.5 | 0.51 | 0.055 | 0.026 | 0.26 | Balance | 0.00 | 0.00 | 0.00 | 0.02 | 0.00 | 0.00 | 0.00 | 0.03 | 0.04 | 0.01 | 57.2 | 0.286 |
| S21.1 | 59.5 | 0.50 | 0.053 | 0.028 | 0.26 | Balance | 0.00 | 0.00 | 0.00 | 0.02 | 0.00 | 0.00 | 0.00 | 0.03 | 0.04 | 0.01 | 57.2 | 0.288 |
| S21.2 | 59.5 | 0.51 | 0.052 | 0.025 | 0.26 | Balance | 0.15 | 0.09 | 0.00 | 0.02 | 0.02 | 0.00 | 0.00 | 0.03 | 0.04 | 0.01 | 57.2 | 0.285 |
| S21.3 | 59.4 | 0.50 | 0.054 | 0.024 | 0.26 | Balance | 0.22 | 0.14 | 0.00 | 0.02 | 0.02 | 0.00 | 0.00 | 0.03 | 0.04 | 0.01 | 57.1 | 0.284 |
| S21.4 | 59.5 | 0.51 | 0.052 | 0.026 | 0.26 | Balance | 0.24 | 0.28 | 0.00 | 0.02 | 0.02 | 0.00 | 0.00 | 0.03 | 0.04 | 0.01 | 57.2 | 0.286 |
| S22 | 59.1 | 0.38 | 0.045 | 0.005 | 0.48 | Balance | 0.01 | 0.00 | 0.00 | 0.00 | 0.01 | 0.05 | 0.05 | 0.00 | 0.01 | 0.00 | 57.5 | 0.485 |
| S22.2 | 59.1 | 0.38 | 0.041 | 0.005 | 0.48 | Balance | 0.01 | 0.00 | 0.00 | 0.00 | 0.01 | 0.05 | 0.05 | 0.00 | 0.01 | 0.00 | 57.5 | 0.485 |
| S23 | 62.5 | 0.90 | 0.035 | 0.011 | 0.93 | Balance | 0.01 | 0.00 | 0.00 | 0.00 | 0.00 | 0.01 | 0.00 | 0.00 | 0.00 | 0.00 | 58.6 | 0.941 |
| S24 | 62.2 | 0.92 | 0.040 | 0.012 | 0.43 | Balance | 0.00 | 0.00 | 0.00 | 0.00 | 0.00 | 0.02 | 0.00 | 0.01 | 0.00 | 0.01 | 58.0 | 0.442 |
| S25 | 61.3 | 0.69 | 0.036 | 0.045 | 0.70 | Balance | 0.01 | 0.00 | 0.00 | 0.00 | 0.00 | 0.00 | 0.00 | 0.00 | 0.00 | 0.00 | 58.3 | 0.745 |

Note:
"MM" refers to mischmetal.

TABLE 9

| Alloy No. | Component Composition (mass %) | | | | | | Inevitable Impurities (mass %) | | | | | | | | | | Composition Relational Expression | |
|---|---|---|---|---|---|---|---|---|---|---|---|---|---|---|---|---|---|---|
| | Cu | Si | P | Pb | Bi | Zn | Fe | Mn | Cr | Co | Sn | Al | Ni | Ag | Sb | MM | f1 | f2 |
| S26 | 62.3 | 1.03 | 0.048 | 0.014 | 0.17 | Balance | 0.05 | 0.03 | 0.00 | 0.00 | 0.05 | 0.00 | 0.05 | 0.00 | 0.03 | 0.01 | 57.4 | 0.184 |
| S26.1 | 62.3 | 1.04 | 0.050 | 0.014 | 0.17 | Balance | 0.05 | 0.03 | 0.00 | 0.00 | 0.25 | 0.08 | 0.05 | 0.00 | 0.03 | 0.01 | 57.4 | 0.184 |
| S26.2 | 62.2 | 1.03 | 0.046 | 0.013 | 0.17 | Balance | 0.05 | 0.03 | 0.00 | 0.00 | 0.35 | 0.16 | 0.05 | 0.00 | 0.03 | 0.01 | 57.3 | 0.183 |
| S26.3 | 62.1 | 1.02 | 0.047 | 0.012 | 0.17 | Balance | 0.05 | 0.03 | 0.00 | 0.00 | 0.05 | 0.00 | 0.05 | 0.00 | 0.03 | 0.01 | 57.3 | 0.182 |
| S26.4 | 62.3 | 1.03 | 0.045 | 0.012 | 0.17 | Balance | 0.05 | 0.03 | 0.00 | 0.00 | 0.05 | 0.00 | 0.05 | 0.00 | 0.03 | 0.01 | 57.4 | 0.182 |
| S26.5 | 62.1 | 1.02 | 0.048 | 0.014 | 0.17 | Balance | 0.05 | 0.03 | 0.00 | 0.00 | 0.27 | 0.07 | 0.05 | 0.00 | 0.03 | 0.01 | 57.3 | 0.184 |
| S26.6 | 62.3 | 1.04 | 0.045 | 0.016 | 0.17 | Balance | 0.05 | 0.03 | 0.00 | 0.00 | 0.37 | 0.14 | 0.05 | 0.00 | 0.03 | 0.01 | 57.4 | 0.186 |
| S27 | 61.4 | 0.76 | 0.040 | 0.017 | 0.23 | Balance | 0.00 | 0.06 | 0.00 | 0.00 | 0.02 | 0.00 | 0.00 | 0.00 | 0.00 | 0.00 | 57.9 | 0.247 |
| S28 | 61.9 | 0.88 | 0.058 | 0.045 | 0.14 | Balance | 0.00 | 0.00 | 0.00 | 0.02 | 0.00 | 0.00 | 0.00 | 0.00 | 0.00 | 0.00 | 57.7 | 0.185 |
| S29 | 61.3 | 0.65 | 0.031 | 0.022 | 0.21 | Balance | 0.00 | 0.00 | 0.00 | 0.02 | 0.00 | 0.00 | 0.00 | 0.00 | 0.00 | 0.00 | 58.3 | 0.232 |
| S30 | 59.7 | 0.34 | 0.072 | 0.007 | 0.30 | Balance | 0.08 | 0.05 | 0.02 | 0.00 | 0.05 | 0.03 | 0.00 | 0.00 | 0.00 | 0.00 | 58.2 | 0.307 |
| S30.1 | 59.7 | 0.33 | 0.071 | 0.006 | 0.30 | Balance | 0.22 | 0.15 | 0.02 | 0.00 | 0.05 | 0.03 | 0.00 | 0.00 | 0.00 | 0.00 | 58.2 | 0.306 |
| S30.2 | 59.7 | 0.34 | 0.070 | 0.006 | 0.31 | Balance | 0.28 | 0.24 | 0.02 | 0.02 | 0.05 | 0.03 | 0.00 | 0.00 | 0.00 | 0.00 | 58.2 | 0.316 |
| S31 | 59.4 | 0.32 | 0.017 | 0.023 | 0.22 | Balance | 0.02 | 0.00 | 0.00 | 0.00 | 0.00 | 0.00 | 0.00 | 0.00 | 0.00 | 0.00 | 58.0 | 0.243 |
| S32 | 57.9 | 0.33 | 0.061 | 0.011 | 0.16 | Balance | 0.00 | 0.04 | 0.00 | 0.00 | 0.00 | 0.00 | 0.00 | 0.00 | 0.00 | 0.01 | 56.4 | 0.171 |
| S33 | 61.9 | 0.65 | 0.023 | 0.031 | 0.23 | Balance | 0.00 | 0.00 | 0.00 | 0.00 | 0.00 | 0.00 | 0.00 | 0.02 | 0.00 | 0.00 | 58.9 | 0.261 |
| S34 | 59.2 | 0.24 | 0.033 | 0.012 | 0.32 | Balance | 0.01 | 0.00 | 0.00 | 0.00 | 0.03 | 0.00 | 0.00 | 0.00 | 0.00 | 0.00 | 58.2 | 0.332 |
| S34.1 | 59.1 | 0.23 | 0.031 | 0.013 | 0.32 | Balance | 0.01 | 0.00 | 0.00 | 0.00 | 0.03 | 0.00 | 0.03 | 0.00 | 0.00 | 0.00 | 58.1 | 0.333 |
| S35 | 59.4 | 0.36 | 0.066 | 0.033 | 0.11 | Balance | 0.02 | 0.00 | 0.00 | 0.00 | 0.03 | 0.00 | 0.00 | 0.00 | 0.00 | 0.00 | 57.7 | 0.143 |
| S36 | 60.5 | 0.63 | 0.006 | 0.013 | 0.17 | Balance | 0.00 | 0.00 | 0.00 | 0.00 | 0.02 | 0.00 | 0.00 | 0.02 | 0.02 | 0.00 | 57.6 | 0.183 |

Note:
"MM" refers to mischmetal.

TABLE 10

| Alloy No. | Component Composition (mass %) | | | | | | Inevitable Impurities (mass %) | | | | | | | | | | Composition Relational Experience | |
|---|---|---|---|---|---|---|---|---|---|---|---|---|---|---|---|---|---|---|
| | Cu | Si | P | Pb | Bi | Zn | Fe | Mn | Cr | Co | Sn | Al | Ni | Ag | Sb | MM | f1 | f2 |
| S37 | 62.3 | 0.99 | 0.111 | 0.012 | 0.12 | Balance | 0.00 | 0.00 | 0.00 | 0.02 | 0.00 | 0.00 | 0.00 | 0.00 | 0.00 | 0.00 | 57.6 | 0.132 |
| S38 | 64.0 | 1.05 | 0.024 | 0.031 | 0.28 | Balance | 0.00 | 0.00 | 0.00 | 0.00 | 0.00 | 0.00 | 0.00 | 0.02 | 0.00 | 0.00 | 59.1 | 0.311 |
| S39 | 61.6 | 0.74 | 0.133 | 0.120 | 0.11 | Balance | 0.00 | 0.00 | 0.00 | 0.00 | 0.01 | 0.00 | 0.00 | 0.00 | 0.00 | 0.00 | 58.1 | 0.230 |
| S40 | 59.2 | 0.34 | 0.003 | 0.025 | 0.51 | Balance | 0.02 | 0.00 | 0.00 | 0.00 | 0.00 | 0.00 | 0.00 | 0.02 | 0.02 | 0.00 | 57.8 | 0.535 |
| S41 | 63.9 | 0.98 | 0.097 | 0.015 | 0.26 | Balance | 0.00 | 0.00 | 0.00 | 0.00 | 0.00 | 0.00 | 0.00 | 0.00 | 0.00 | 0.00 | 59.3 | 0.275 |
| S101 | 57.4 | 0.31 | 0.014 | 0.008 | 0.15 | Balance | 0.03 | 0.00 | 0.00 | 0.00 | 0.00 | 0.00 | 0.00 | 0.00 | 0.00 | 0.00 | 56.0 | 0.158 |
| S102 | 58.1 | 0.16 | 0.027 | 0.032 | 0.16 | Balance | 0.00 | 0.00 | 0.00 | 0.00 | 0.02 | 0.00 | 0.00 | 0.00 | 0.00 | 0.00 | 57.4 | 0.192 |
| S103 | 59.1 | 0.30 | 0.038 | 0.011 | 0.12 | Balance | 0.01 | 0.00 | 0.00 | 0.00 | 0.00 | 0.00 | 0.00 | 0.00 | 0.00 | 0.00 | 57.7 | 0.131 |
| S104 | 59.6 | 0.34 | 0.000 | 0.091 | 0.11 | Balance | 0.00 | 0.02 | 0.00 | 0.00 | 0.00 | 0.00 | 0.00 | 0.00 | 0.00 | 0.00 | 58.1 | 0.201 |
| S105 | 61.8 | 0.41 | 0.090 | 0.005 | 0.25 | Balance | 0.01 | 0.00 | 0.00 | 0.00 | 0.00 | 0.03 | 0.00 | 0.00 | 0.00 | 0.00 | 59.9 | 0.255 |
| S106 | 64.5 | 1.28 | 0.022 | 0.012 | 0.15 | Balance | 0.00 | 0.00 | 0.01 | 0.00 | 0.02 | 0.00 | 0.00 | 0.02 | 0.00 | 0.00 | 58.4 | 0.162 |
| S106.1 | 64.5 | 1.29 | 0.023 | 0.012 | 0.15 | Balance | 0.00 | 0.00 | 0.01 | 0.00 | 0.02 | 0.00 | 0.00 | 0.02 | 0.00 | 0.00 | 58.4 | 0.162 |
| S107 | 64.8 | 1.19 | 0.043 | 0.014 | 0.20 | Balance | 0.02 | 0.00 | 0.00 | 0.00 | 0.00 | 0.00 | 0.02 | 0.00 | 0.00 | 0.00 | 59.2 | 0.214 |
| S108 | 59.0 | 0.24 | 0.121 | 0.017 | 0.14 | Balance | 0.00 | 0.00 | 0.00 | 0.00 | 0.00 | 0.00 | 0.00 | 0.00 | 0.02 | 0.00 | 57.9 | 0.157 |
| S109 | 60.5 | 0.35 | 0.098 | 0.028 | 0.15 | Balance | 0.01 | 0.00 | 0.00 | 0.00 | 0.00 | 0.01 | 0.00 | 0.00 | 0.00 | 0.00 | 58.9 | 0.178 |
| S110 | 58.3 | 0.28 | 0.112 | 0.018 | 0.08 | Balance | 0.01 | 0.00 | 0.00 | 0.00 | 0.00 | 0.00 | 0.00 | 0.00 | 0.00 | 0.00 | 56.9 | 0.098 |
| S111 | 58.1 | 0.05 | 0.010 | 0.011 | 0.54 | Balance | 0.01 | 0.00 | 0.00 | 0.00 | 0.00 | 0.00 | 0.00 | 0.00 | 0.00 | 0.00 | 58.1 | 0.551 |
| S112 | 61.2 | 1.02 | 0.099 | 0.025 | 0.97 | Balance | 0.03 | 0.00 | 0.00 | 0.00 | 0.00 | 0.00 | 0.00 | 0.00 | 0.00 | 0.00 | 56.8 | 0.995 |
| S113 | 61.4 | 0.55 | 0.027 | 0.014 | 0.15 | Balance | 0.00 | 0.00 | 0.00 | 0.00 | 0.00 | 0.00 | 0.01 | 0.00 | 0.00 | 0.00 | 58.8 | 0.164 |
| S114 | 58.3 | 0.11 | 0.012 | 0.197 | 0.13 | Balance | 0.01 | 0.00 | 0.00 | 0.01 | 0.00 | 0.00 | 0.00 | 0.00 | 0.00 | 0.00 | 57.9 | 0.327 |

Note:
"MM" refers to mischmetal.

TABLE 11

Step A: Production step using the facility ordinarily used for manufacturing commercial products (direct extrusion)

| Step No. | Hot Extrusion | | | Cold Drawing Working Ratio (%) | Low-Temperature Annealing | | | Note |
|---|---|---|---|---|---|---|---|---|
| | Diameter of Extruded Material (mm) | Temperature (° C.) | Cooling Rate* (° C./min) | | Temperature (° C.) | Time (min) | f9 | |
| A1 | 24 | 580 | 30 | 0 | — | — | — | |
| A2 | 24 | 580 | 30 | 4.9 | — | — | — | |
| A3 | 24 | 620 | 40 | 4.9 | — | — | — | |
| AH1 | 24 | 680 | 30 | 4.9 | — | — | — | |
| AH2 | 24 | 620 | 70 | 4.9 | — | — | — | |
| A4 | 24 | 580 | 30 | 4.9 | 310 | 100 | 1100 | The material of Step A1 was annealed at a low temperature |
| A5 | 24 | 580 | 30 | 4.9 | 350 | 60 | 1162 | The material of Step A1 was annealed at a low temperature |
| A10 | 45 | 570 | 20 | | — | — | — | To Step F (forging material) |

*Cooling rate from 530° C. to 450° C.

TABLE 12

Step C: Extrusion in a Laboratory

| Step No. | Hot Extrusion | | | Cold Working Ratio (%) | Low-Temperature Annealing | | | Note |
|---|---|---|---|---|---|---|---|---|
| | Diameter of Extruded Material (mm) | Temperature (° C.) | Cooling Rate* (° C./min) | | Temperature (° C.) | Time (min) | f9 | |
| C1 | 24 | 590 | 25 | 0 | — | — | — | |
| C2 | 24 | 620 | 25 | 0 | — | — | — | |

TABLE 12-continued

Step C: Extrusion in a Laboratory

| | | Hot Extrusion | | Cold | | | | |
|---|---|---|---|---|---|---|---|---|
| Step No. | Diameter of Extruded Material (mm) | Temperature (° C.) | Cooling Rate* (° C./min) | Working Working Ratio (%) | Low-Temperature Annealing Temperature (° C.) | Time (min) | f9 | Note |
| C3 | 24 | 590 | 25 | 0 | 320 | 60 | 930 | The material of Step C1 was annealed at a low temperature |
| CH1 | 24 | 680 | 25 | 0 | — | — | — | |
| CH2 | 24 | 620 | 65 | 0 | — | — | — | |
| C10 | 45 | 590 | 20 | | — | — | — | To Step F (forging material) |

*Cooling rate from 530° C. to 450° C.

TABLE 13

Step D: Casting (production of castings with a forging material)

| Step No. | Diameter (mm) | Cooling Rate* (° C./min) | Note |
|---|---|---|---|
| D1 | 45 | 40 | To Step F (forging material) |

*Cooling rate from 530° C. to 450° C.

TABLE 14

Step E1: Laboratory (bar)

| | Material | Diameter of Extruded Material (mm) | Cold Drawing 1 | | Annealing | | Cold Drawing 2 | |
| | | | Diameter of Drawn Material (mm) | Working Ratio (%) | Temperature (° C.) | Time (min) | Diameter of Drawn Material (mm) | Working Ratio (%) |
| Step No. | (preceding step) | | | | | | | |
|---|---|---|---|---|---|---|---|---|
| E1 | C1 | 24.0 | 20.0 | 31 | 480 | 60 | 19.0 | 10 |

TABLE 15

Step F: Hot forging in a laboratory

| | Material | Hot Forging | | Low-Temperature Annealing | | |
| Step No. | (preceding step) | Temperature (° C.) | Cooling Rate* (° C./min) | Temperature (° C.) | Time (min) | f9 |
|---|---|---|---|---|---|---|
| F1 | A10, C10 | 640 | 10 | | | |
| F2 | A10, C10 | 600 | 28 | | | |
| F3 | D1 | 625 | 28 | | | |
| F4 | A10, C10 | 640 | 10 | 340 | 40 | 885 |
| FH1 | A10, C10 | 690 | 28 | | | |
| FH2 | A10, C10 | 640 | 70 | | | |

*Cooling rate from 530° C. to 450° C.

TABLE 16

Step G: Cooling of castings

| Step No. | Average Cooling Rate during Casting (° C./min) | | |
|---|---|---|---|
| | 650-550° C. | 530-450° C. | 430-350° C. |
| G1 | 40 | 30 | 25 |
| G2 | 70 | 42 | 30 |
| G3 | 8 | 5 | 2 |
| GH1 | 80 | 65 | 50 |

TABLE 17

| Test No. | Alloy No. | Step No. | f3 | f4 | f5 | f6 | f7 | Presence of Bi Particle in α Phase | Presence of P Compound in β phase | Amount of Si in β Phase (mass %) | Hot Workability |
|---|---|---|---|---|---|---|---|---|---|---|---|
| T01 | S1 | A1 | 52 | 48 | 0 | 12.4 | 1.56 | B | B | 1.2 | B |
| T02 | | A2 | 53 | 47 | 0 | 12.4 | 1.54 | B | B | 1.3 | — |
| T03 | | A3 | 47 | 53 | 0 | 12.7 | 1.70 | B | B | 1.2 | — |
| T04 | | AH1 | 45 | 55 | 0 | 12.8 | 1.76 | B | B | 1.2 | — |
| T05 | | AH2 | 43 | 57 | 0 | 12.9 | 1.81 | B | C | 1.2 | — |
| T06 | | A4 | 54 | 44 | 1.7 | 12.8 | 1.45 | B | B | 1.2 | — |
| T07 | | A5 | 56 | 41 | 2.9 | 12.8 | 1.35 | B | B | 1.2 | — |
| T08 | | E1 | 57 | 43 | 0 | 12.1 | 1.42 | B | B | 1.2 | — |
| T09 | | F1 | 50 | 50 | 0 | 12.5 | 1.62 | B | B | 1.3 | — |
| T10 | | F2 | 51 | 49 | 0 | 12.5 | 1.59 | B | B | 1.3 | — |
| T11 | | F4 | 53 | 45 | 1.8 | 12.9 | 1.48 | B | B | 1.2 | — |
| T12 | | FH1 | 43 | 57 | 0 | 12.9 | 1.81 | B | B | 1.2 | — |
| T13 | | FH2 | 42 | 58 | 0 | 13.0 | 1.84 | B | C | 1.2 | — |
| T14 | S1.1 | C1 | 51 | 49 | 0 | 12.5 | 1.59 | B | B | 1.2 | B |
| T15 | S1.2 | C1 | 53 | 47 | 0 | 12.3 | 1.52 | B | B | 1.2 | B |
| T16 | S1.3 | C1 | 55 | 45 | 0 | 12.2 | 1.48 | B | B | 1.2 | B |
| T17 | S1.4 | C1 | 60 | 40 | 0 | 11.9 | 1.32 | B | — | 1.1 | B |
| T18 | S1.5 | C1 | 52 | 47 | 0.8 | 12.8 | 1.53 | B | B | 1.2 | B |
| T19 | S1.6 | C1 | 55 | 43 | 1.7 | 12.8 | 1.42 | B | B | 1.2 | B |
| T20 | S1.7 | C1 | 58 | 38 | 3.8 | 12.8 | 1.26 | B | B | 1.1 | B |

TABLE 18

| Test No. | Alloy No. | Step No. | Properties | | | | Lathe | | Drill | | |
|---|---|---|---|---|---|---|---|---|---|---|---|
| | | | Electrical Conductivity (% IACS) | Tensile Strength (N/mm$^2$) | Elongation (%) | f8 | Chips | Combined Force | Chips | Torque Index | Thrust Index | Drill Index |
| T01 | S1 | A1 | 15.8 | 530 | 32 | 700 | A | 94 | A | 82 | 85 | 84 |
| T02 | | A2 | 15.8 | 573 | 27 | 728 | A | 93 | A | 83 | 84 | 84 |
| T03 | | A3 | 16.0 | 588 | 25 | 735 | A | 94 | A | 83 | 83 | 83 |
| T04 | | AH1 | 16.1 | 554 | 25 | 693 | A | 93 | A | 79 | 83 | 81 |
| T05 | | AH2 | 15.9 | 594 | 23 | 731 | A | 90 | B | 78 | 82 | 80 |
| T06 | | A4 | 16.0 | 592 | 19 | 704 | A | 93 | A | 85 | 83 | 84 |
| T07 | | A5 | 16.1 | 580 | 18 | 684 | A | 90 | A | 84 | 80 | 82 |
| T08 | | E1 | 15.7 | 642 | 17 | 751 | A | 89 | B | 78 | 80 | 79 |
| T09 | | F1 | 15.9 | 522 | 34 | 699 | A | 94 | A | 81 | 85 | 83 |
| T10 | | F2 | 15.8 | 540 | 33 | 718 | A | 95 | A | 82 | 83 | 83 |
| T11 | | F4 | 16.1 | 525 | 25 | 656 | A | 92 | A | 84 | 81 | 83 |
| T12 | | FH1 | 16.1 | 511 | 28 | 654 | A | 91 | B | 80 | 82 | 81 |
| T13 | | FH2 | 16.1 | 559 | 30 | 727 | B | 89 | B | 78 | 83 | 81 |
| T14 | S1.1 | C1 | 15.7 | 535 | 30 | 696 | A | 94 | A | 83 | 84 | 84 |
| T15 | S1.2 | C1 | 15.5 | 540 | 28 | 691 | A | 93 | A | 81 | 81 | 81 |
| T16 | S1.3 | C1 | 15.3 | 541 | 25 | 676 | A | 90 | B | 78 | 79 | 79 |
| T17 | S1.4 | C1 | 14.9 | 529 | 18 | 624 | B | 84 | C | 73 | 74 | 74 |
| T18 | S1.5 | C1 | 15.8 | 530 | 26 | 668 | A | 93 | A | 84 | 80 | 82 |
| T19 | S1.6 | C1 | 15.5 | 523 | 24 | 649 | A | 91 | A | 82 | 79 | 81 |
| T20 | S1.7 | C1 | 15.4 | 497 | 16 | 577 | B | 85 | B | 77 | 72 | 75 |

TABLE 19

| Test No. | Alloy No. | Step No. | f3 | f4 | f5 | f6 | f7 | Presence of Bi Particle in α Phase | Presence of P Compound in β phase | Amount of Si in β Phase (mass %) | Hot Workability |
|---|---|---|---|---|---|---|---|---|---|---|---|
| T101 | S20 | C1 | 49 | 51 | 0 | 12.9 | 1.63 | B | B | 0.8 | B |
| T102 | | C2 | 45 | 55 | 0 | 13.0 | 1.74 | B | B | 0.8 | — |
| T103 | | CH1 | 40 | 60 | 0 | 13.3 | 1.87 | B | B | 0.7 | — |
| T104 | | CH2 | 41 | 59 | 0 | 13.2 | 1.84 | B | C | 0.8 | — |
| T105 | | F1 | 48 | 52 | 0 | 12.9 | 1.66 | B | B | 0.7 | — |
| T106 | | F2 | 46 | 54 | 0 | 13.0 | 1.71 | B | B | — | — |
| T107 | | F4 | 50 | 50 | 0 | 12.8 | 1.60 | B | B | — | — |
| T108 | | FH1 | 39 | 61 | 0 | 13.3 | 1.90 | B | B | 0.7 | — |
| T109 | | FH2 | 40 | 60 | 0 | 13.3 | 1.87 | B | C | 0.7 | — |
| T110 | S21 | C1 | 40 | 60 | 0 | 11.2 | 1.18 | B | B | 0.6 | B |
| T111 | | C2 | 37 | 63 | 0 | 11.3 | 1.23 | B | B | 0.6 | — |
| T112 | | F1 | 38 | 62 | 0 | 11.3 | 1.21 | B | B | 0.6 | — |
| T113 | | F2 | 37 | 63 | 0 | 11.3 | 1.23 | B | B | 0.6 | — |
| T114 | | F4 | 39 | 61 | 0 | 11.2 | 1.20 | B | B | 0.7 | — |
| T115 | | FH1 | 32 | 68 | 0 | 11.5 | 1.31 | B | B | 0.6 | — |
| T116 | | FH2 | 33 | 67 | 0 | 11.4 | 1.29 | B | C | 0.6 | — |

TABLE 20

| | | | Properties | | | | Lathe | | Drill | | |
|---|---|---|---|---|---|---|---|---|---|---|---|
| Test No. | Alloy No. | Step No. | Electrical Conductivity (% IACS) | Tensile Strength (N/mm$^2$) | Elongation (%) | f8 | Chips | Combined Force | Chips | Torque Index | Thrust Index | Drill Index |
| T101 | S20 | C1 | 19.9 | 525 | 29 | 677 | A | 95 | A | 85 | 86 | 86 |
| T102 | | C2 | 20.0 | 510 | 28 | 653 | A | 94 | A | 84 | 86 | 85 |
| T103 | | CH1 | 20.2 | 500 | 25 | 625 | A | 92 | B | 81 | 85 | 83 |
| T104 | | CH2 | 20.2 | 529 | 28 | 677 | A | 92 | B | 80 | 84 | 82 |
| T105 | | F1 | 20.1 | 514 | 32 | 678 | A | 94 | A | 83 | 85 | 84 |
| T106 | | F2 | 19.9 | 528 | 31 | 692 | A | 95 | A | 86 | 86 | 86 |
| T107 | | F4 | 19.9 | 525 | 33 | 698 | A | 94 | A | 84 | 85 | 85 |
| T108 | | FH1 | 20.4 | 501 | 28 | 641 | A | 92 | B | 82 | 84 | 83 |
| T109 | | FH2 | 19.7 | 533 | 27 | 677 | A | 91 | B | 80 | 85 | 83 |
| T110 | S21 | C1 | 21.5 | 517 | 26 | 651 | A | 90 | A | 80 | 81 | 81 |
| T111 | | C2 | 21.7 | 510 | 25 | 638 | A | 89 | A | 79 | 82 | 81 |
| T112 | | F1 | 21.5 | 510 | 31 | 668 | A | 90 | A | 80 | 81 | 81 |
| T113 | | F2 | 21.6 | 524 | 30 | 681 | A | 91 | A | 82 | 82 | 82 |
| T114 | | F4 | 21.5 | 514 | 32 | 678 | A | 90 | A | 81 | 80 | 81 |
| T115 | | FH1 | 21.7 | 501 | 28 | 641 | B | 88 | B | 78 | 81 | 80 |
| T116 | | FH2 | 21.3 | 530 | 27 | 673 | B | 85 | B | 76 | 79 | 78 |

TABLE 21

| Test No. | Alloy No. | Step No. | f3 | f4 | f5 | f6 | f7 | Presence of Bi Particle in α Phase | Presence of P Compound in β phase | Amount of Si in β Phase (mass %) | Hot Workability |
|---|---|---|---|---|---|---|---|---|---|---|---|
| T117 | S21.1 | F3 | 36 | 64 | 0 | 11.3 | 1.23 | B | B | 0.6 | B |
| T118 | S21.2 | F1 | 39 | 61 | 0 | 11.2 | 1.20 | B | B | 0.6 | B |
| T119 | S21.3 | F1 | 41 | 59 | 0 | 11.1 | 1.15 | B | B | 0.6 | B |
| T120 | S21.4 | F1 | 45 | 55 | 0 | 11.0 | 1.10 | B | B | 0.5 | B |
| T121 | S22 | C1 | 46 | 54 | 0 | 11.9 | 1.17 | B | B | 0.5 | B |
| T122 | | F3 | 45 | 55 | 0 | 11.9 | 1.19 | B | B | 0.5 | — |
| T123 | S22.2 | G1 | 45 | 55 | 0 | 11.8 | 1.19 | B | B | 0.5 | — |
| T124 | | G2 | 40 | 60 | 0 | 12.0 | 1.28 | B | B | — | — |
| T125 | | G3 | 51 | 49 | 0 | 11.6 | 1.08 | B | B | 0.5 | — |
| T126 | | GH1 | 35 | 65 | 0 | 12.2 | 1.36 | B | C | 0.4 | — |
| T127 | S23 | C1 | 63 | 37 | 0 | 15.4 | 2.12 | B | B | 1.2 | B |
| T128 | S24 | C1 | 56 | 44 | 0 | 12.9 | 1.70 | B | B | 1.2 | B |
| T129 | | C2 | 52 | 48 | 0 | 13.2 | 1.83 | B | B | 1.1 | — |
| T130 | S25 | C1 | 58 | 42 | 0 | 14.1 | 1.78 | B | B | 0.9 | B |

TABLE 21-continued

| | | | Metallographic Structure | | | | | | | |
|---|---|---|---|---|---|---|---|---|---|---|
| Test No. | Alloy No. | Step No. | f3 | f4 | f5 | f6 | f7 | Presence of Bi Particle in α Phase | Presence of P Compound in β phase | Amount of Si in β Phase (mass %) | Hot Workability |
| T131 | S26 | C1 | 48 | 52 | 0 | 11.5 | 1.30 | B | B | 1.2 | B |
| T132 | | C3 | 49 | 50 | 0.9 | 11.8 | 1.26 | B | B | 1.2 | — |
| T133 | | F1 | 47 | 53 | 0 | 11.5 | 1.32 | B | B | 1.3 | — |
| T134 | | F4 | 48 | 50 | 1.3 | 11.9 | 1.26 | B | B | 1.2 | — |

TABLE 22

| | | | Properties | | | | Lathe | | Drill | | |
|---|---|---|---|---|---|---|---|---|---|---|---|
| Test No. | Alloy No. | Step No. | Electrical Conductivity (% IACS) | Tensile Strength (N/mm²) | Elongation (%) | f8 | Chips | Combined Force | Chips | Torque Index | Thrust Index | Drill Index |
| T117 | S21.1 | F3 | 21.6 | 508 | 28 | 650 | A | 89 | A | 80 | 80 | 80 |
| T118 | S21.2 | F1 | 21.2 | 512 | 30 | 666 | A | 88 | A | 79 | 77 | 78 |
| T119 | S21.3 | F1 | 21.1 | 513 | 28 | 657 | A | 86 | B | 77 | 76 | 77 |
| T120 | S21.4 | F1 | 20.9 | 508 | 23 | 625 | B | 81 | C | 71 | 72 | 72 |
| T121 | S22 | C1 | 22.8 | 488 | 27 | 620 | A | 92 | A | 81 | 83 | 82 |
| T122 | | F3 | 22.9 | 492 | 28 | 630 | A | 92 | A | 81 | 82 | 82 |
| T123 | S22.2 | G1 | 22.8 | — | — | — | A | 91 | A | 80 | 84 | 82 |
| T124 | | G2 | 23.5 | — | — | — | A | 93 | A | 80 | 85 | 83 |
| T125 | | G3 | 22.7 | — | — | — | A | 90 | B | 78 | 82 | 80 |
| T126 | | GH1 | 23.6 | — | — | — | A | 87 | B | 76 | 82 | 79 |
| T127 | S23 | C1 | 17.6 | 480 | 23 | 590 | A | 99 | A | 89 | 94 | 92 |
| T128 | S24 | C1 | 17.4 | 523 | 31 | 685 | A | 95 | A | 85 | 87 | 86 |
| T129 | | C2 | 17.5 | 515 | 30 | 670 | A | 93 | A | 84 | 86 | 85 |
| T130 | S25 | C1 | 19.7 | 486 | 25 | 608 | A | 97 | A | 87 | 90 | 89 |
| T131 | S26 | C1 | 16.3 | 540 | 30 | 702 | A | 90 | A | 79 | 82 | 81 |
| T132 | | C3 | 16.3 | 542 | 27 | 688 | A | 90 | A | 81 | 81 | 81 |
| T133 | | F1 | 16.3 | 532 | 33 | 708 | A | 91 | A | 79 | 81 | 80 |
| T134 | | F4 | 16.6 | 536 | 31 | 702 | A | 90 | A | 81 | 79 | 80 |

TABLE 23

| | | | Metallographic Structure | | | | | | | |
|---|---|---|---|---|---|---|---|---|---|---|
| Test No. | Alloy No. | Step No. | f3 | f4 | f5 | f6 | f7 | Presence of Bi Particle in α Phase | Presence of P Compound in β phase | Amount of Si in β Phase (mass %) | Hot Workability |
| T135 | S26.1 | C1 | 50 | 49 | 0.9 | 11.8 | 1.24 | B | B | 1.2 | B |
| T136 | S26.2 | C1 | 54 | 42 | 3.5 | 11.8 | 1.07 | B | B | 1.1 | B |
| T137 | S26.3 | F3 | 45 | 55 | 0 | 11.6 | 1.35 | B | B | 1.2 | B |
| T138 | S26.4 | G1 | 47 | 53 | 0 | 11.4 | 1.31 | B | B | 1.2 | — |
| T139 | | G2 | 41 | 59 | 0 | 11.8 | 1.44 | B | B | — | — |
| T140 | | G3 | 52 | 47 | 0.8 | 11.6 | 1.18 | B | B | — | — |
| T141 | | GH1 | 37 | 63 | 0 | 12.0 | 1.52 | B | C | 1.2 | — |
| T142 | S26.5 | G3 | 53 | 44 | 2.1 | 11.7 | 1.12 | B | B | 1.2 | — |
| T143 | S26.6 | G3 | 60 | 35 | 4.9 | 11.5 | 0.91 | B | B | 1.1 | — |
| T144 | S27 | C1 | 54 | 46 | 0 | 10.9 | 1.14 | B | B | 0.9 | B |
| T145 | S28 | C1 | 50 | 50 | 0 | 11.1 | 1.14 | B | B | 1 | B |
| T146 | S29 | F1 | 63 | 37 | 0 | 9.8 | 0.81 | B | B | 0.8 | B |
| T147 | | FH2 | 55 | 45 | 0 | 10.2 | 0.97 | B | C | — | — |
| T148 | S30 | C1 | 61 | 39 | 0 | 10.1 | 0.63 | B | B | — | B |
| T149 | S30.1 | C1 | 63 | 37 | 0 | 9.9 | 0.58 | B | B | — | B |
| T150 | S30.2 | C1 | 67 | 33 | 0 | 9.9 | 0.54 | B | B | — | B |

TABLE 24

| Test No. | Alloy No. | Step No. | Properties Electrical Conductivity (% IACS) | Properties Tensile Strength (N/mm²) | Elongation (%) | f8 | Lathe Chips | Lathe Combined Force | Drill Chips | Drill Torque Index | Drill Thrust Index | Drill Index |
|---|---|---|---|---|---|---|---|---|---|---|---|---|
| T135 | S26.1 | C1 | 16.0 | 525 | 27 | 667 | A | 89 | A | 80 | 77 | 79 |
| T136 | S26.2 | C1 | 15.8 | 497 | 16 | 577 | B | 83 | B | 75 | 70 | 73 |
| T137 | S26.3 | F3 | 16.4 | 522 | 28 | 668 | A | 90 | B | 78 | 81 | 80 |
| T138 | S26.4 | G1 | 16.3 | — | — | — | A | 90 | A | 79 | 82 | 81 |
| T139 | | G2 | 16.4 | — | — | — | A | 92 | A | 80 | 82 | 81 |
| T140 | | G3 | 16.3 | — | — | — | B | 89 | A | 80 | 77 | 79 |
| T141 | | GH1 | 16.6 | — | — | — | B | 86 | B | 76 | 79 | 78 |
| T142 | S26.5 | G3 | 16.3 | — | — | — | B | 86 | A | 79 | 73 | 76 |
| T143 | S26.6 | G3 | 16.2 | — | — | — | B | 78 | B | 74 | 68 | 71 |
| T144 | S27 | C1 | 19.0 | 515 | 30 | 670 | A | 90 | A | 79 | 82 | 81 |
| T145 | S28 | C1 | 17.8 | 531 | 29 | 685 | A | 89 | A | 78 | 82 | 80 |
| T146 | S29 | F1 | 20.1 | 478 | 34 | 641 | B | 87 | B | 77 | 81 | 79 |
| T147 | | FH2 | 20.1 | 497 | 31 | 651 | B | 84 | B | 73 | 80 | 77 |
| T148 | S30 | C1 | 23.2 | 463 | 35 | 625 | B | 84 | B | 75 | 79 | 77 |
| T149 | S30.1 | C1 | 22.5 | 460 | 33 | 612 | B | 82 | B | 74 | 77 | 76 |
| T150 | S30.2 | C1 | 22.7 | 452 | 27 | 574 | C | 74 | D | 68 | 72 | 70 |

TABLE 25

| Test No. | Alloy No. | Step No. | Metallographic Structure f3 | f4 | f5 | f6 | f7 | Presence of Bi Particle in α Phase | Presence of P Compound in β phase | Amount of Si in β Phase (mass %) | Hot Workability |
|---|---|---|---|---|---|---|---|---|---|---|---|
| T151 | S31 | C1 | 54 | 46 | 0 | 8.8 | 0.61 | B | B | 0.4 | B |
| T152 | S32 | F2 | 24 | 76 | 0 | 9.6 | 0.78 | B | B | — | B |
| T153 | S33 | C1 | 74 | 26 | 0 | 9.3 | 0.59 | B | B | — | B |
| T154 | | C2 | 68 | 32 | 0 | 9.7 | 0.74 | B | B | 0.8 | — |
| T155 | S34 | C1 | 55 | 45 | 0 | 9.5 | 0.57 | B | B | 0.3 | B |
| T156 | S34.1 | G1 | 53 | 47 | 0 | 9.5 | 0.57 | B | B | 0.3 | — |
| T157 | | G3 | 58 | 42 | 0 | 9.3 | 0.51 | B | B | — | — |
| T158 | S35 | C1 | 46 | 54 | 0 | 8.9 | 0.57 | B | B | 0.4 | B |
| T159 | S36 | C1 | 51 | 49 | 0 | 9.2 | 0.90 | B | C | 0.8 | B |
| T160 | S37 | C1 | 50 | 50 | 0 | 11.3 | 1.01 | B | B | 1.2 | B |
| T161 | S38 | C1 | 78 | 22 | 0 | 10.4 | 0.71 | B | B | — | B |
| T162 | | C3 | 80 | 17 | 2.3 | 10.6 | 0.47 | B | B | — | — |
| T163 | S39 | C1 | 56 | 44 | 0 | 11.5 | 1.03 | B | B | 0.9 | B |
| T164 | S40 | C1 | 52 | 48 | 0 | 10.9 | 1.03 | B | D | 0.4 | B |
| T165 | S41 | C1 | 82 | 18 | 0 | 10.5 | 0.47 | B | B | 1.4 | B |

TABLE 26

| Test No. | Alloy No. | Step No. | Properties Electrical Conductivity (% IACS) | Properties Tensile Strength (N/mm²) | Elongation (%) | f8 | Lathe Chips | Lathe Combined Force | Drill Chips | Drill Torque Index | Drill Thrust Index | Drill Index |
|---|---|---|---|---|---|---|---|---|---|---|---|---|
| T151 | S31 | C1 | 23.4 | 458 | 34 | 614 | B | 81 | B | 74 | 78 | 76 |
| T152 | S32 | F2 | 23.3 | 507 | 22 | 619 | A | 87 | B | 78 | 78 | 78 |
| T153 | S33 | C1 | 20.1 | 462 | 36 | 628 | B | 80 | B | 72 | 77 | 75 |
| T154 | | C2 | 20.3 | 469 | 34 | 628 | B | 82 | B | 74 | 78 | 76 |
| T155 | S34 | C1 | 24.2 | 442 | 35 | 597 | B | 79 | B | 75 | 76 | 76 |
| T156 | S34.1 | G1 | 24.3 | — | — | — | B | 79 | B | 73 | 77 | 75 |
| T157 | | G3 | 24.2 | — | — | — | B | 76 | B | 72 | 77 | 75 |
| T158 | S35 | C1 | 23.0 | 492 | 30 | 640 | B | 82 | B | 74 | 75 | 75 |
| T159 | 536 | C1 | 20.3 | 522 | 29 | 673 | B | 77 | B | 72 | 75 | 74 |
| T160 | S37 | C1 | 16.7 | 524 | 29 | 676 | A | 89 | A | 79 | 81 | 80 |
| T161 | S38 | C1 | 16.1 | 473 | 37 | 648 | B | 80 | B | 72 | 76 | 74 |
| T162 | | C3 | 16.3 | 477 | 27 | 606 | B | 78 | B | 76 | 72 | 74 |
| T163 | S39 | C1 | 19.2 | 503 | 28 | 644 | A | 90 | A | 79 | 81 | 80 |

TABLE 26-continued

| Test No. | Alloy No. | Step No. | Properties | | | | Lathe | | Drill | | | |
|---|---|---|---|---|---|---|---|---|---|---|---|---|
| | | | Electrical Conductivity (% IACS) | Tensile Strength (N/mm$^2$) | Elongation (%) | f8 | Chips | Combined Force | Chips | Torque Index | Thrust Index | Drill Index |
| T164 | S40 | C1 | 23.2 | 471 | 26 | 593 | B | 82 | B | 75 | 77 | 76 |
| T165 | S41 | C1 | 16.8 | 455 | 38 | 628 | B | 78 | B | 73 | 75 | 74 |

TABLE 27

| Test No. | Alloy No. | Step No. | Metallographic Structure | | | | | | | | |
|---|---|---|---|---|---|---|---|---|---|---|---|
| | | | f3 | f4 | f5 | f6 | f7 | Presence of Bi Particle in α Phase | Presence of P Compound in β phase | Amount of Si in β Phase (mass %) | Hot Workability |
| T201 | S101 | C1 | 13 | 87 | 0 | 8.8 | 0.78 | B | B | 0.3 | C |
| T202 | S102 | C1 | 49 | 51 | 0 | 7.7 | 0.32 | B | B | 0.2 | B |
| T203 | | F1 | 48 | 52 | 0 | 7.7 | 0.33 | D | B | — | — |
| T204 | S103 | C1 | 46 | 54 | 0 | 8.0 | 0.47 | B | B | — | B |
| T205 | | F1 | 45 | 55 | 0 | 8.0 | 0.48 | B | B | 0.4 | — |
| T206 | S104 | C1 | 57 | 43 | 0 | 7.5 | 0.54 | B | D | — | B |
| T207 | S105 | C1 | 88 | 12 | 0 | 8.6 | 0.09 | B | B | 0.6 | D |
| T217 | | G3 | 84 | 16 | 0 | 8.9 | 0.20 | B | B | 0.6 | — |
| T208 | S106 | C3 | 76 | 18 | 5.9 | 10.0 | 0.41 | B | B | 1.5 | B |
| T209 | S106.1 | G3 | 75 | 19 | 5.6 | 10.1 | 0.45 | B | B | 1.6 | — |
| T210 | S107 | C3 | 80 | 14 | 5.8 | 10.3 | 0.27 | B | B | 1.5 | C |
| T211 | S108 | C1 | 52 | 48 | 0 | 8.8 | 0.39 | B | B | 0.3 | B |
| T212 | S109 | C1 | 74 | 26 | 0 | 8.5 | 0.31 | B | B | 0.4 | B |
| T213 | S110 | C1 | 32 | 68 | 0 | 8.6 | 0.45 | B | B | 0.3 | B |
| T214 | S111 | C1 | 52 | 48 | 0 | 9.3 | 0.06 | D | D | 0.06 | B |
| T215 | | F1 | 54 | 46 | 0 | 9.2 | 0.06 | D | D | — | — |
| T216 | S112 | C1 | 29 | 71 | 0 | 18.7 | 4.16 | B | B | 1.1 | B |
| T218 | S113 | C1 | 73 | 27 | 0 | 8.1 | 0.42 | B | B | 0.7 | B |
| T219 | S114 | C1 | 53 | 47 | 0 | 8.2 | 0.26 | D | C | 0.13 | B |

TABLE 28

| Test No. | Alloy No. | Step No. | Properties | | | | Lathe | | Drill | | | |
|---|---|---|---|---|---|---|---|---|---|---|---|---|
| | | | Electrical Conductivity (% IACS) | Tensile Strength (N/mm$^2$) | Elongation (%) | f8 | Chips | Combined Force | Chips | Torque Index | Thrust Index | Drill Index |
| T201 | S101 | C1 | 24.1 | 520 | 14 | 593 | A | 89 | B | 77 | 78 | 78 |
| T202 | S102 | C1 | 25.2 | 420 | 31 | 550 | D | 66 | C | 66 | 72 | 69 |
| T203 | | F1 | 25.3 | 424 | 32 | 560 | D | 67 | D | 67 | 73 | 70 |
| T204 | S103 | C1 | 23.6 | 469 | 34 | 628 | C | 72 | C | 70 | 73 | 72 |
| T205 | | F1 | 23.8 | 477 | 37 | 653 | C | 74 | C | 71 | 72 | 72 |
| T206 | S104 | C1 | 23.2 | 454 | 38 | 627 | D | 68 | D | 68 | 74 | 71 |
| T207 | S105 | C1 | 21.8 | 410 | 40 | 574 | D | 67 | D | 67 | 74 | 71 |
| T217 | | G3 | 21.8 | — | — | — | D | 70 | D | 69 | 74 | 72 |
| T208 | S106 | C3 | 13.8 | 504 | 14 | 575 | B | 75 | B | 78 | 69 | 74 |
| T209 | S106.1 | G3 | 13.7 | — | — | — | C | 76 | B | 77 | 70 | 74 |
| T210 | S107 | C3 | 14.7 | 496 | 15 | 570 | D | 68 | C | 75 | 68 | 72 |
| T211 | S108 | C1 | 24.2 | 447 | 33 | 595 | D | 71 | C | 70 | 73 | 72 |
| T212 | S109 | C1 | 22.9 | 419 | 37 | 574 | C | 71 | D | 66 | 74 | 70 |
| T213 | S110 | C1 | 23.6 | 499 | 24 | 619 | C | 72 | C | 70 | 74 | 72 |
| T214 | S111 | C1 | 27.1 | 408 | 28 | 522 | C | 69 | C | 69 | 71 | 70 |
| T215 | | F1 | 26.9 | 404 | 30 | 525 | C | 68 | D | 68 | 72 | 70 |
| T216 | S112 | C1 | 16.4 | 524 | 12 | 587 | A | 99 | A | 91 | 93 | 92 |
| T218 | S113 | C1 | 20.6 | 448 | 37 | 614 | C | 73 | C | 72 | 71 | 72 |
| T219 | S114 | C1 | 25.4 | 417 | 31 | 546 | D | 65 | D | 64 | 70 | 67 |

TABLE 29

| Test No. | Alloy No. | Step No. | Casting Impact Value (J/cm²) | Vickers Hardness (Hv) | Solidification Temperature Range | Castability |
|---|---|---|---|---|---|---|
| T123 | S22.2 | G1 | 50 | 119 | 10 | B |
| T124 | | G2 | 42 | 122 | | |
| T125 | | G3 | 52 | 115 | | |
| T126 | | GH1 | 36 | 125 | | |
| T138 | S526.4 | GI | 51 | 127 | 14 | B |
| T139 | | G2 | 40 | 131 | | |
| T140 | | G3 | 39 | 129 | | |
| T141 | | GH1 | 42 | 136 | | |
| T142 | S26.5 | G3 | 32 | 138 | 18 | C |
| T143 | S26.6 | G3 | 23 | 143 | 25 | D |
| T156 | S34.1 | G1 | 65 | 113 | 14 | B |
| T157 | | G3 | 80 | 108 | | |
| T217 | S105 | G3 | 95 | 83 | 32 | D |
| T209 | S106.1 | G3 | 18 | 148 | 26 | D |

From the above-described measurement results, the following findings were obtained.

1) By satisfying a composition according to an embodiment of the present invention, the composition relational expressions f1 and f2, the metallographic structure relational expressions f3 to f5, and the composition and metallographic structure relational expressions f6 and f7 as well as presence of particles mainly composed of Bi in α phase, a high level of machinability can be obtained even if the contents of Pb and Bi are small, and a hot-worked material (a hot extruded material or a hot forged material) having good hot workability at about 600° C., high electrical conductivity of 15% IACS or higher, high strength, good ductility, and superb balance between strength and ductility (characteristic relational expression f8) as well as castings having good castability can be obtained (Alloys Nos. S01 and S20 to S41).

2) When the amount of Cu was higher than 64.5 mass %, the amount of γ phase was large, the elongation was low, and the machinability was poor (Alloy No. S107).

3) When the amount of Si was lower than 0.20 mass %, even if predetermined amounts of Bi and Pb were contained, the machinability was poor, and the tensile strength was low. The reason for this is presumed to be that the amount of Si solid-solubilized in β phase was small and particles mainly composed of Bi were not present in α phase because the Si content was small. When the Si content was 1.2 mass % or higher, the amount of γ phase was large, and the elongation was low. In addition, the castability was poor (Alloys Nos. S102, S106, S111, and S114).

4) When P was not contained, the machinability was poor. When P was contained in an amount exceeding 0.001 mass %, the machinability was better. When P-containing compounds were present and were able to be observed with a metallographic microscope, the machinability was even better. It is presumed that P-containing compounds were present in β phase and improved the machinability of β phase and the alloy. Even when P was contained and P-containing compounds were not able to be observed with a metallographic microscope, the evaluation result of machinability was good although it was slightly poorer than when P-containing compounds were able to be observed with a metallographic microscope (for example, Alloys Nos. S104, S36, and S40; Steps Nos. C1, CH2, and FH2).

5) When the Bi content was lower than 0.10 mass %, high level of machinability was not achieved. When the Bi content was higher than 0.50 mass %, the tensile strength and the elongation were slightly lower, and the balance index f8 was slightly poorer (Alloys Nos. S110, S23, S25, S40, and S112).

6) It was verified that, even if inevitable impurities are included in an amount actually included in a commercially manufactured alloy, there is no significant influence on the properties (Alloys Nos. S1 to S1.7 and S20 to S36). It is presumed that when Fe, Mn, Co, or Cr is contained in an amount exceeding the preferable range of inevitable impurities, intermetallic compounds comprising Fe, Mn, or the like and Si are formed. As a result, it is presumed that the machinability deteriorated due to the presence of compounds comprising Fe or the like and Si, and a decrease in the concentration of Si that was acting effectively on machinability. Further, there is a possibility that the characteristics of P-containing compounds may also have changed by containing Fe or the like. In addition, the elongation slightly decreased, and the balance index f8 decreased (Alloys Nos. S1.4, S21.4, and S30.2). It is presumed that when Sn and Al are contained in an amount exceeding the preferable range of inevitable impurities, γ phase appears or increases, or the behaviors of β phase and γ phase change. Consequently, the elongation value decreased, the balance index f8 deteriorated, and the machinability deteriorated. In addition, the solidification temperature range widened, the castability deteriorated, and the impact value decreased (Alloys Nos. S1.7, 526.2, and S26.6).

7) When particles mainly composed of Bi were present in α phase, the machinability was excellent. Even if 0.5 mass % Bi was contained, if the Si content was less than a predetermined amount and particles mainly composed of Bi were not present in α phase, the machinability was poor (Alloys Nos. S1, S20 to S28, 5102, 5111, and S114).

8) When the composition relational expression f1 was lower than 56.3, the elongation value was low. When f1 was higher than 59.5, the machinability was poor, and the tensile strength was low. In addition, the solidification temperature range exceeded 25° C. and the castability was poor. Further, in both cases, the hot workability at 600° C. was poor (Alloys Nos. S101 and S105).

9) When f1 was 56.8 or higher, the elongation value and the impact value were high. When f1 was 59.0 or lower, the machinability was better, and the tensile strength was higher (for example, Alloys Nos. S20 to S40).

10) When the composition relational expression f2 was 0.5 or higher, the machinability was very good. When the conditions of the relational expressions f3 to f7 were in the preferable ranges, the machinability index of turning was as high as about 95. Even when f2 was 0.5 or higher, if the Si content was low, the machinability was poor. Further, the elongation value was slightly lower, and the balance index f8 was slightly lower (Alloys Nos. S20, S23, S25, 5111, and S112).

11) Even when f2 was lower than 0.5, if the Si content was higher than 0.35 mass % and the composition and metallographic structure relational expressions f6 and f7 were in the preferable ranges, that is, if the value of f6 was 10.0 or higher and the value of f7 was 0.6 or higher, in particular, if the Si content was higher than 0.50 mass %, f6 was 11.0 or higher, and f7 was 1.0 or higher, the machinability index of turning was about 90 or higher, and chips were finely broken. It is presumed that the addition expression of the terms for improving the machinability (f6) and the expression representing the interaction of the machinability (f7) are important in the embodiments of the present invention (Alloys Nos. S1, S20 to S22, S24, S26 to S28, and S37).

12) when the amount of γ phase was about 1%, the torque index was low, and drilling performance was good. Even when the amount of γ phase was 0%, if the amount of β phase was about 20% or higher and the relational expressions f1 to f7 were satisfied, good machinability and high strength were obtained (for example, Alloys Nos. S1 and S38, etc.). When the proportion of γ phase was higher than 4%, the machinability was poor, the elongation value was low, and the balance index f8 was low (for example, Alloys Nos. S26.6 and S106).

13) When the amount of β phase was small and the amount of α phase was large, the machinability was poor, and the strength was low. As the amount of β phase increased, the machinability improved, and the strength increased (Alloys Nos. S105, S33, and S41). 14) When the amount of β phase was large and the amount of α phase was small, the elongation was low. As the amount of α phase increased, the elongation recovered (Alloys Nos. S101 and S32).

15) Unless f6 and f7 were satisfied, even when the composition and the other relational expressions were satisfied, satisfactory machinability was not able to be obtained (Alloys Nos. S103, S108, 5109, and S113).

15-1) When f6 and f7 were high, the machinability was good. However, the elongation was low, and the balance index f8 was low (Alloy No. S112).

15-2) It was verified that at least 0.3 mass % or higher amount of Si was contained in β phase. It was also verified that, although depending on other conditions, as the Si content in β phase was gradually increased to 0.5 mass % or higher, 0.7 mass % or higher, and to 1.0 mass % or higher, better machinability and higher strength were obtained, and the balance index f8 improved (Alloys Nos. S1 to S41).

16) When f1 was satisfied, good hot workability was exhibited at 600° C., and hot extrusion and hot forging were able to be performed at a temperature lower than 600° C. When the hot working temperature was higher than 650° C., the tensile strength was slightly lower, and the machinability and the balance between strength and elongation was slightly poorer (for example, Alloys Nos. S1, S20, and S21; Steps Nos. AH1, CH1, and FH2).

17) Hot working conditions, the proportions of β phase and γ phase changed, and the change affected the machinability, the tensile strength, the elongation, and the electrical conductivity (for example, Alloy No. Si; the respective steps).

18) Regarding castings, when the composition and the relational expressions f1 to f7 were satisfied, the evaluation of machinability was "good" or better and 100 HV or higher was obtained. Castability has a deep relationship with f1. In particular, when f1 is in the preferable range, the solidification temperature range was narrow, and good castability was exhibited. A forged product made of a casting exhibited the same machinability and the same mechanical characteristics as those of a forged product made of an extruded material (Steps Nos. Dl and F3).

19) The average cooling rate of about 50° C./min for the range from 530° C. to 450° C. after hot extrusion, hot forging, and casting was the boundary value that decides whether presence of P-containing compounds can be confirmed in an observation of the metallographic structure. When P-containing compounds were present, the machinability was better (Steps Nos. A1, AH2, C1, CH2, F1, and FH2).

20) When low-temperature annealing was performed on a hot-worked material such that the value of the heat treatment conditional expression f9 was in a range between 1100 and 1162 and the bend was measured, the bend was 0.1 mm or less per meter, i.e., a bar with only a minor bend was obtained. Depending on low-temperature annealing conditions, γ phase precipitated and a better torque index was obtained in some alloys. (Alloy No. S1; Steps Nos. A4 and A5).

As described above, free-cutting copper alloys in which the contents of the respective additive elements, the composition relational expressions f1 and f2, and the metallographic structure relational expressions f3 to f5, and the composition and metallographic structure relational expressions f6 and f7 are in appropriate ranges like embodiments of the present invention have excellent hot workability (in hot extrusion and hot forging), and their machinability and mechanical characteristics are also good. Free-cutting copper alloys according to an embodiment of the present invention can obtain excellent properties by adjusting production conditions in hot extrusion and hot forging as well as heat treatment conditions to appropriate ranges.

INDUSTRIAL APPLICABILITY

Free-cutting copper alloys according to an embodiment of the present invention have excellent hot workability and machinability, high strength, and excellent balance between strength and elongation although the amounts of Pb and Bi contained are small. Therefore, free-cutting copper alloys according to an embodiment of the present invention are suitable for automobile components, electrical or electronic apparatus components, mechanical components, stationaries, toys, sliding components, measuring instrument components, precision mechanical components, medical components, drink-related devices and components, devices and components for water drainage, industrial plumbing components, and components relating to liquid or gas such as hydrogen.

Specifically, free-cutting copper alloys according to an embodiment of the present invention are suitably applicable as a material that constitutes the items used in the above-mentioned fields which go by the names including valve, joint, cock, faucet, gear, axle, bearing, shaft, sleeve, spindle, sensor, bolt, nut, flare nut, pen point, insert nut, cap nut, nipple, spacer, and screw.

What is claimed is:

1. A free-cutting copper alloy comprising:
higher than 57.5 mass % and lower than 64.5 mass % of Cu;
higher than 0.20 mass % and lower than 1.20 mass % of Si;
higher than 0.001 mass % and lower than 0.20 mass % of Pb;
higher than 0.10 mass % and lower than 1.00 mass % of Bi; and
higher than 0.001 mass % and lower than 0.20 mass % of P,
with the balance being Zn and inevitable impurities,
wherein among the inevitable impurities, the total content of Fe, Mn, Co, and Cr is lower than 0.45 mass % and the total content of Sn and Al is lower than 0.45 mass %,
when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $$56.3 \leq f1 = [Cu] - 4.8 \times [Si] + 0.5 \times [Pb] + 0.5 \times [Bi] - 0.5 \times [P] \leq 59.5 \text{ and}$$

$$0.12 \leq f2 = [Pb] + [Bi] < 1.0$$

are satisfied,
in constituent phases of a metallographic structure excluding non-metallic inclusions, when an area ratio of a phase is represented by $(\alpha)$%, an area ratio of $\gamma$ phase is represented by $(\gamma)$%, and an area ratio of $\beta$ phase is represented by $(\beta)$%, relationships of $$20 \leq f3=(\alpha) \leq 85,$$

$$15 \leq f4=(\beta) \leq 80,$$

$$0 \leq f5=(\gamma)<4,$$

$$8.5 \leq f6=([Bi]+[Pb])^{1/2} \times 10+[P]^{1/2} \times 6+(\beta)^{1/2} \times [Si]^{1/2} \times 0.8+(\gamma)^{1/2} \times 0.5 \leq 18.0, \text{ and}$$

$$0.45 \leq f7=(([Bi]+[Pb])^{1/2}-0.05) \times ((\beta)^{1/2}-3) \times ([Si]^{1/2}-0.2)) \leq 3.6$$

are satisfied, and
particles mainly composed of Bi are present in a phase.

2. A free-cutting copper alloy comprising:
higher than or equal to 58.5 mass % and lower than or equal to 64.0 mass % of Cu;
higher than 0.35 mass % and lower than 1.15 mass % of Si;
higher than or equal to 0.003 mass % and lower than or equal to 0.095 mass % of Pb;
higher than or equal to 0.12 mass % and lower than or equal to 0.49 mass % of Bi; and
higher than or equal to 0.010 mass % and lower than or equal to 0.15 mass % of P,
with the balance being Zn and inevitable impurities,
wherein among the inevitable impurities, the total content of Fe, Mn, Co, and Cr is 0.35 mass % or lower and the total content of Sn and Al is 0.35 mass % or lower,
when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $$56.3 \leq f1=[Cu]-4.8 \times [Si]+0.5 \times [Pb]+0.5 \times [Bi]-0.5 \times [P] \leq 59.5 \text{ and}$$

$$0.15 \leq f2=[Pb]+[Bi]<0.50$$

are satisfied,
in constituent phases of a metallographic structure excluding non-metallic inclusions, when an area ratio of $\alpha$ phase is represented by $(\alpha)$%, an area ratio of $\gamma$ phase is represented by $(\gamma)$%, and an area ratio of $\beta$ phase is represented by $(\beta)$%, relationships of $$28 \leq f3=(\alpha) \leq 75,$$

$$25 \leq f4=(\beta) \leq 72,$$

$$0 \leq f5=(\gamma)<2,$$

$$10.0 \leq f6=([Bi]+[Pb])^{1/2} \times 10+[P]^{1/2} \times 6+(\beta)^{1/2} \times [Si]^{1/2} \times 0.8+(\gamma)^{1/2} \times 0.5 \leq 16.0, \text{ and}$$

$$0.6 \leq f7=(([Bi]+[Pb])^{1/2}-0.05) \times ((\beta)^{1/2}-3) \times ([Si]^{1/2}-0.2)) \leq 2.4$$

are satisfied,
particles mainly composed of Bi are present in $\alpha$ phase, and
P-containing compounds are present in $\beta$ phase.

3. A free-cutting copper alloy, comprising:
higher than 57.5 mass % and lower than 64.5 mass % of Cu;
higher than 0.20 mass % and lower than 1.20 mass % of Si;
higher than 0.001 mass % and lower than 0.20 mass % of Pb;
higher than 0.10 mass % and lower than 1.00 mass % of Bi; and
higher than 0.001 mass % and lower than 0.20 mass % of P,
with the balance being Zn and inevitable impurities,
wherein among the inevitable impurities, the total content of Fe, Mn, Co, and Cr is lower than 0.45 mass % and the total content of Sn and Al is lower than 0.45 mass %,
when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $$56.3 \leq f1=[Cu]-4.8 \times [Si]+0.5 \times [Pb]+0.5 \times [Bi]-0.5 \times [P] \leq 59.5 \text{ and}$$

$$0.12 \leq f2=[Pb]+[Bi]<1.0$$

are satisfied,
in constituent phases of a metallographic structure excluding non-metallic inclusions, when an area ratio of $\alpha$ phase is represented by $(\alpha)$%, an area ratio of $\gamma$ phase is represented by $(\gamma)$%, and an area ratio of $\beta$ phase is represented by $(\beta)$%, relationships of $$20 \leq f3=(\alpha) \leq 85,$$

$$15 \leq f4=(\beta) \leq 80,$$

$$0 \leq f5=(\gamma)<4,$$

$$8.5 \leq f6=([Bi]+[Pb])^{1/2} \times 10+[P]^{1/2} \times 6+(\beta)^{1/2} \times [Si]^{1/2} \times 0.8+(\gamma)^{1/2} \times 0.5 \leq 18.0, \text{ and}$$

$$0.45 \leq f7=(([Bi]+[Pb])^{1/2}-0.05) \times ((\beta)^{1/2}-3) \times ([Si]^{1/2}-0.2)) \leq 3.6$$

are satisfied,
particles mainly composed of Bi are present in $\alpha$ phase,
electrical conductivity is 15% IACS or higher and at least tensile strength S (N/mm$^2$) is 430 N/mm$^2$ or higher, and f8=S×(100+E)/100 representing the balance between the tensile strength S and elongation E (%) is 580 or higher.

4. The free-cutting copper alloy according to claim 1, which is used for an automobile component, an electrical or electronic apparatus component, a mechanical component, a stationery, a toy, a sliding component, a measuring component, a precision mechanical component, a medical component, a drink-related device or component, a device or component for water drainage, or an industrial plumbing component.

5. A method for producing the free-cutting copper alloy according to claim 1, the method comprising:
one or more hot working steps,
wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

6. The method for producing a free-cutting copper alloy according to claim 5, further comprising one or more steps selected from a cold working step, a straightness correction step, and an annealing step.

7. The method for producing a free-cutting copper alloy according to claim 5, further comprising a low-temperature annealing step that is performed after the final step among the hot working step, the cold working step, the straightness correction step, and the annealing step,
wherein in the low-temperature annealing step, holding temperature is 250° C. or higher and 430° C. or lower, and holding time is 10 minutes or longer and 200 minutes or shorter.

8. The free-cutting copper alloy according to claim 2, wherein electrical conductivity is 15% IACS or higher and at least tensile strength S (N/mm²) is 430 N/mm² or higher, and
f8=S×(100+E)/100 representing the balance between the tensile strength S and elongation E (%) is 580 or higher.

9. The free-cutting copper alloy according to claim 2, which is used for an automobile component, an electrical or electronic apparatus component, a mechanical component, a stationery, a toy, a sliding component, a measuring component, a precision mechanical component, a medical component, a drink-related device or component, a device or component for water drainage, or an industrial plumbing component.

10. The free-cutting copper alloy according to claim 3, which is used for an automobile component, an electrical or electronic apparatus component, a mechanical component, a stationery, a toy, a sliding component, a measuring component, a precision mechanical component, a medical component, a drink-related device or component, a device or component for water drainage, or an industrial plumbing component.

11. The free-cutting copper alloy according to claim 8, which is used for an automobile component, an electrical or electronic apparatus component, a mechanical component, a stationery, a toy, a sliding component, a measuring component, a precision mechanical component, a medical component, a drink-related device or component, a device or component for water drainage, or an industrial plumbing component.

12. A method for producing the free-cutting copper alloy according to claim 2, the method comprising:
one or more hot working steps,
wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

13. A method for producing the free-cutting copper alloy according to claim 3, the method comprising:
one or more hot working steps,
wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

14. A method for producing the free-cutting copper alloy according to claim 4, the method comprising:
one or more hot working steps,
wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

15. A method for producing the free-cutting copper alloy according to claim 8, the method comprising:
one or more hot working steps,
wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

16. A method for producing the free-cutting copper alloy according to claim 9, the method comprising:
one or more hot working steps,
wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

17. A method for producing the free-cutting copper alloy according to claim 10, the method comprising:
one or more hot working steps,
wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

18. A method for producing the free-cutting copper alloy according to claim 11, the method comprising:
one or more hot working steps,
wherein in the final hot working step among the hot working steps, hot working temperature is higher than 530° C. and lower than 650° C., and an average cooling rate in the temperature range from 530° C. to 450° C. after hot working is 0.1° C./min or higher and 50° C./min or lower.

19. The method for producing a free-cutting copper alloy according to claim 12, further comprising one or more steps selected from a cold working step, a straightness correction step, and an annealing step.

20. The method for producing a free-cutting copper alloy according to claim 6, further comprising a low-temperature annealing step that is performed after the final step among the hot working step, the cold working step, the straightness correction step, and the annealing step,
wherein in the low-temperature annealing step, holding temperature is 250° C. or higher and 430° C. or lower, and holding time is 10 minutes or longer and 200 minutes or shorter.

21. A free-cutting copper alloy comprising:
higher than or equal to 58.5 mass % and lower than or equal to 64.0 mass % of Cu;
higher than 0.35 mass % and lower than 1.15 mass % of Si;
higher than or equal to 0.003 mass % and lower than or equal to 0.095 mass % of Pb;
higher than or equal to 0.12 mass % and lower than or equal to 0.49 mass % of Bi; and
higher than or equal to 0.010 mass % and lower than or equal to 0.15 mass % of P,
with the balance being Zn and inevitable impurities,
wherein among the inevitable impurities, the total content of Fe, Mn, Co, and Cr is 0.35 mass % or lower and the total content of Sn and Al is 0.35 mass % or lower,
when a Cu content is represented by [Cu] mass %, a Si content is represented by [Si] mass %, a Pb content is represented by [Pb] mass %, a Bi content is represented by [Bi] mass %, and a P content is represented by [P] mass %, relationships of $$56.3 \leq f1=[Cu]-4.8\times[Si]+0.5\times[Pb]+0.5\times[Bi]-0.5\times[P] \leq 59.5 \text{ and}$$

$$0.15 \leq f2=[Pb]+[Bi]<0.50$$

are satisfied,
in constituent phases of a metallographic structure excluding non-metallic inclusions, when an area ratio of α phase is represented by (α)%, an area ratio of γ phase is represented by (γ)%, and an area ratio of β phase is represented by (β)%, relationships of $$28 \leq f3=(\alpha) \leq 75,$$

$$25 \leq f4=(\beta) \leq 72,$$

$$0 \leq f5=(\gamma)<2,$$

$$10.0 \leq f6=([Bi]+[Pb])^{1/2} \times 10+[P]^{1/2} \times 6+(\beta)^{1/2} \times [Si]^{1/2} \times 0.8+(\gamma)^{1/2} \times 0.5 \leq 16.0, \text{ and}$$

$$0.6 \leq f7=(([Bi]+[Pb])^{1/2}-0.05) \times ((\beta)^{1/2}-3) \times ([Si]^{1/2}-0.2)) \leq 2.4$$

are satisfied,
particles mainly composed of Bi are present in α phase,
P-containing compounds are present in β phase,
electrical conductivity is 15% IACS or higher and at least tensile strength S (N/mm$^2$) is 430 N/mm$^2$ or higher, and
f8=S×(100+E)/100 representing the balance between the tensile strength S and elongation E (%) is 580 or higher.

* * * * *